(12) United States Patent
Hull et al.

(10) Patent No.: US 10,118,705 B2
(45) Date of Patent: Nov. 6, 2018

(54) HYBRID ACOUSTIC AND INDUCTION-HEATING SYSTEMS AND METHODS FOR IMPEDING FORMATION OF ICE

(71) Applicant: The Boeing Company, Chicago, IL (US)

(72) Inventors: John Ralph Hull, Sammamish, WA (US); Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 15/183,563

(22) Filed: Jun. 15, 2016

(65) Prior Publication Data

US 2017/0361935 A1 Dec. 21, 2017

(51) Int. Cl.
*B64D 15/12* (2006.01)
*H05B 6/10* (2006.01)
*B64D 15/16* (2006.01)

(52) U.S. Cl.
CPC ........... *B64D 15/12* (2013.01); *B64D 15/163* (2013.01); *H05B 6/10* (2013.01); *H05B 6/105* (2013.01); *H05B 2214/02* (2013.01)

(58) Field of Classification Search
CPC ...... B64D 15/12; B64D 15/163; B64D 15/20; B64D 15/22; H05B 6/10; H05B 6/105; H05B 2214/02
See application file for complete search history.

(56) References Cited

U.S. PATENT DOCUMENTS 2,142,785 A * 1/1939 Hanson .................. B64D 15/12
219/618
4,875,644 A * 10/1989 Adams ................. B64D 15/163
244/134 D (Continued)

FOREIGN PATENT DOCUMENTS

RU 2088483 8/1997

OTHER PUBLICATIONS

English translation of abstract of RU 2088483.

(Continued)

*Primary Examiner* — Philip J Bonzell
(74) *Attorney, Agent, or Firm* — Dascenzo Intellectual Property Law, P.C.

(57) ABSTRACT

An airfoil comprises a skin, comprising an external surface and an internal surface, opposite the external surface. The skin is magnetically and electrically conductive. The airfoil also comprises an interior space, formed by the skin. The internal surface faces the interior space. The airfoil additionally comprises a leading edge along the external surface. The airfoil further comprises a hybrid acoustic induction-heating system, configured to impede formation of ice on the external surface. The hybrid acoustic induction-heating system comprises an induction coil within the interior space. At least a portion of the induction coil is sufficiently close to the internal surface to produce an eddy current in the skin when an alternating electrical current is flowing in the induction coil. The hybrid acoustic induction-heating system also comprises at least one magnet within the interior space. At least the one magnet is configured to produce a steady-state magnetic field within the skin.

42 Claims, 11 Drawing Sheets

(56) References Cited

U.S. PATENT DOCUMENTS

| | | | | |
|---|---|---|---|---|
| 5,129,598 | A * | 7/1992 | Adams | B64D 15/163 |
| | | | | 244/134 A |
| 5,143,325 | A * | 9/1992 | Zieve | B64D 15/163 |
| | | | | 244/134 D |
| 5,318,253 | A * | 6/1994 | Levin | B64D 15/16 |
| | | | | 244/134 D |
| 5,429,327 | A * | 7/1995 | Adams | B64D 15/163 |
| | | | | 244/134 D |
| 5,553,815 | A * | 9/1996 | Adams | B64D 15/163 |
| | | | | 244/134 R |
| 7,913,952 | B2 * | 3/2011 | Boschet | B64D 15/12 |
| | | | | 244/134 D |
| 8,777,163 | B2 * | 7/2014 | Safai | B64D 15/12 |
| | | | | 244/134 D |
| 9,463,879 | B2 * | 10/2016 | Khozikov | B64D 15/20 |
| 9,469,408 | B1 * | 10/2016 | Elangovan | B64D 15/12 |
| 2008/0251642 | A1 * | 10/2008 | Boschet | B64D 15/12 |
| | | | | 244/134 D |
| 2011/0049300 | A1 * | 3/2011 | Safai | B64D 15/12 |
| | | | | 244/134 D |
| 2016/0122025 | A1 * | 5/2016 | Hull | B64D 15/12 |
| | | | | 219/634 |

OTHER PUBLICATIONS

Mayton et al,. "*Electromagnetic Stressing of Bonded Structures*," Review of Progress in Quantitative Nondestructive Evaluation, vol. 12, pp. 1107-1114, 1993.

* cited by examiner

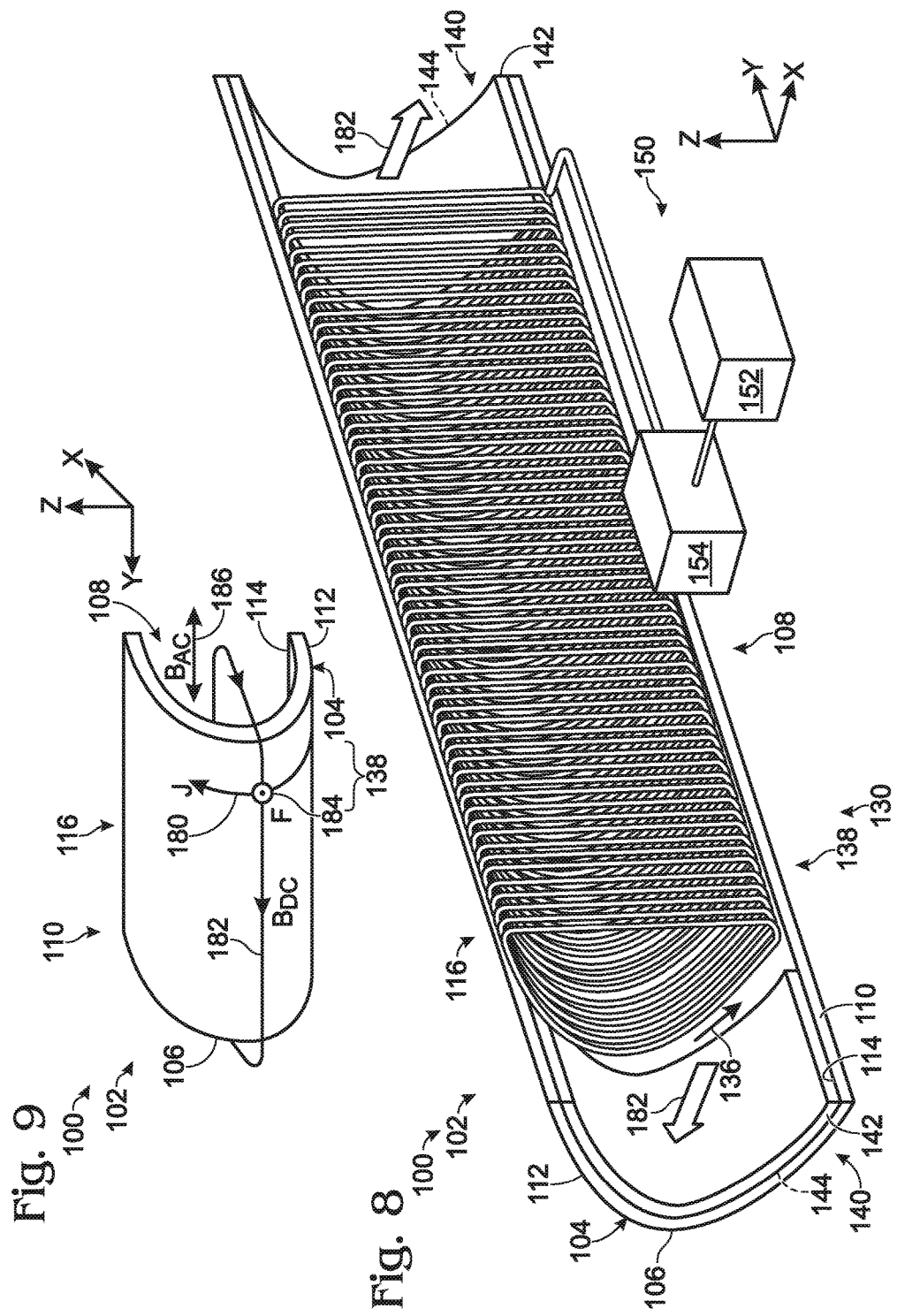

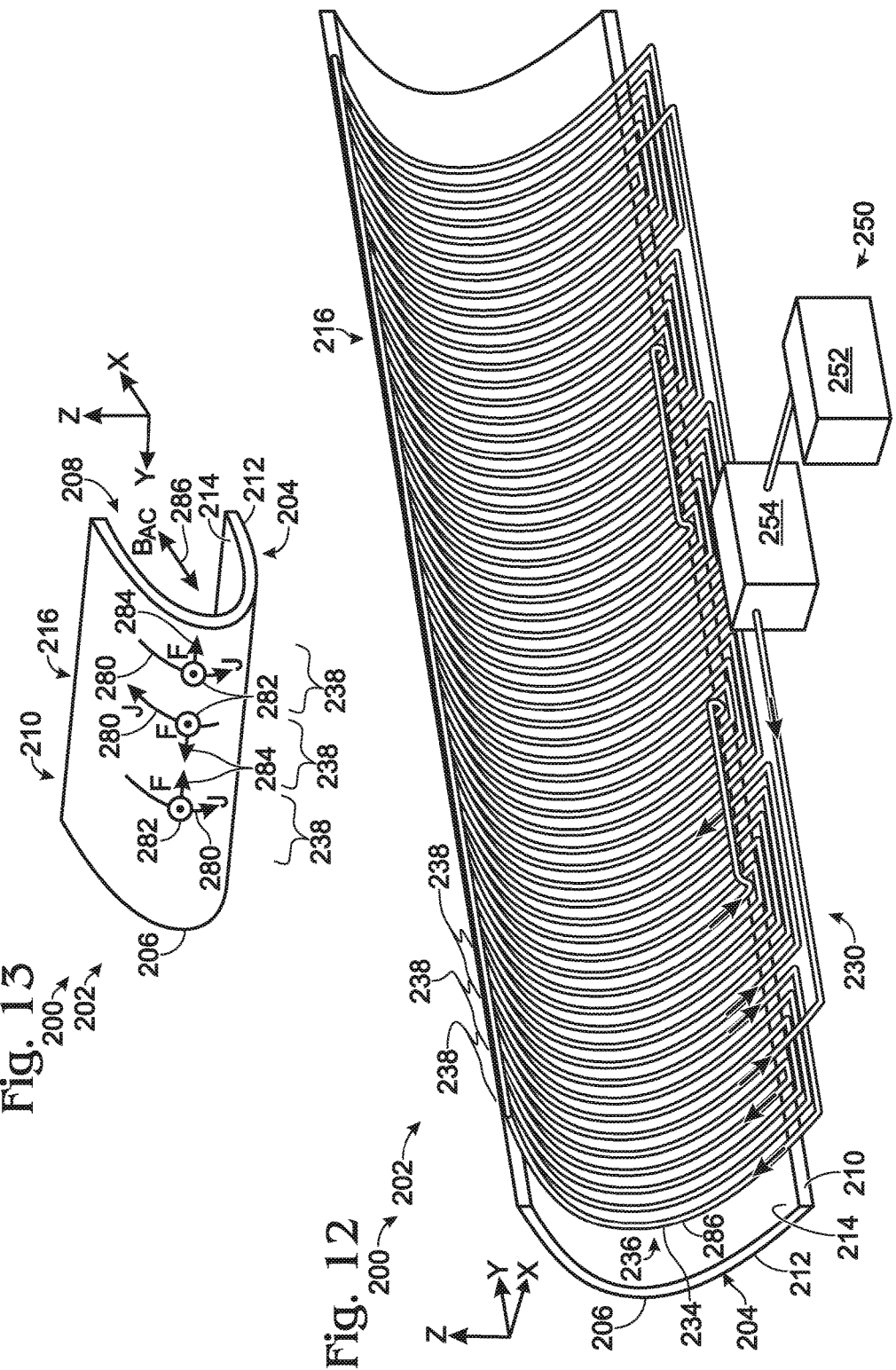

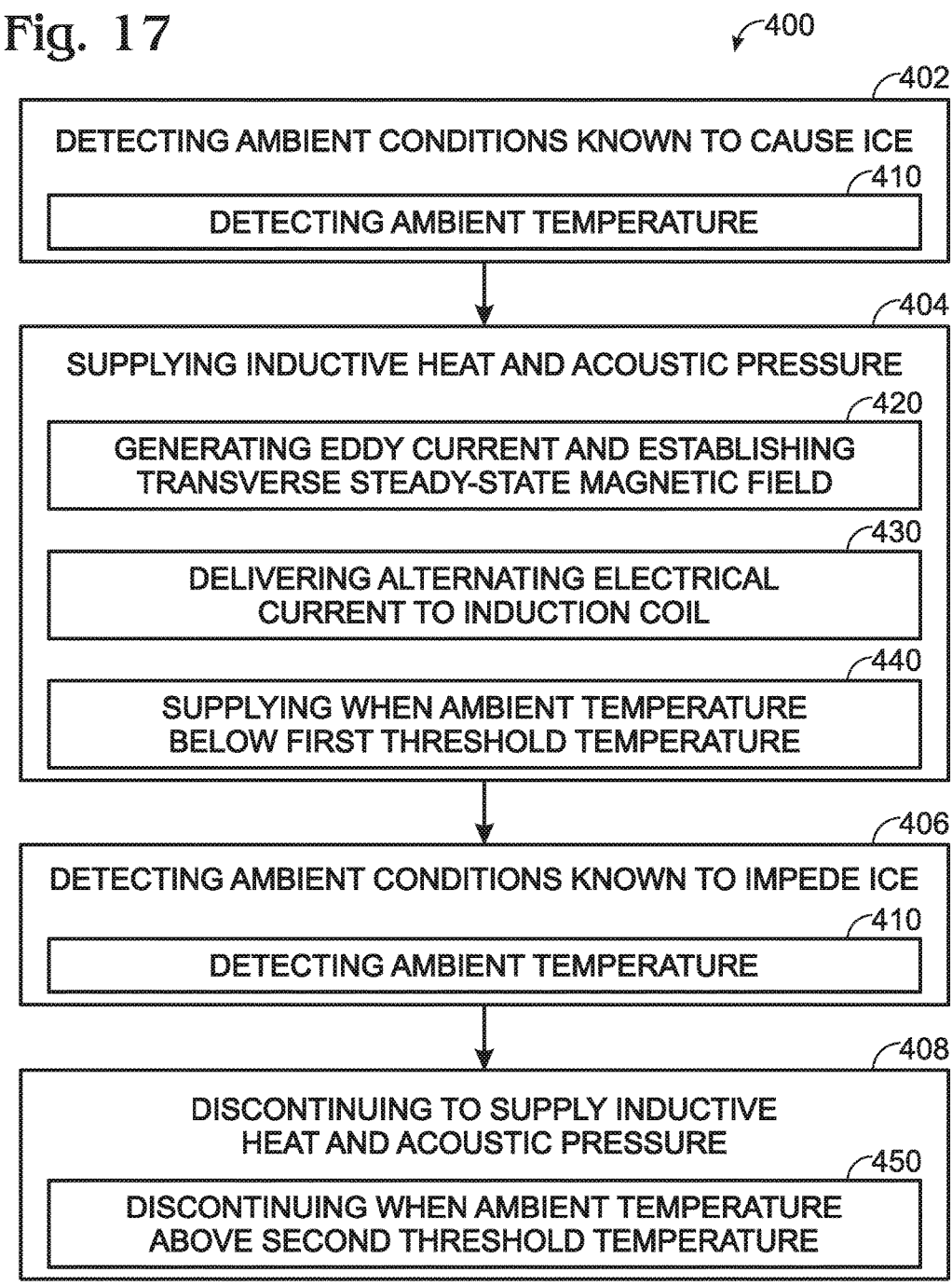

HYBRID ACOUSTIC AND INDUCTION-HEATING SYSTEMS AND METHODS FOR IMPEDING FORMATION OF ICE

BACKGROUND

Induction-heating systems for preventing ice formation on aircraft control surfaces have several advantages over resistive-heating systems. Electrically, induction heating is more efficient than resistive heating. However, induction heating still requires large amounts of energy to heat an area, such as a leading-edge region of an airplane wing.

Acoustic methods, used for de-icing aircraft control surfaces, usually involve sending strong acoustic pulses to areas where ice has formed to remove the accumulated ice using vibration. However, an acoustic coupling between acoustic transducers and surfaces, covered with ice, is required. The complexity of such a coupling reduces the net efficiency of acoustic methods for ice removal.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an airfoil that comprises a skin, comprising an external surface and an internal surface, opposite the external surface. The skin is magnetically and electrically conductive. The airfoil also comprises an interior space, formed by the skin. The internal surface of the skin faces the interior space. The airfoil additionally comprises a leading edge along the external surface of the skin. The airfoil further comprises a hybrid acoustic induction-heating system, configured to impede formation of ice on the external surface of the skin. The hybrid acoustic induction-heating system comprises an induction coil within the interior space. At least a portion of the induction coil is sufficiently close to the internal surface of the skin to produce an eddy current in the skin when an alternating electrical current is flowing in the induction coil. The hybrid acoustic induction-heating system also comprises at least one magnet within the interior space. At least the one magnet is configured to produce a steady-state magnetic field within the skin.

Another example of the subject matter according to the present disclosure relates to an airfoil that comprises a skin, comprising an external surface and an internal surface, opposite the external surface. The skin is magnetically and electrically conductive and has a controlled region. The airfoil also comprises an interior space, formed by the skin. The internal surface of the skin faces the interior space. The airfoil additionally comprises a leading edge along the external surface of the skin. The airfoil further comprises a hybrid acoustic induction-heating system, configured to impede formation of ice on the external surface of the skin. The hybrid acoustic induction-heating system comprises an induction coil within the interior space. At least a portion of the induction coil is sufficiently close to the internal surface of the skin to produce an eddy current within the controlled region of the skin when an alternating electrical current is flowing in the induction coil. The hybrid acoustic induction-heating system also comprises a control system, configured to generate inductive heat and acoustic pressure in the controlled region of the skin by supplying the alternating electrical current to the induction coil based, at least in part, on an ambient temperature of a layer of fluid flowing over the external surface of the skin.

Yet another example of the subject matter according to the present disclosure relates to an airfoil that comprises a skin, comprising an external surface and an internal surface, opposite the external surface. The skin is magnetically and electrically conductive and has a controlled region. The airfoil also comprises an interior space, formed by the skin. The internal surface of the skin faces the interior space. The airfoil additionally comprises a leading edge along the external surface of the skin. The airfoil further comprises a hybrid acoustic induction-heating system, configured to impede formation of ice on the external surface of the skin. The hybrid acoustic induction-heating system comprises induction coils, located within the interior space. Each one of the induction coils, in which a phase of an alternating electrical current is flowing, has a portion, arranged sufficiently close to the internal surface of the skin to produce an eddy current within the controlled region of the skin. The portion of one of the induction coils is adjacent to the portion of at least another one of the induction coils. The hybrid acoustic induction-heating system also comprises a control system, configured to generate inductive heat and traveling-wave acoustic pressure in the controlled region of the skin by supplying the phases of the alternating electrical current to the induction coils based, at least in part, on an ambient temperature of a layer of fluid flowing over the external surface of the skin. The supplying the phases of the alternating electrical current comprises supplying different ones of the phases of the alternating electrical current to those of the induction coils having the portions that are adjacent to each other.

Yet another example of the subject matter according to the present disclosure relates to a method of impeding formation of ice on an exterior surface of an airfoil. The method comprises detecting first ambient conditions known to cause the ice to form on the exterior surface. The method also comprises supplying inductive heat and acoustic pressure to the exterior surface when the first ambient conditions are detected. The method additionally comprises detecting second ambient conditions known to impede the ice from forming on the exterior surface. The method further comprises discontinuing to supply the inductive heat and the acoustic pressure to the exterior surface when the second ambient conditions are detected.

BRIEF DESCRIPTION OF THE DRAWINGS

Figure 1:
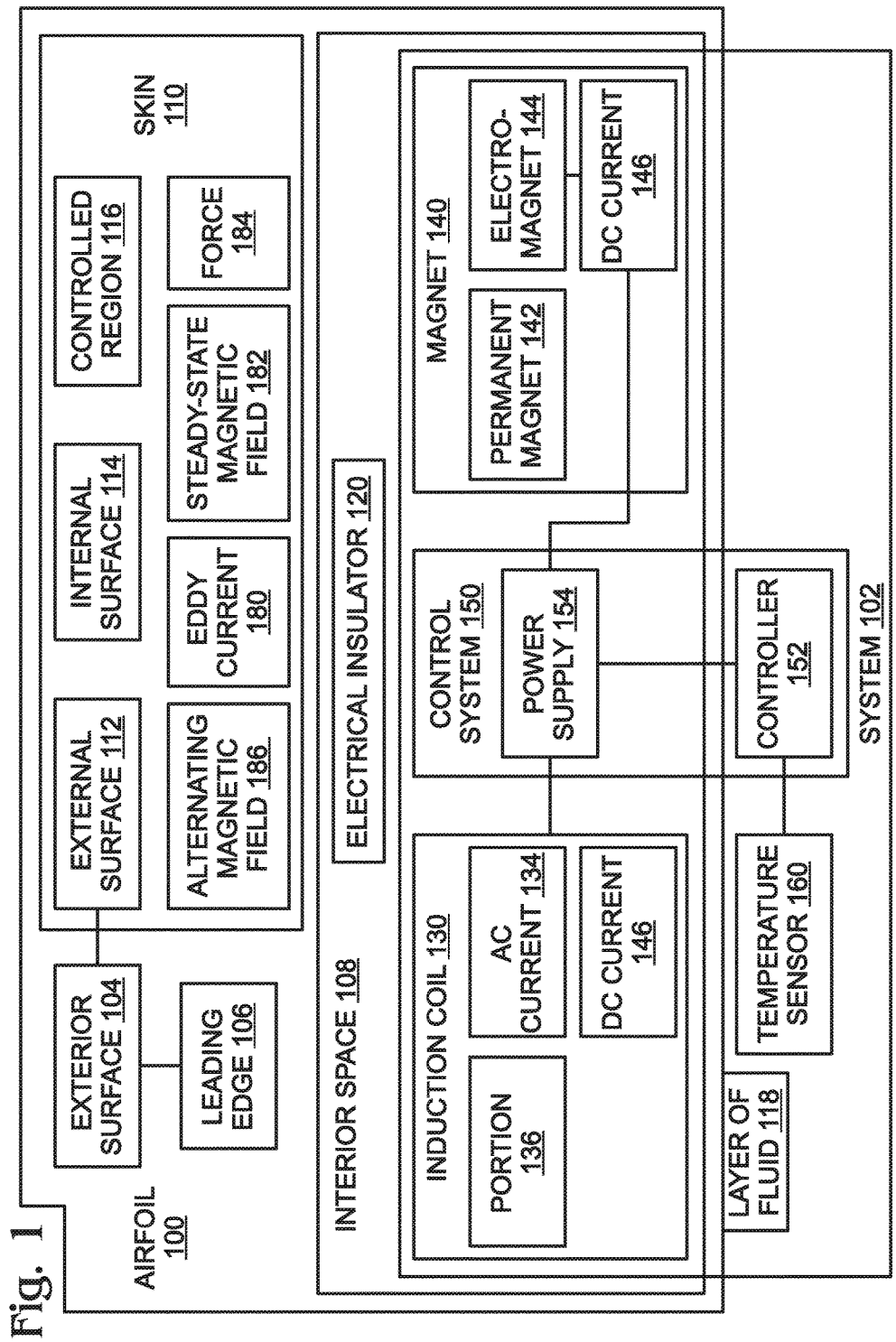
Figure 2:
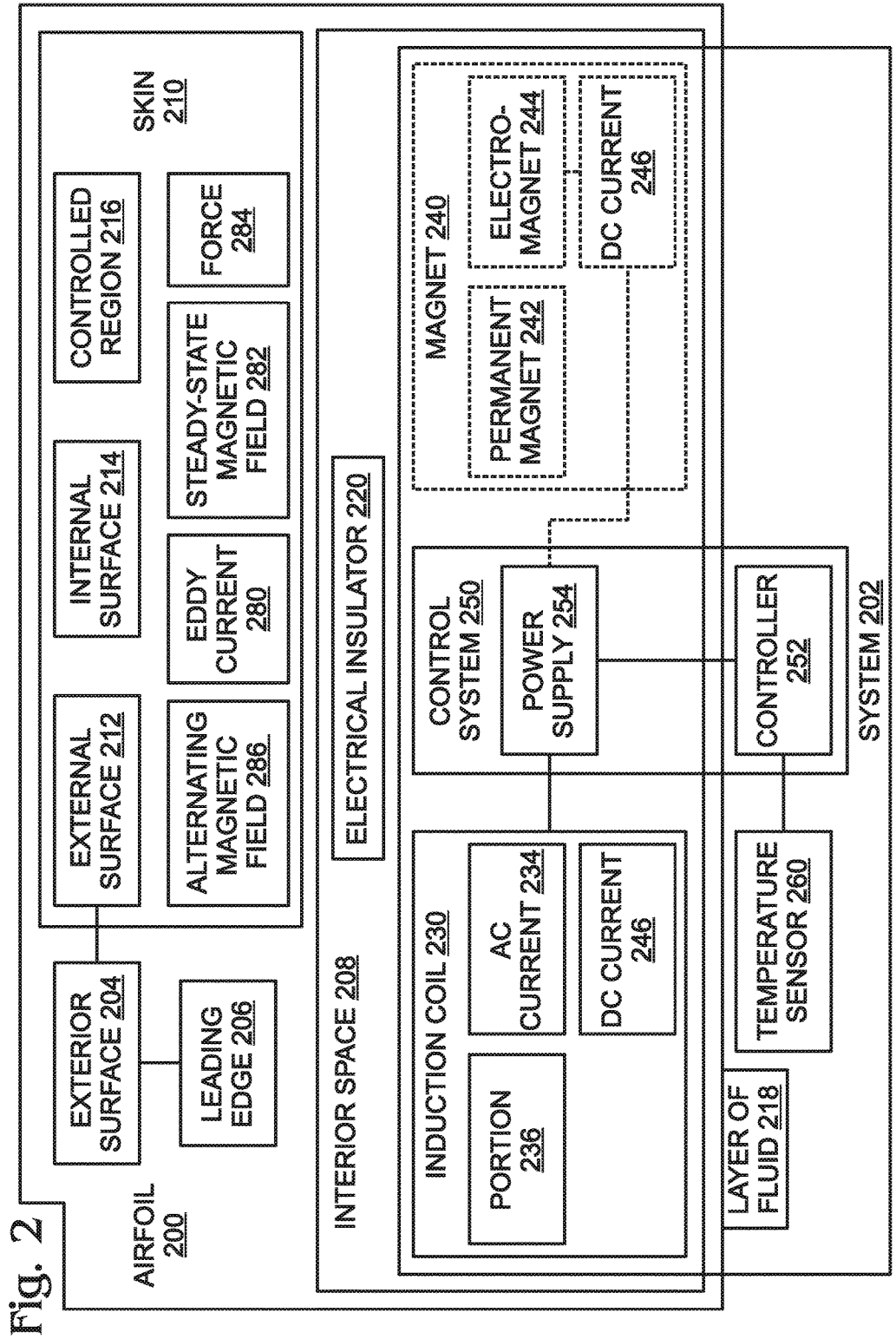
Figure 3:
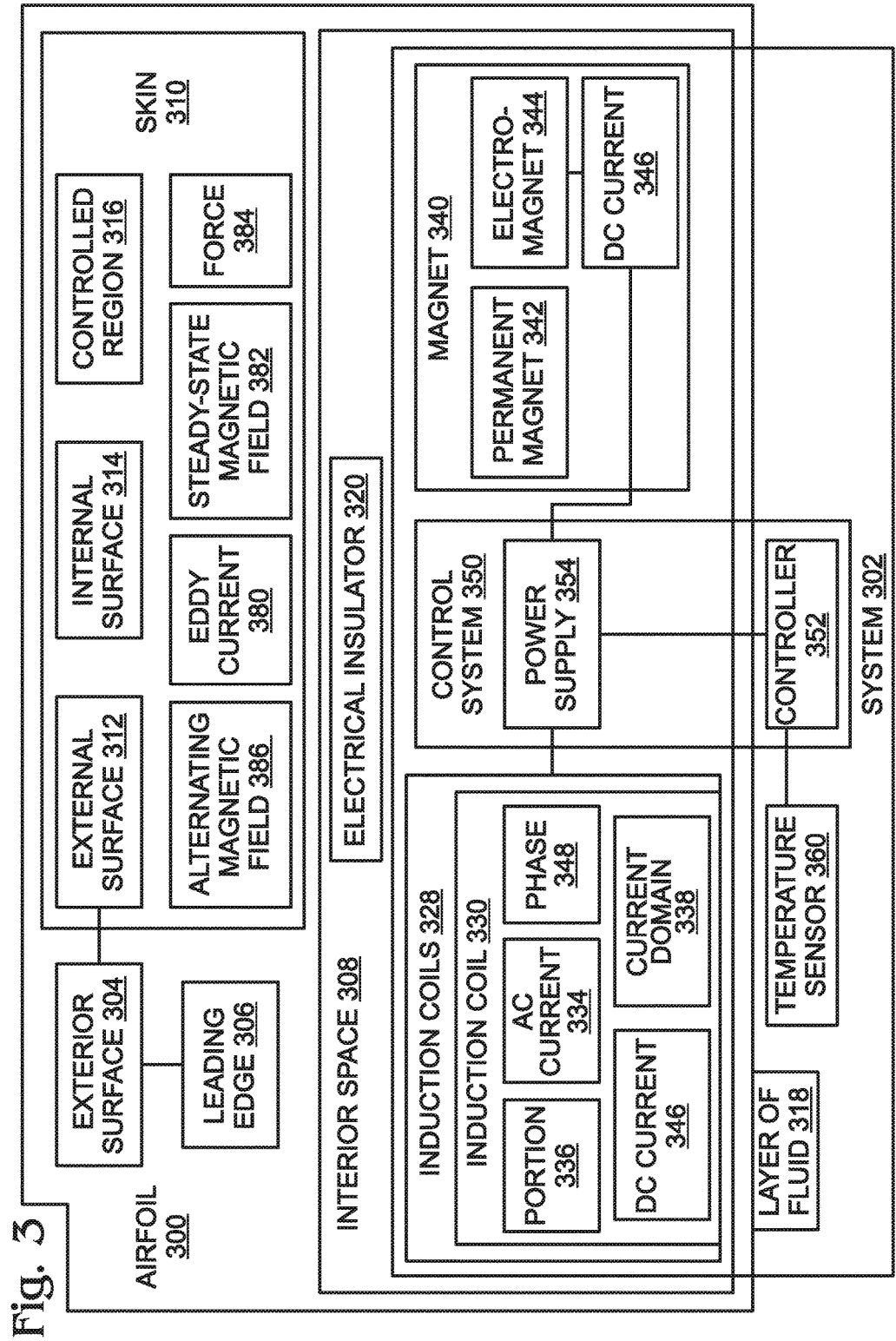
Figure 4:
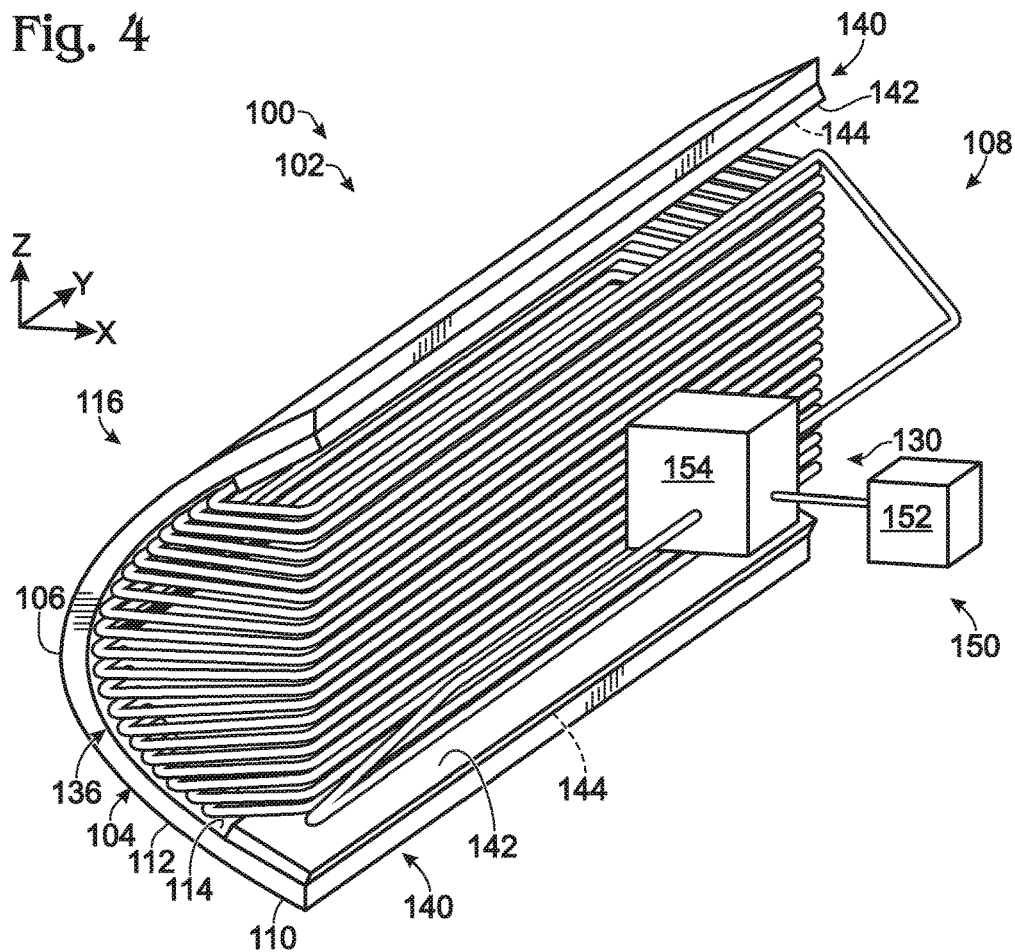
Figure 5:
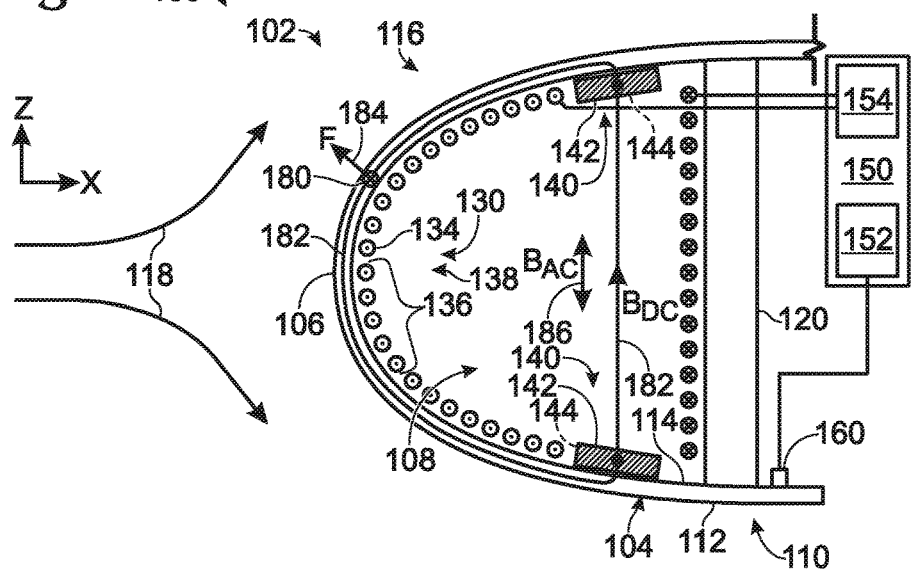
Figure 6:
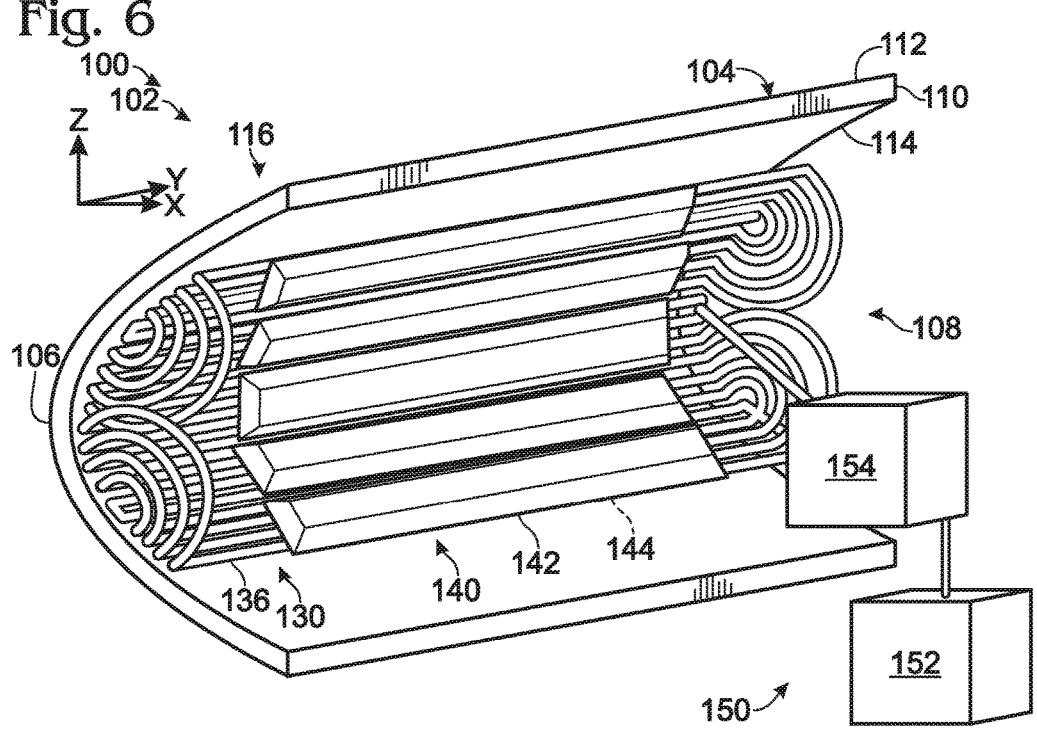
Figure 7:
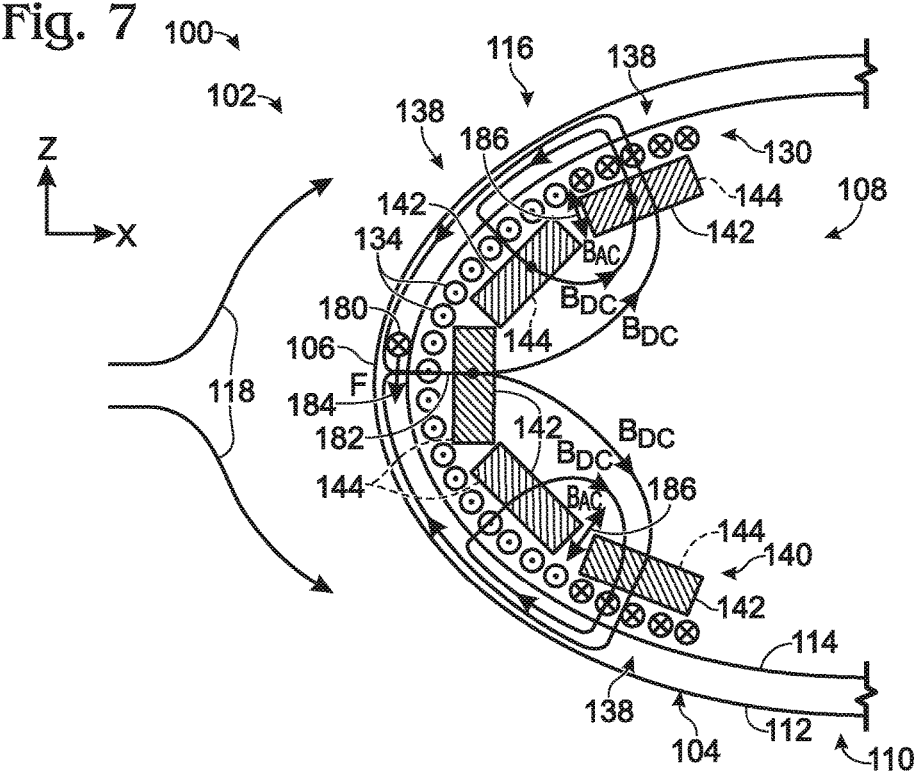
Figure 10:
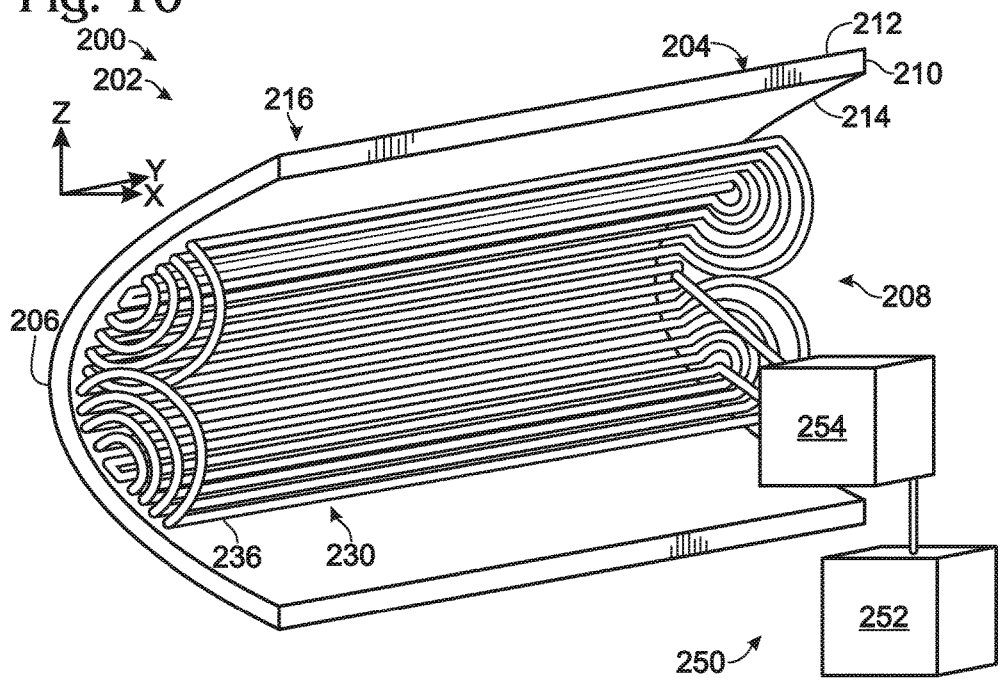
Figure 11:
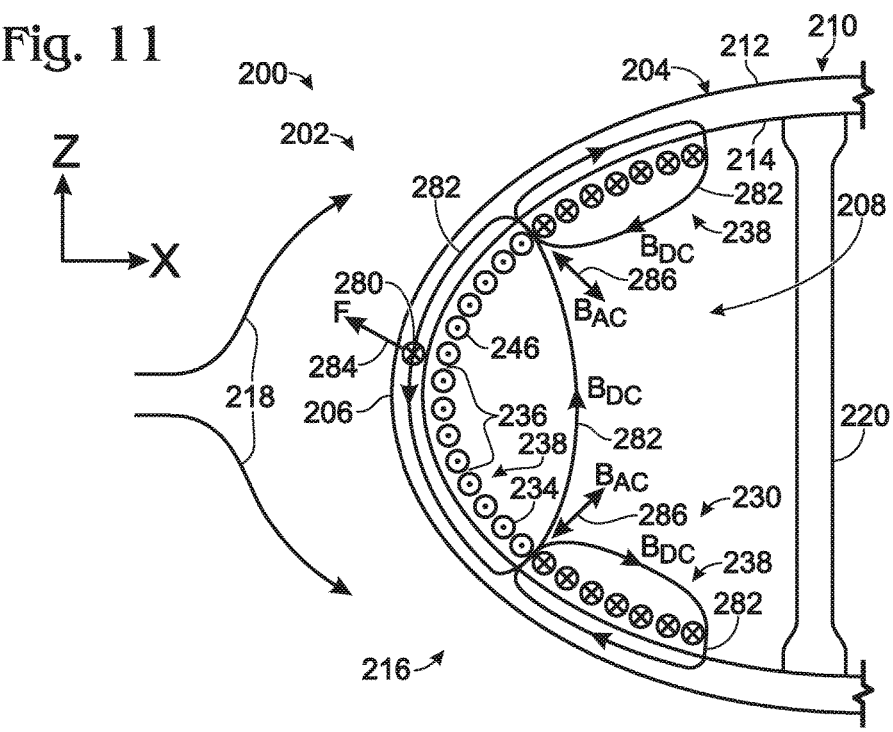
Figure 14:
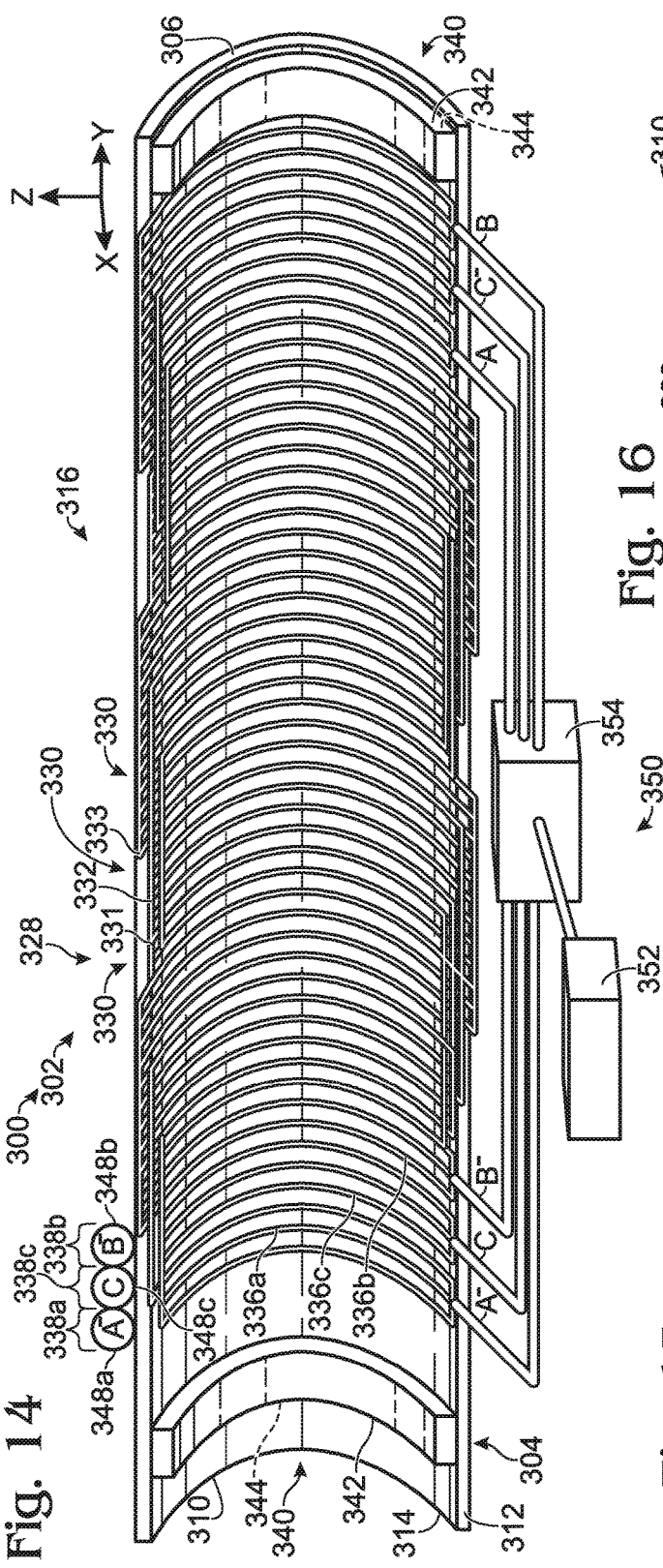
Figure 16:
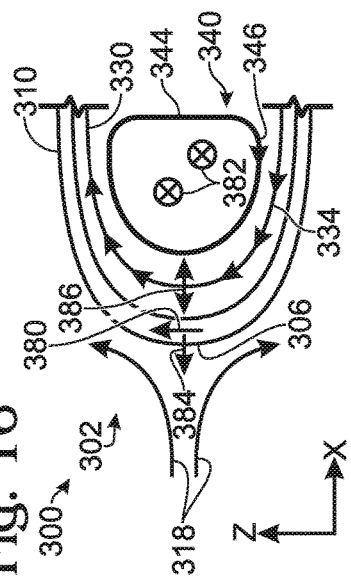
Figure 15:
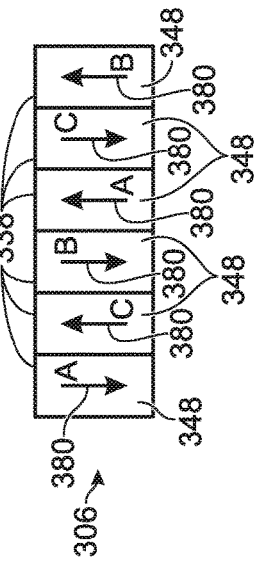
Figures 18, 19:
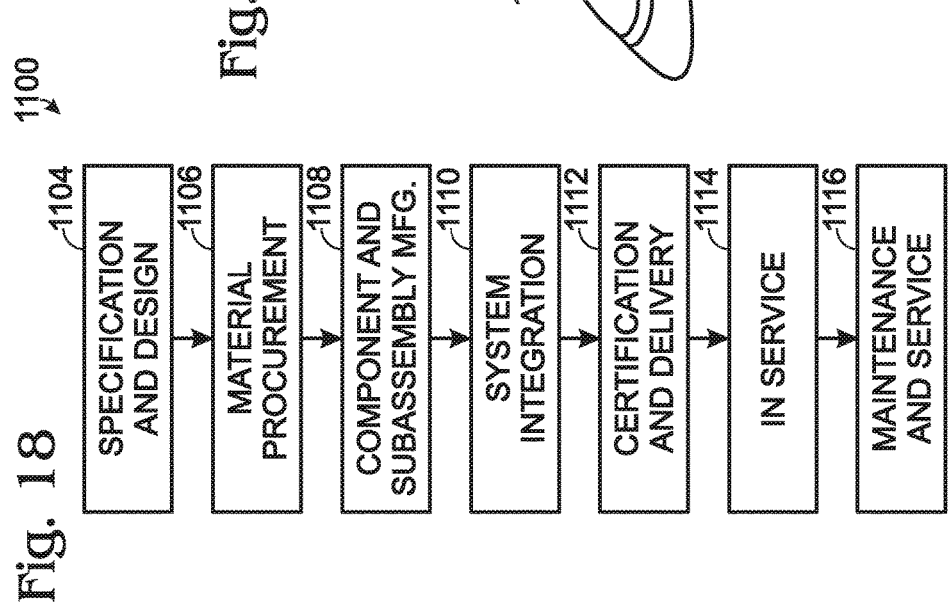

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an example of an airfoil assembly, according to one or more examples of the present disclosure;

FIG. 2 is a block diagram of another example of an airfoil assembly, according to one or more examples of the present disclosure;

FIG. 3 is a block diagram of yet another example an airfoil assembly, according to one or more examples of the present disclosure;

FIG. 4 is a schematic, perspective view of an example of the airfoil assembly of FIG. 1, according to one or more examples of the present disclosure;

FIG. 5 is a schematic, cross sectional view of the example of FIG. 4, according to one or more examples of the present disclosure;

FIG. 6 is a schematic, perspective view of another example of the airfoil assembly of FIG. 1, according to one or more examples of the present disclosure;

FIG. 7 is a schematic, cross sectional view of the example of FIG. 6, according to one or more examples of the present disclosure;

FIG. 8 is a schematic, perspective view of another example of the airfoil assembly of FIG. 1, according to one or more examples of the present disclosure;

FIG. 9 is a schematic diagram and perspective view of the airfoil of FIG. 8, according to one or more examples of the present disclosure;

FIG. 10 is a schematic, perspective view of an example of the airfoil assembly of FIG. 2, according to one or more examples of the present disclosure;

FIG. 11 is a schematic, cross sectional view of the example of FIG. 10, according to one or more examples of the present disclosure;

FIG. 12 is a schematic, perspective view of another example of the airfoil assembly of FIG. 2, according to one or more examples of the present disclosure;

FIG. 13 is a schematic diagram and perspective view of the airfoil of FIG. 12, according to one or more examples of the present disclosure;

FIG. 14 is a schematic, perspective view of an example of the airfoil assembly of FIG. 3, according to one or more examples of the present disclosure;

FIG. 15 is a schematic diagram of different phases of current domains and eddy currents along the leading edge of the airfoil of FIG. 14, according to one or more examples of the present disclosure;

FIG. 16 is a schematic diagram and cross sectional view of another example of the airfoil assembly of FIG. 3, according to one or more examples of the present disclosure;

FIG. 17 is a block diagram of a method of impeding formation of ice on an exterior or an airfoil such as the airfoils of FIGS. 1-3, according to one or more examples of the present disclosure;

FIG. 18 is a block diagram of aircraft production and service methodology; and

FIG. 19 is a schematic illustration of an aircraft.

DETAILED DESCRIPTION

In FIGS. 1-16, referred to above, solid lines, if any, connecting various elements and/or components may represent mechanical, electrical; fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1-16 may be combined in various ways without the need to include other features described in FIGS. 1-16, other drawing figures, and/or the accompanying disclosure, even though such combination or combinations are not explicitly illustrated herein. Similarly, additional features not limited to the examples presented, may be combined with some or all of the features shown and described herein.

In FIGS. 17-19, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 17-19 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

In FIGS. 4-16, coordinate frames with an x-axis, a y-axis, and/or a z-axis may be provided. The coordinate frames are to assist interpretation of FIGS. 4-16 relative to each other and relative to airfoils 100, 200, and 300. The x-axis is generally in the direction of airflow encountered by airfoils 100, 200, and 300. The y-axis is perpendicular to the x-axis and generally parallel to leading edges 106, 206, and 306 of respective airfoils 100, 200, and 300. The z-axis is perpendicular to the x-axis and the y-axis.

Illustrative, non-exhaustive examples, which may or may not be claimed, of the subject matter according the present disclosure are provided below.

Referring generally to FIG. 1 and particularly to, e.g., FIGS. 4-9, airfoil 100 is disclosed. Airfoil 100 comprises skin 110, comprising external surface 112 and internal surface 114, opposite external surface 112. Skin 110 is magnetically and electrically conductive. Airfoil 100 also comprises interior space 108, formed by skin 110. Internal surface 114 of skin 110 faces interior space 108. Airfoil 100 additionally comprises leading edge 106 along external surface 112 of skin 110. Airfoil 100 further comprises hybrid acoustic induction-heating system 102, configured to impede formation of ice on external surface 112 of skin 110. Hybrid acoustic induction-heating system 102 comprises induction coil 130 within interior space 108. At least portion 136 of induction coil 130 is sufficiently close to internal surface 114 of skin 110 to produce eddy current 180 in skin 110 when alternating electrical current 134 is flowing in induction coil 130. Hybrid acoustic induction-heating system 102 also comprises at least one magnet 140 within interior space 108. At least one magnet 140 is configured to produce steady-state magnetic field 182 within skin 110. The preceding subject matter of this paragraph characterizes example 1 of the present disclosure.

Airfoil 100 is configured to impede, prevent, reduce, and/or remove ice that may form on skin 110. Ice on an airfoil may disturb the aerodynamic flow of air over the airfoil. Use of airfoil 100 may impede, prevent, reduce, and/or remove ice on airfoil 100 and, thus, may eliminate or reduce the effects of ice on airfoil 100. Airfoil 100 is configured to use both inductive heat and acoustic vibrations to impede, prevent, reduce, and/or remove ice on airfoil 100. Inductive heat may be used to increase and/or to maintain the temperature of skin 110, in particular external surface 112 and/or leading edge 106. The temperature of skin 110, in particular external surface 112 and/or leading edge 106, to impede, prevent, reduce, and/or to remove ice generally is above the freezing point of water. Acoustic vibrations may be used to keep external surface 112, and in particular leading edge 106, non-static (vibrating). A static (non-vibrating) structure may be more amenable to ice nucleation, moisture adhesion, and/or heat transfer to moisture particles than a non-static (vibrating) structure. The combination of inductive heat and acoustic vibrations may more efficiently impede, prevent, reduce, and/or remove ice from an airfoil than use of either technique alone.

Airfoil 100 is a body shaped to provide a desired reaction force when in motion relative to a surrounding fluid (e.g., air). Relevant to icing, the fluid may include moisture that may impact airfoil 100 and may tend to form ice on airfoil 100 if hybrid acoustic induction-heating system 102 is not operative. Leading edge 106 is the foremost edge of airfoil 100 or an edge that meets the fluid first as airfoil 100 moves therethrough.

Airfoil 100 includes induction coil 130 and at least one magnet 140 within interior space 108. Hence, induction coil 130 and magnet 140 are not exposed at exterior surface 112 and do not affect the aerodynamic airflow across airfoil 100.

Skin 110 is magnetically conductive so that a magnetic field is will tend to concentrate within skin 110. Skin 110 is magnetically conductive at temperatures near and below the freezing point of water, and above the lowest operating temperature for airfoil 100. In addition to being magnetically conductive, skin 110 may be a soft magnetic material (easily magnetized and demagnetized) and/or a ferromagnetic material (exhibiting a large, positive, non-linear susceptibility to an external magnetic field).

Ferromagnetic materials exhibit saturation, a maximum magnetic field (B-field) within the material, and a Curie temperature, the temperature above which the ferromagnetic material does not exhibit spontaneous magnetism. With regard to magnetism, materials may be magnetic or non-magnetic. Magnetic materials are ferromagnetic. As used herein, ferromagnetic materials include ferrimagnetic materials. Magnetic materials and ferromagnetic materials are not necessarily permanent magnets. Ferromagnetic materials do not necessarily include iron. Non-magnetic materials are paramagnetic (exhibiting a small, positive, substantially linear susceptibility to an external magnetic field) or diamagnetic (exhibiting a small, negative, substantially linear susceptibility to an external magnetic field).

Skin 110 is electrically conductive so that eddy current 180 will form in skin 110 and so that skin 110 is susceptible to inductive heat. Inductive heat heats an electrically conductive object by applying an alternating magnetic field to the object. The alternating magnetic field causes eddy current 180 to circulate on the object. Eddy current 180 causes resistive heating (also called Joule heating) due to the electrical resistance of the electrically conductive object. Eddy current 180 and consequent heat generation are confined generally to a thin surface region of the object characterized by the frequency-dependent skin depth parameter. The skin depth (also called the electrical skin depth and the electromagnetic skin depth) is proportional to the inverse square root of the frequency of the alternating magnetic field. The efficiency of inductive heat is related to the intensity and frequency of the alternating magnetic field, the geometry of induction coil 130, the relative size and position of induction coil 130 and skin 110, and the material of skin 110.

Materials for skin 110 may be selected for suitability as the external surface of an airfoil (e.g., external surface 112 of airfoil 100). Properties that may be selected comprise high magnetic permeability (magnetic conductivity), suitable electrical conductivity, strength, environmental resistance, abrasion resistance, and coefficient of temperature variation.

Induction coil 130 is configured to produce an alternating magnetic field when alternating electrical current 134 is flowing through induction coil 130. Induction coil 130 is a coil of wire configured to carry alternating electrical current 134 therethrough. The wire is electrically conductive, generally with low resistance (e.g., copper or aluminum wire). The wire of induction coil 130 is wound generally in a spiral or helical pattern such that the wire forms parallel loops with sections of parallel wires. The loops and the individual wire segments of the parallel wires are electrically isolated such that electrical current follows the path of the wire and does not short between loops or the parallel wires. The wire may be a solid conductor, an assembly of individual conductors, and/or an assembly of electrically isolated conductors. For example, higher efficiency alternating electrical current flow (less current crowding) may be achieved by using a Litz wire configuration (a braided assembly of electrically isolated wires used as a single wire).

Portion 136 of induction coil 130 is a portion of parallel wire of induction coil 130. Generally, portion 136 is a portion of the virtual surface of induction coil. The shape of induction coil 130 and portion 136 of induction coil 130 is defined by the exterior form of induction coil. For example, induction coil 130 may be formed of a helix of wire. The exterior form of a regular helix is a cylinder. Such induction coil 130 may be referred to as a cylindrical induction coil. Portion 136 of a cylindrical induction coil is a segment of the cylinder that defines the exterior form of the cylindrical induction coil.

Portion 136 of induction coil 130 is located sufficiently close to internal surface 114 of skin 110 to produce eddy current 180 in skin 110 when alternating electrical current 134 is flowing in induction coil 130. Hence, induction coil 130 may be called inductively coupled to skin 110. If induction coil 130 and portion 136 of induction coil 130 are not sufficiently close to skin 110 and internal surface 114 of skin 110, no significant eddy current 180 will be produced in skin 110 and therefore induction coil 130 would not be positioned to inductively heat skin 110.

Magnet 140 is configured to produce steady-state magnetic field 182 (also referred to as a DC magnetic field) within skin 110. Magnet 140 also may be referred to as magnetic source. Steady-state magnetic field 182 generally interacts with electrical currents (such as eddy current 180) within skin 110 to produce force 184 (Lorentz force) within skin 110. The Lorenz force is proportional to the cross product of the velocity of a charged particle (such as an electron) and the magnetic field (B field), in the absence of an applied electric field. Force 184 due to alternating electrical currents (such as eddy current 180) within skin 110 interacting with steady-state magnetic field 182 within skin 110 produces acoustic vibrations within skin 110 (at twice the frequency of the alternating electrical current). Force 184 is absent (or zero) when eddy current 180 within skin 110 and steady-state magnetic field 182 are parallel. All other things being equal, force 184 is a maximum when eddy current 180 within skin 110 and steady-state magnetic field 182 are perpendicular.

Thus, by use of alternating electrical current 134 in induction coil 130, eddy current 180 is generated in skin 110 to inductively heat skin 110 directly, without requiring thermal contact to a heat source (e.g., no heating element is required). The interaction of eddy current 180 with steady-state magnetic field 182 generates force 184 and acoustic vibrations directly in skin 110, without requiring acoustic contact to a sound source (e.g., no acoustic transducer such as piezoelectric element is required).

As used herein acoustic refers to sound waves and may indicate audible (e.g., sonic) and/or inaudible (e.g., ultrasonic, infrasonic) frequencies. Higher frequencies have shorter wavelengths. The acoustic frequency (and the alternating electrical current frequency) may affect the efficiency of impeding, preventing, reducing, and/or removing ice from airfoil 100. Generally higher frequencies produce a more capable acoustic wave (i.e., generation of acoustic pressure is more efficient).

Because magnet 140 is within interior space 108 of airfoil 100 and skin 110 is magnetically conductive (and/or ferromagnetic), most or all of the resultant magnetic field (such as steady-state magnetic field 182) is contained within airfoil 100. Magnetic field lines that would otherwise extend beyond skin 110, if skin 110 were not present (or not magnetically conductive and/or ferromagnetic), are substantially redirected within skin 110. Thus, little to no magnetic field from magnet 140 is present outside of airfoil 100. Hence, special precautions for operating near high magnetic fields are not needed for personnel, tools, or equipment operating outside of airfoil 100.

Steady-state magnetic field 182 may be a permanent magnetic field (e.g., from permanent magnet 142), or may be controllable (e.g., from electromagnet 144). Where controllable, steady-state magnetic field 182 may be turned on or off as desired to actuate the acoustic vibrations in skin 110. In addition to controlling acoustic vibrations, a controllable steady-state magnetic field may be turned off to eliminate high magnetic fields within airfoil 100. Thus, special precautions for operating near high magnetic fields within airfoil 100 may be avoided.

The following subject matter of this paragraph characterizes example 2 of the present disclosure, wherein example 2 also includes the subject matter according to example 1, above. Referring generally to FIG. 1 and particularly to, e.g., FIGS. 4-9, at a location in skin 110, steady-state magnetic field 182, produced by at least one magnet 140, is transverse to eddy current 180.

Eddy current 180 is the result alternating electrical current 134 flowing in induction coil 130. Eddy current 180 may be represented as one or more mirror currents (virtual currents) within skin 110 that flow in the opposite direction of (and at the same frequency as) alternating electrical current 134 and at a position in skin 110 that is a mirror image of the position of the parallel wires carrying alternating electrical current 134 (with respect to internal surface 114). If eddy current 180 is transverse to steady-state magnetic field 182, moving charges that make up eddy current 180 experience force 184. The force 184 on eddy current 180 results in acoustic vibrations in skin 110 (at twice the frequency of eddy current 180 and twice the frequency of alternating electrical current 134). As used herein, transverse means not parallel. Transverse arrangements encompass perpendicular arrangements.

The following subject matter of this paragraph characterizes example 3 of the present disclosure, wherein example 3 also includes the subject matter according to any one of examples 1 to 2, above. Referring generally to FIG. 1 and particularly to, e.g., FIGS. 6-7, induction coil 130 has a sheet form.

A sheet-form induction coil also may be referred to as a flat induction coil, a pancake induction coil, and/or a planar induction coil. In a sheet-form induction coil, the wire of the induction coil is spiraled into the shape of a substantially two-dimensional (2D) surface. The virtual 2D surface does not need to be a plane or flat. The virtual 2D surface may be a surface of a virtual three-dimensional (3D) structure such as the shape of the interior of airfoil 100, interior space 108, and/or internal surface 114 of skin 110. A sheet-form induction coil produces a magnetic field perpendicular to the sheet, at the core of the sheet-form induction coil (center of the spiral of wire). Sheet-form induction coils have high inductive coupling to skin 110 on opposite sides of the sheet that defines the shape of the sheet-form induction coil.

The following subject matter of this paragraph characterizes example 4 of the present disclosure, wherein example 4 also includes the subject matter according to any one of examples 1 to 3, above. Referring generally to FIG. 1 and particularly to, e.g., FIGS. 4-5 and 8-9, induction coil 130 has a volumetric form.

A volumetric-form induction coil is a coil that encloses a core volume with the center of the spiral of wire within the core volume. A sheet-form induction coil may or may not enclose a core volume (e.g., a sheet-form induction coil may conform to the shape of a cylindrical shell) but the center of the spiral of wire is within the sheet. Generally, a volumetric-form coil would be substantially tube-like with the wire spiraled around the outside of the virtual tube (e.g., the classical shape of a wire-wound inductor). A volumetric-form induction coil produces a magnetic field parallel to the center of the spiral of wire and generally parallel to the longitudinal axis of the enclosed volume.

The following subject matter of this paragraph characterizes example 5 of the present disclosure, wherein example 5 also includes the subject matter according to any one of examples 1 to 4, above. Referring generally to FIG. 1 and particularly to, e.g., FIGS. 4-9, at least portion 136 of induction coil 130 is no more than 10 mm away from internal surface 114 of skin 110.

Portion 136 of induction coil 130 is proximate to skin 110 and internal surface 114 of skin 110. When portion 136 is closer to skin 110 and internal surface 114 of skin 110, portion 136 of induction coil 130 may be better inductively coupled to skin 110 and/or may produce stronger eddy current 180. Hence, the distance between portion 136 of induction coil 130 and internal surface 114 of skin 110 affects the efficiency of applying inductive and acoustic pressure (also referred to as acoustic energy) within skin 110.

The following subject matter of this paragraph characterizes example 6 of the present disclosure, wherein example 6 also includes the subject matter according to example 5, above. Referring generally to FIG. 1 and particularly to, e.g., FIGS. 4-9, at least portion 136 of induction coil 130 is no more than 1 mm away from internal surface 114 of skin 110.

To improve efficiency, portion 136 of induction coil 130 is very close to internal surface 114 of skin 110. Generally, portion 136 may be within a small integer multiple of the thickness of skin 110 and/or within a small integer multiple of the skin depth of the material of skin 110 at the frequency of alternating electrical current 134.

The following subject matter of this paragraph characterizes example 7 of the present disclosure, wherein example 7 also includes the subject matter according to any one of examples 1 to 6, above. Referring generally to FIG. 1 and particularly to, e.g., FIGS. 4-9, at least portion 136 of induction coil 130 is parallel to skin 110.

Portion 136 of induction coil 130 may be located parallel to skin 110 to provide a substantially constant distance between skin 110 (i.e., internal surface 114 of skin 110) and portion 136 of induction coil 130. The constant distance may provide a substantially uniform coupling efficiency for inductive heat and/or a substantially uniform eddy current 180 across skin 110 that is parallel to portion 136. Portion 136 and/or substantially all of induction coil 130 (e.g., where induction coil 130 has a sheet form) may be substantially conformal to internal surface 114 of skin 110.

The following subject matter of this paragraph characterizes example 8 of the present disclosure, wherein example 8 also includes the subject matter according to any one of examples 1 to 7, above. Referring generally to FIG. 1, airfoil 100 is selected from the group consisting of a wing, an erosion shield, an empennage, a horizontal stabilizer, a vertical stabilizer, a winglet, a turbine-engine inlet, an engine nacelle, and a turbine blade.

Airfoil 100 may be a portion of an aircraft or other structure with aerodynamic surfaces. Such aircraft or structures may include one or more airfoils 100 and may include other aerodynamic surfaces that are not airfoils 100. Use of airfoils 100 on an aircraft or other structure may protect that aircraft or structure from the effects of ice formation. An erosion shield is a section of an aerodynamic surface configured to resist erosion due to air flow impinging the leading edge of the aerodynamic surface. An erosion shield may form all or a substantial portion of a leading edge such as leading edge 106. An empennage may include a horizontal stabilizer and/or a vertical stabilizer. A common empennage configuration includes a single vertical stabilizer and a pair of horizontal stabilizers. Horizontal stabilizers are not necessarily horizontal when the corresponding aircraft is resting in a parked configuration on the ground. Vertical stabilizers are not necessarily vertical when the corresponding aircraft is resting in a parked configuration on the ground.

The following subject matter of this paragraph characterizes example 9 of the present disclosure, wherein example 9 also includes the subject matter according to any one of examples 1 to 8, above. Referring generally to FIG. 1 and particularly to, e.g., FIGS. 4-9, at least portion 136 of induction coil 130 is closer to leading edge 106 than any other portion of induction coil 130 and is positioned to heat leading edge 106.

Generally, induction coil 130 is positioned to heat and to apply acoustic pressure to leading edge 106 and regions of external surface 112 proximate to leading edge 106. Generally, ice formation and/or accumulation effects are strong at and near the leading edge of an aerodynamic structure.

The following subject matter of this paragraph characterizes example 10 of the present disclosure, wherein example 10 also includes the subject matter according to any one of examples 1 to 9, above. Referring generally to FIG. 1 and particularly to, e.g., FIGS. 8-9, at least portion 136 of induction coil 130 is transverse to leading edge 106.

Portion 136 of induction coil 130 is transverse to leading edge 106 when the parallel wires in portion 136 are transverse to leading edge 106. The direction of the parallel wires defines the direction of eddy current 180 within skin 110. Hence, where portion 136 of induction coil 130 is transverse to leading edge 106, eddy current 180 due to portion 136 of induction coil 130 with alternating current 134 flowing therethrough is transverse to leading edge 106. As force 184 is perpendicular to eddy current 180, force 184, in this arrangement, may be perpendicular to leading edge 106 (i.e., in the x-direction) or parallel to leading edge 106 (i.e., in the y-direction).

The following subject matter of this paragraph characterizes example 11 of the present disclosure, wherein example 11 also includes the subject matter according to any one of examples 1 to 9, above. Referring generally to FIG. 1 and particularly to, e.g., FIGS. 4-7, at least portion 136 of induction coil 130 is parallel to leading edge 106.

Portion 136 of induction coil 130 is parallel to leading edge 106 when the parallel wires in portion 136 are parallel to leading edge 106. The direction of the parallel wires defines the direction of eddy current 180 within skin 110. Hence, where portion 136 of induction coil 130 is parallel to leading edge 106, eddy current 180 due to portion 136 of induction coil 130 with alternating current 134 flowing therethrough is parallel to leading edge 106. As force 184 is perpendicular to eddy current 180, force 184, in this arrangement, may be perpendicular to leading edge 106 (e.g., in the x-direction or the z-direction).

The following subject matter of this paragraph characterizes example 12 of the present disclosure, wherein example 12 also includes the subject matter according to any one of examples 1 to 11, above. Referring generally to FIG. 1 and particularly to, e.g., FIGS. 4-9, at least one magnet 140 is permanent magnet 142.

Permanent magnet 142 produces a magnetic field without electronics or electrical current flow. Hence, use of permanent magnet 142 may simplify construction and/or control of airfoil 100 and/or hybrid acoustic induction-heating system 102.

The following subject matter of this paragraph characterizes example 13 of the present disclosure, wherein example 13 also includes the subject matter according to any one of examples 1 to 12, above. Referring generally to FIG. 1 and particularly to, e.g., FIGS. 4-9, at least one magnet 140 is electromagnet 144.

Electromagnet 144 produces steady-state magnetic field 182 when a steady-state (direct current, DC) electrical current flows through a coil. The magnetic field may be turned on or off by controlling the electrical current flow. Additionally or alternatively, the magnetic field strength and direction may be adjusted according to the electrical current flow. Electromagnet 144 generally is controllable and may be referred to as a controllable magnet. Induction coil 130 may serve as the coil of electromagnet 144. Induction coil 130 may be adapted to flow steady-state electrical current so that induction coil 130 may produce steady-state magnetic field 182. The steady-state electrical current to produce steady-state magnetic field 182 is typically much greater (has a much greater magnitude) than the amplitude of alternating electrical current 134. Hence, induction coil 130 adapted to flow steady-state electrical current may have wires with a higher cross section (lower resistance) than corresponding wires of induction coil 130 that is adapted to flow only alternating electrical current 134.

The following subject matter of this paragraph characterizes example 14 of the present disclosure, wherein example 14 also includes the subject matter according to any one of examples 1 to 13, above. Referring generally to FIG. 1 and particularly to, e.g., FIGS. 4-9, at least one magnet 140 is a plurality of magnets.

The plurality of magnets may be arranged to position and/or direct steady-state magnetic field 182 to generate force 182 in suitable positions and/or directions. At least one magnet 140 may comprise one or more permanent magnets 142 and/or one or more electromagnets 144.

The following subject matter of this paragraph characterizes example 15 of the present disclosure, wherein example 15 also includes the subject matter according to any one of examples 1 to 14, above. Referring generally to FIG. 1 and particularly to, e.g., FIGS. 4-9, steady-state magnetic field 182, produced by at least one magnet 140, is transverse to at least portion 136 of induction coil 130.

Steady-state magnetic field 182 is transverse to portion 136 of induction coil 130 when steady-state magnetic field 182 is transverse to the parallel wires of portion 136. Steady-state magnetic field 182 forms loops of magnetic field lines (as do all magnetic fields). When specifying a direction for a magnetic field such as steady-state magnetic field 182, the direction is specified at the location of the corresponding structure, unless otherwise explicitly stated. For example, in example 15, steady-state magnetic field 182 is transverse to portion 136 of induction coil 130 at portion 136 of induction coil 130. Hence, steady-state magnetic field 182 at the parallel wires of portion 136 is transverse to the parallel wires of portion 136. The direction of parallel wires of induction coil 130 determines the direction of eddy currents 180 within skin 110. Generating steady-state magnetic field 182 transverse to portion 136 generally produces steady-state magnetic field 182 transverse to eddy current 180. Steady-state magnetic field 182 being transverse to eddy current 180 generates force 184.

The following subject matter of this paragraph characterizes example 16 of the present disclosure, wherein example 16 also includes the subject matter according to any one of examples 1 to 15, above. Referring generally to FIG. 1 and particularly to, e.g., FIGS. 4-9, steady-state magnetic field 182, produced by at least one magnet 140, is transverse to skin 110 at internal surface 114 of skin 110.

Eddy current 180 is within skin 110 and hence is substantially parallel to skin 110. Steady-state magnetic field 182 is transverse to eddy current 180 when also transverse to internal surface 114 of skin 110. Steady-state magnetic field 182 being transverse to eddy current 180 generates force 184.

The following subject matter of this paragraph characterizes example 17 of the present disclosure, wherein example 17 also includes the subject matter according to any one of examples 1 to 16, above. Referring generally to FIG. 1 and particularly to, e.g., FIGS. 6-9, steady-state magnetic field 182, produced by at least one magnet 140, is transverse to a portion of internal surface 114 of skin 110 that is closest to leading edge 106.

Portion of internal surface 114 of skin 110 that is closest to leading edge 106 also may be referred to as the portion of internal surface 114 that is directly opposite, directly behind, and/or directly downstream of leading edge 106. Leading edge 106 is on external surface 112 of skin 110. A position on internal surface 114 of skin 110 that is closest to leading edge 106 is a position on internal surface 114 that is separated by leading edge 106 by the thickness of skin 110. The distance between a point, line, and/or plane to another point, line, and/or plane is the geometric distance between the objects, which is the shortest perpendicular distance. Having steady-state magnetic field 182 transverse to skin 110 (and hence eddy current 180) near leading edge 106 permits applying inductive heat and acoustic pressure to skin 110 near leading edge 106. As force 184 is perpendicular to eddy current 180, force 184, in this arrangement, may be parallel to leading edge 106 (i.e., in the y-direction) or perpendicular to leading (i.e., in the z-direction).

The following subject matter of this paragraph characterizes example 18 of the present disclosure, wherein example 18 also includes the subject matter according to any one of examples 1 to 16, above. Referring generally to FIG. 1 and particularly to, e.g., FIGS. 4-5, steady-state magnetic field 182, produced by at least one magnet 140, is parallel to leading edge 106 at a portion of internal surface 114 of skin 110 that is closest to leading edge 106.

Having steady-state magnetic field 182 parallel to leading edge 106 (and hence eddy current 180) near leading edge 106 permits applying inductive heat and acoustic pressure to skin 110 near leading edge 106. As force 184 is perpendicular to eddy current 180, force 184, in this arrangement, may be perpendicular to leading edge 106 (i.e., in the x-direction).

The following subject matter of this paragraph characterizes example 19 of the present disclosure, wherein example 19 also includes the subject matter according to any one of examples 1 to 18, above. Referring generally to FIG. 1 and particularly to, e.g., FIGS. 4-9, steady-state magnetic field 182, produced by at least one magnet 140, has a magnitude greater than 0.1 T (tesla) and less than 100 T.

Steady-state magnetic field 182 is sufficiently strong so as to cause significant acoustic pressure in skin 110 when steady-state magnetic field 182 interacts with eddy current 180 caused by alternating electrical current 134 in induction coil 130. Steady-state magnetic field 182 may be a strong magnetic field, with a magnitude greater than 0.1 T, and a magnetic field that is practical to generate with permanent magnet 142 or electromagnet 144 within airfoil 100.

The following subject matter of this paragraph characterizes example 20 of the present disclosure, wherein example 20 also includes the subject matter according to any one of examples 1 to 19, above. Referring generally to FIG. 1 and particularly to, e.g., FIGS. 4, 6, and 8, airfoil 100 further comprises control system 150. Skin 110 has controlled region 116, in which eddy current 180 is produced when alternating electrical current 134 is flowing in induction coil 130. Control system 150 is configured to supply alternating electrical current 134 to induction coil 130 to generate inductive heat and acoustic pressure in controlled region 116 of skin 110.

Control system 150 may be used to control the amount and timing of generation of inductive heat and acoustic pressure to impede, to prevent, to reduce, and/or to remove ice on airfoil 100.

The following subject matter of this paragraph characterizes example 21 of the present disclosure, wherein example 21 also includes the subject matter according to example 20, above. Referring generally to FIG. 1 and particularly to, e.g., FIGS. 4, 6, and 8, control system 150 is configured to supply alternating electrical current 134 based, at least in part, on an ambient temperature of layer of fluid 118 flowing over external surface 112 of skin 110.

Layer of fluid 118 flowing over external surface 112 of skin 110 generally is air that may include moisture. When the ambient temperature of the fluid is low enough, moisture from the fluid may accumulate on external surface 112 of skin 110 as ice, e.g., moisture may freeze on contact with external surface 112 of skin 110. Hence, controlling the supply of alternating electrical current 134 based on the ambient temperature permits selectively applying inductive heat and acoustic pressure when ambient conditions may cause icing.

The following subject matter of this paragraph characterizes example 22 of the present disclosure, wherein example 22 also includes the subject matter according to example 21, above. Referring generally to FIG. 1, airfoil 100 further comprises temperature sensor 160, configured to measure the ambient temperature of layer of fluid 118 flowing over external surface 112 of skin 110.

Temperature sensor 160 is configured to measure the ambient temperature and configured such that control system 150 may determine the ambient temperature through use of temperature sensor. For example, temperature sensor 160 may transfer a signal representative of the ambient temperature to control system 150. Temperature sensor 160 may be configured to measure ambient temperature directly or indirectly. For example, temperature sensor 160 may be in direct thermal contact with layer of fluid 118 flowing over external surface 112 of skin 110. As another example, temperature sensor 160 may be configured to measure the temperature of a portion of external surface 112 of skin 110, which is in thermal contact with layer of fluid 118 flowing over external surface 112. Examples of temperature sensors 160 include a thermocouple, a resistance temperature detector, an infrared sensor, and a thermistor. Additionally or alternatively, one or more temperature sensors 160 may be remote from airfoil 100 and configured to measure a temperature characteristic of and/or related to the ambient temperature of layer of fluid 118 flowing over external surface 112 of skin 110.

The following subject matter of this paragraph characterizes example 23 of the present disclosure, wherein example 23 also includes the subject matter according to any one of examples 20 to 22, above. Referring generally to FIG. 1 and particularly to, e.g., FIGS. 4, 6, and 8, control system 150 is configured to supply alternating electrical current 134 to induction coil 130 based, at least in part, on an ambient temperature at an altitude of airfoil 100.

Ambient temperature at the altitude of airfoil 100 may be characteristic of and/or related to the ambient temperature of the layer of fluid flowing over external surface 112 of skin 110. Hence, controlling the supply of alternating electrical current 134 based on the ambient temperature at the altitude of airfoil 110 permits selectively applying inductive heat and acoustic pressure when the ambient conditions may cause icing. As used herein, altitude refers to elevation above sea level, and may be referred to as true altitude. The elevation above the ground below an elevated structure such as an aircraft may be referred to as absolute altitude to distinguish absolute altitude from altitude (true altitude).

The following subject matter of this paragraph characterizes example 24 of the present disclosure, wherein example 24 also includes the subject matter according to any one of examples 20 to 23, above. Referring generally to FIG. 1 and particularly to, e.g., FIGS. 4-9, alternating electrical current 134 has a frequency that is at least 100 kHz (kilohertz) and at most 10 MHz (megahertz).

The frequency of alternating electrical current 134 affects the skin depth of inductive heat as discussed above. Higher frequencies have thinner skin depths. Efficiency of inductive heat improves when the skin depth is similar to the thickness of skin 110. For example, the frequency of alternating electrical current 180 may be selected to produce skin depth that is a small integer divisor of the thickness of skin 110 (e.g., a skin depth of ½ to ¼ of the thickness of skin 110). Also, the frequency of alternating electrical current 134 is the frequency of eddy current 180 and half the frequency of the acoustic pressure generated by eddy current 180 interacting with steady-state magnetic field 182. Higher frequencies may lead to more efficient acoustic ice impediment, prevention, reduction, and/or removal. The frequency of alternating electrical current 134 may be selected to tune (e.g., to balance) the effects of inductive heat and acoustic pressure on ice impediment, prevention, reduction, and/or removal from airfoil 100.

The following subject matter of this paragraph characterizes example 25 of the present disclosure, wherein example 25 also includes the subject matter according to example 24, above. Referring generally to FIG. 1 and particularly to, e.g., FIGS. 4-9, the frequency of alternating electrical current 134 is at least 1 MHz.

Higher frequencies, such as a frequency at least 1 MHz, may emphasize the effects of acoustic pressure over the effects of inductive heat.

The following subject matter of this paragraph characterizes example 26 of the present disclosure, wherein example 26 also includes the subject matter according to any one of examples 20 to 25, above. Referring generally to FIG. 1 and particularly to, e.g., FIGS. 4-9, alternating electrical current 134 generates alternating magnetic field 186 with an amplitude that is less than a magnitude of steady-state magnetic field 182.

Alternating magnetic field 286 generates eddy current 180 within skin 110, with the amplitude of eddy current 180 related to the amplitude of alternating magnetic field 186. The amplitude of eddy current 180 affects the efficiency of inductive heat. The magnitude of steady-state magnetic field 182 affects the amplitude of force 184 that acts on skin 110 to produce acoustic pressure. Hence, the relative size of the amplitude of alternating magnetic field 186 and the magnitude of steady-state magnetic field 182 affects the relative contributions of inductive heat and acoustic pressure to impeding, preventing, reducing, and/or removing ice from airfoil 100. For the same field intensity (amplitude or magnitude), inductive heat would be more efficient that force generation.

The following subject matter of this paragraph characterizes example 27 of the present disclosure, wherein example 27 also includes the subject matter according to example 26, above. Referring generally to FIG. 1 and particularly to, e.g., FIGS. 4-9, a ratio of the amplitude of alternating magnetic field 186 to the magnitude of steady-state magnetic field 182 is less than 0.1 and greater than 0.0001.

The amplitude of alternating magnetic field 186 may be much smaller than the magnitude of steady-state magnetic field 182 to produce a system in which acoustic pressure has a significant, or more significant, contribution to impeding, preventing, reducing, and/or removing ice from airfoil 100.

The following subject matter of this paragraph characterizes example 28 of the present disclosure, wherein example 28 also includes the subject matter according to any one of examples 20 to 27, above. Referring generally to FIG. 1 and particularly to, e.g., FIGS. 6 and 8, control system 150 comprises power supply 154 and controller 152. Power supply 154 is configured to supply alternating electrical current 134 to induction coil 130. Controller 152 is programmed to receive signals, representative of first ambient conditions known to cause formation of the ice on external surface 112 of skin 110 and second ambient conditions known to impede formation of the ice on external surface 112. The first ambient conditions and the second ambient conditions both comprise an ambient temperature of layer of fluid 118 flowing over external surface 112 of skin 110. Controller 152 is programmed to cause power supply 154 to supply alternating electrical current 134 to induction coil 130 to generate inductive heat and acoustic pressure in controlled region 116 of skin 110, based upon the first ambient conditions. Controller 152 is programmed to cause power supply 154 to discontinue supplying alternating electrical current 134 to induction coil 130, based upon the second ambient conditions.

Power supply 154 is configured to selectively supply alternating electrical current 134 to induction coil 130, thereby selectively producing eddy current 180, inductive heat, and/or acoustic pressure in skin 110.

Controller 152 may be configured to turn on and off power supply 154 and thus to control the application of inductive heat and acoustic pressure based upon ambient conditions (e.g., first ambient conditions and second ambient conditions) which may otherwise cause ice to form or impede ice from forming on external surface 112 of skin 110. Controller 152 may be a computer (e.g., comprising a processor and memory) and/or dedicated hardware. Controller 152 may implement its functions (e.g., receiving signals, causing power supply 154 to supply current, and causing power supply 154 to discontinue supplying current) in software, firmware, and/or hardware. Controller 152 may be referred to as an embedded computer and/or an embedded system.

The following subject matter of this paragraph characterizes example 29 of the present disclosure, wherein example 29 also includes the subject matter according to example 28, above. Referring generally to FIG. 1 and particularly to, e.g., FIGS. 6 and 8, controller 152 is also programmed to cause power supply 154 to supply alternating electrical current 134 to induction coil 130 when the ambient temperature of layer of fluid 118 flowing over external surface 112 of skin 110 is below a first threshold temperature.

Controller 152 may be configured to cause power supply 154 to supply current based on the ambient temperature being below a first threshold temperature such as a temperature known to permit ice to accumulate on external surface 112 of airfoil 100. The first threshold temperature may be a predetermined threshold or may be a function of other parameters (e.g., the temperature of external surface 112 of airfoil 100, humidity, operation time of hybrid acoustic induction-heating system 102, etc.).

The following subject matter of this paragraph characterizes example 30 of the present disclosure, wherein example 30 also includes the subject matter according to example 29, above. Referring generally to FIG. 1 and particularly to, e.g., FIGS. 6 and 8, the first threshold temperature is above freezing point of water and below 5° C.

The temperature range from the freezing point of water to 5° C. is a range in which water impacting airfoil 100 may transition from remaining liquid to accumulating as ice. Hence, the first threshold being within this range is a reasonable predictor of the need to turn on the inductive heat and acoustic pressure to impede, to prevent, to reduce, and/or to remove ice from airfoil 100.

The following subject matter of this paragraph characterizes example 31 of the present disclosure, wherein example 31 also includes the subject matter according to any one of examples 29 to 30, above. Referring generally to FIG. 1 and particularly to, e.g., FIGS. 6 and 8, controller 152 is also programmed to cause power supply 154 to discontinue supplying alternating electrical current 134 to induction coil 130 when the ambient temperature of layer of fluid 118 flowing over external surface 112 of skin 110 is above a second threshold temperature.

Controller 152 may be configured to cause power supply 154 to discontinue supplying current based on the ambient temperature being above a second threshold temperature such as a temperature known to not significantly permit ice to accumulate on external surface 112 of airfoil 100. The second threshold temperature may be a predetermined threshold or may be a function of other parameters (e.g., the temperature of external surface 112 of airfoil 100, humidity, operation time of hybrid acoustic induction-heating system 102, etc.).

The following subject matter of this paragraph characterizes example 32 of the present disclosure, wherein example 32 also includes the subject matter according to example 31, above. Referring generally to FIG. 1 and particularly to, e.g., FIGS. 6 and 8, the second threshold temperature is different than the first threshold temperature.

The second threshold temperature value may be the same as or different than the first threshold temperature value. Different values for the second threshold temperature and the first threshold temperature permit the controller to turn on or off the inductive heat and acoustic pressure at different temperatures.

The following subject matter of this paragraph characterizes example 33 of the present disclosure, wherein example 33 also includes the subject matter according to any one of examples 31 to 32, above. Referring generally to FIG. 1 and particularly to, e.g., FIGS. 6 and 8, the second threshold temperature is greater than the first threshold temperature.

The second threshold temperature being higher than the first threshold temperature tends to prevent oscillation in the turning on and turning off of the inductive heat and acoustic pressure. If the second threshold temperature is the same as the first threshold temperature, small variations in the ambient temperature about the single temperature threshold may cause to controller 152 to command power supply 154 in contrary manners in rapid succession. If by supplying alternating electrical current 134, the ambient temperature is increased, the act of causing power supply 154 to supply current could cause the ambient temperature to rise and thereby cause controller 152 to cause power supply 154 to discontinue supplying current, with the likely consequence of reducing the ambient temperature. Such conditions could cause controller 152 and hybrid acoustic induction-heating system 102 to oscillate and ineffectively supply inductive heat and acoustic pressure.

The following subject matter of this paragraph characterizes example 34 of the present disclosure, wherein example 34 also includes the subject matter according to any one of examples 1 to 33, above. Referring generally to FIG. 1 and particularly to, e.g., FIGS. 6 and 8, the second threshold temperature is above 2° C. and below 10° C.

The temperature range from above 2° C. to below 10° C. is a range in which water impacting airfoil 100 may transition from accumulating as ice to remaining liquid. Hence, the second threshold being within this range is a reasonable predictor of the need to turn off the inductive heat and acoustic pressure to impede, to prevent, to reduce, and/or to remove ice from airfoil 100.

The following subject matter of this paragraph characterizes example 35 of the present disclosure, wherein example 35 also includes the subject matter according to any one of examples 1 to 34, above. Referring generally to FIG. 1 and particularly to, e.g., FIGS. 4-9, skin 110 comprises a nickel-iron alloy.

Nickel-iron alloys are a class of alloys that are suitable for skin 110. Nickel-iron alloys are electrically and magnetically conductive, and are susceptible to inductive heat and acoustic pressure generation. Nickel-iron alloys consist primarily of nickel and iron. Concentrations of nickel may be about 20% to about 90%. Concentrations of iron may be about 10% to about 80%. Examples of specific nickel-iron alloys include MU-METAL-brand alloy, PERMALLOY-brand alloy, HYMU 80-brand alloy, and INVAR-brand alloy.

The following subject matter of this paragraph characterizes example 36 of the present disclosure, wherein example 36 also includes the subject matter according to any one of examples 1 to 35, above. Referring generally to FIG. 1 and particularly to, e.g., FIGS. 4-9, skin 110 has a thickness of less than 1 mm and greater than 0.001 mm.

Skin 110 generally is thin so that skin 110 may be affected rapidly by the inductive heat and acoustic pressure generated by hybrid acoustic induction-heating system 102. The thickness of skin 110 may be selected based on practical and/or desired frequencies of alternating electrical current 134 and/or skin depth at those frequencies. Skin 110 is thick enough to maintain structural integrity when subjected to conditions of airfoil 100.

The following subject matter of this paragraph characterizes example 37 of the present disclosure, wherein example 37 also includes the subject matter according to any one of examples 1 to 36, above. Referring generally to FIG. 1 and particularly to, e.g., FIGS. 4-9, skin 110 is ferromagnetic.

As discussed above, skin 110 may be ferromagnetic to concentrate magnetic fields within skin 110.

The following subject matter of this paragraph characterizes example 38 of the present disclosure, wherein example 38 also includes the subject matter according to any one of examples 1 to 37, above. Referring generally to FIG. 1 and particularly to, e.g., FIGS. 4-9, skin 110 has relative magnetic permeability of greater than 1,000 and less than 10,000,000.

Magnetic materials have a relative magnetic permeability significantly greater than unity. Non-magnetic materials have a relative magnetic permeability near unity. Higher relative magnetic permeabilities indicate a higher affinity for and concentration of magnetic fields within the material. Typical magnetic materials have a relative magnetic permeability greater than about 100. Highly magnetic materials have a relative magnetic permeability of greater than about 1,000. All known materials have a relative magnetic permeability of less than 10,000,000.

The following subject matter of this paragraph characterizes example 39 of the present disclosure, wherein example 39 also includes the subject matter according to any one of examples 1 to 38, above. Referring generally to FIG. 1 and particularly to, e.g., FIGS. 4-9, Curie temperature of skin 110 is less than 300° C. and greater than 50° C.

The Curie temperature is a transition temperature of ferromagnetic materials. Below the Curie temperature, the material has a high relative magnetic permeability. Above the Curie temperature, the material is paramagnetic with a lower relative magnetic permeability. If skin 110 becomes paramagnetic (as opposed to ferromagnetic or magnetically conductive at a particular temperature), the efficiency of inductive heat and/or generation of acoustic pressure will be significantly reduced. Hence, if the Curie temperature of skin 110 is sufficiently low, hybrid acoustic induction-heating system 102 may be configured to automatically cease significant induction-heating and/or acoustic pressure generation if skin 110 becomes too hot (e.g., in the event of a malfunction of hybrid acoustic induction-heating system 102 or excessive solar heating of airfoil 100).

The following subject matter of this paragraph characterizes example 40 of the present disclosure, wherein example 40 also includes the subject matter according to any one of examples 1 to 39, above. Referring generally to FIG. 1 and particularly to, e.g., FIG. 5, airfoil 100 further comprises electrical insulator 120 in interior space 108. Electrical insulator 120 is coupled to skin 110.

Electrically conductive and/or magnetically conductive materials within airfoil 100 may be heated and/or subject to acoustic pressure in a similar manner as skin 110. Hence, forms, supports, and other structures within airfoil 100 may be electrically insulating and/or located sufficiently far away from induction coil 130 and/or magnet 140.

The following subject matter of this paragraph characterizes example 41 of the present disclosure, wherein example 41 also includes the subject matter according to example 40, above. Referring generally to FIG. 1 and particularly to, e.g., FIG. 5, electrical insulator 120 supports skin 110.

Airfoils 100 may be constructed with an internal support, such as electrical insulator 120, to support skin 110 and/or induction coil 130, and/or to maintain the aerodynamic shape of airfoil 100.

The following subject matter of this paragraph characterizes example 42 of the present disclosure, wherein example 42 also includes the subject matter according to any one of examples 40 to 41, above. Referring generally to FIG. 1 and particularly to, e.g., FIG. 5, electrical insulator 120 supports at least one magnet 140.

Magnet(s) 140 may be supported by internal structure, such as electrical insulator 120, so that magnet(s) 140 is held in a fixed position relative to skin 110 and/or induction coil 130.

Referring generally to FIG. 2 and particularly to, e.g., FIGS. 10-13, airfoil 200 is disclosed. Airfoil 200 comprises skin 210, comprising external surface 212 and internal surface 214, opposite external surface 212. Skin 210 is magnetically and electrically conductive and has controlled region 216. Airfoil 200 also comprises interior space 208, formed by skin 210. Internal surface 214 of skin 210 faces interior space 208. Airfoil 200 additionally comprises leading edge 206 along external surface 212 of skin 210. Airfoil 200 further comprises hybrid acoustic induction-heating system 202, configured to impede formation of ice on external surface 212 of skin 210. Hybrid acoustic induction-heating system 202 comprises induction coil 230 within interior space 208. At least portion 236 of induction coil 230 is sufficiently close to internal surface 214 of skin 210 to produce eddy current 280 within controlled region 216 of skin 210 when alternating electrical current 234 is flowing in induction coil 230. Hybrid acoustic induction-heating system 202 also comprises control system 250, configured to generate inductive heat and acoustic pressure in controlled region 216 of skin 210 by supplying alternating electrical current 234 to induction coil 230 based, at least in part, on an ambient temperature of layer of fluid 218 flowing over external surface 212 of skin 210. The preceding subject matter of this paragraph characterizes example 43 of the present disclosure.

Airfoil 200 is configured to impede, prevent, reduce, and/or remove ice that may form on skin 210. Ice on an airfoil may disturb the aerodynamic flow of air over the airfoil. Use of airfoil 200 may impede, prevent, reduce, and/or remove ice on airfoil 200 and, thus, may eliminate or reduce the effects of ice on airfoil 200. Airfoil 200 is configured to use both inductive heat and acoustic vibrations to impede, prevent, reduce, and/or remove ice on airfoil 200. Inductive heat may be used to increase and/or to maintain the temperature of skin 210, in particular external surface 212 and/or leading edge 206. The temperature of skin 210, in particular external surface 212 and/or leading edge 206, to impede, prevent, reduce, and/or to remove ice generally is above the freezing point of water. Acoustic vibrations may be used to keep external surface 212, and in particular leading edge 206, non-static (vibrating).

Airfoil 200 is a body shaped to provide a desired reaction force when in motion relative to a surrounding fluid (e.g., air). Relevant to icing, the fluid may include moisture that may impact airfoil 200 and may tend to form ice on airfoil 200 if hybrid acoustic induction-heating system 202 is not operative. Leading edge 206 is the foremost edge of airfoil 200 or an edge that meets the fluid first as airfoil 200 moves therethrough.

Airfoil 200 includes induction coil 230 within interior space 208. Hence, induction coil 230 is not exposed at exterior surface 212 and does not affect the aerodynamic airflow across airfoil 200.

Skin 210 is magnetically conductive so that a magnetic field is will tend to concentrate within skin 210. Skin 210 is magnetically conductive at temperatures near and below the freezing point of water, and above the lowest operating temperature for airfoil 200. In addition to being magnetically conductive, skin 210 may be a soft magnetic material (easily magnetized and demagnetized) and/or a ferromagnetic material (exhibiting a large, positive, non-linear susceptibility to an external magnetic field).

Skin 210 is electrically conductive so that eddy current 280 will form in skin 210 and so that skin 210 is susceptible to inductive heat. Inductive heat heats an electrically conductive object by applying an alternating magnetic field to the object. The alternating magnetic field causes eddy current 280 to circulate on the object. Eddy current 280 causes resistive heating (also called Joule heating) due to the electrical resistance of the electrically conductive object. Eddy current 280 and consequent heat generation are confined generally to a thin surface region of the object characterized by the frequency-dependent skin depth parameter. The skin depth (also called the electrical skin depth and the electromagnetic skin depth) is proportional to the inverse square root of the frequency of the alternating magnetic field. The efficiency of inductive heat is related to the intensity and frequency of the alternating magnetic field, the geometry of induction coil 230, the relative size and position of induction coil 230 and skin 210, and the material of skin 210.

Materials for skin 210 may be selected for suitability as the external surface of an airfoil (e.g., external surface 212 of airfoil 200). Properties that may be selected comprise high magnetic permeability (magnetic conductivity), suitable electrical conductivity, strength, environmental resistance, abrasion resistance, and coefficient of temperature variation.

Induction coil 230 is configured to produce an alternating magnetic field when alternating electrical current 234 is flowing through induction coil 230. Induction coil 230 is a coil of wire configured to carry alternating electrical current 234 therethrough. The wire is electrically conductive, generally with low resistance (e.g., copper or aluminum wire). The wire of induction coil 230 is wound generally in a spiral or helical pattern such that the wire forms parallel loops with sections of parallel wires. The loops and the individual wire segments of the parallel wires are electrically isolated such that electrical current follows the path of the wire and does not short between loops or the parallel wires. The wire may be a solid conductor, an assembly of individual conductors, and/or an assembly of electrically isolated conductors. For example, higher efficiency alternating electrical current flow (less current crowding) may be achieved by using a Litz wire configuration (a braided assembly of electrically isolated wires used as a single wire).

Portion 236 of induction coil 230 is a portion of parallel wire of induction coil 230. Generally, portion 236 is a portion of the virtual surface of induction coil. The shape of induction coil 230 and portion 236 of induction coil 230 is defined by the exterior form of induction coil. For example, induction coil 230 may be formed of a helix of wire. The exterior form of a regular helix is a cylinder. Such induction coil 230 may be referred to as a cylindrical induction coil. Portion 236 of a cylindrical induction coil is a segment of the cylinder that defines the exterior form of the cylindrical induction coil.

Portion 236 of induction coil 230 is located sufficiently close to internal surface 214 of skin 210 to produce eddy current 280 within controlled region 216 of skin 210 when alternating electrical current 234 is flowing in induction coil 230. Hence, induction coil 230 may be called inductively coupled to skin 210. If induction coil 230 and portion 236 of induction coil 230 are not sufficiently close to skin 210 and internal surface 214 of skin 210, no significant eddy current 280 will be produced in skin 210 and therefore induction coil 230 would not be positioned to inductively heat skin 210.

Control system 250 may be used to control the amount and timing of generation of inductive heat and acoustic pressure to impede, to prevent, to reduce, and/or to remove ice on airfoil 200, in controlled region 216 of skin 210. Control system 250 controls the supply of alternating electrical current 234 to supply alternating electrical current 234 to induction coil 230 to generate inductive heat and acoustic pressure. By use of alternating electrical current 234 in induction coil 230, eddy current 280 is generated in skin 210 to inductively heat skin 210 directly, without requiring thermal contact to a heat source (e.g., no heating element is required).

Control system 250 controls generation of inductive heat and acoustic pressure based on the ambient temperature of layer of fluid 218 flowing over external surface 212 of skin 210. Layer of fluid 218 generally is air that may include moisture. When the ambient temperature of the fluid is low enough, moisture from the fluid may accumulate on external surface 212 of skin 210 as ice, e.g., moisture may freeze on contact with external surface 212 of skin 210. Hence, controlling the supply of alternating electrical current 234 based on the ambient temperature permits selectively applying inductive heat and acoustic pressure when ambient conditions may cause icing.

The following subject matter of this paragraph characterizes example 44 of the present disclosure, wherein example 44 also includes the subject matter according to example 43, above. Referring generally to FIG. 2 and particularly to, e.g., FIGS. 10-12, induction coil 230 has a sheet form.

A sheet-form induction coil also may be referred to as a flat induction coil, a pancake induction coil, and/or a planar induction coil. In a sheet-form induction coil, the wire of the induction coil is spiraled into the shape of a substantially two-dimensional (2D) surface. The virtual 2D surface does not need to be a plane or flat. The virtual 2D surface may be a surface of a virtual three-dimensional (3D) structure, such as the shape of the interior of airfoil 200, interior space 208, and/or internal surface 214 of skin 210. A sheet-form induction coil produces a magnetic field perpendicular to the sheet, at the core of the sheet-form induction coil (center of the spiral of wire). Sheet-form induction coils have high inductive coupling to skin 210 on opposite sides of the sheet that defines the shape of the sheet-form induction coil.

The following subject matter of this paragraph characterizes example 45 of the present disclosure, wherein example 45 also includes the subject matter according to any one of examples 43 to 44, above. Referring generally to FIG. 2 and particularly to induction coil 130 of FIGS. 4-5 and 8-9, induction coil 230 has a volumetric form.

A volumetric-form induction coil is a coil that encloses a core volume with the center of the spiral of wire within the core volume. A sheet-form induction coil may or may not enclose a core volume (e.g., a sheet-form induction coil may conform to the shape of a cylindrical shell) but the center of the spiral of wire is within the sheet. Generally, a volumetric-form coil would be substantially tube-like with the wire spiraled around the outside of the virtual tube (e.g., the classical shape of a wire-wound inductor). A volumetric-form induction coil produces a magnetic field parallel to the center of the spiral of wire and generally parallel to the longitudinal axis of the enclosed volume.

The following subject matter of this paragraph characterizes example 46 of the present disclosure, wherein example 46 also includes the subject matter according to any one of examples 43 to 45, above. Referring generally to FIG. 2 and particularly to, e.g., FIGS. 10-13, at least portion 236 of induction coil 230 is no more than 10 mm away from internal surface 214 of skin 210.

Portion 236 of induction coil 230 is proximate to skin 210 and internal surface 214 of skin 210. When portion 236 is closer to skin 210 and internal surface 214 of skin 210, portion 236 of induction coil 230 may be better inductively coupled to skin 210 and/or may produce stronger eddy current 280. Hence, the distance between portion 236 of induction coil 230 and internal surface 214 of skin 210 affects the efficiency of applying inductive and acoustic pressure (also referred to as acoustic energy) within skin 210.

The following subject matter of this paragraph characterizes example 47 of the present disclosure, wherein example 47 also includes the subject matter according to example 46, above. Referring generally to FIG. 2 and particularly to, e.g., FIGS. 10-13, at least portion 236 of induction coil 230 is no more than 1 mm away from internal surface 214 of skin 210.

To improve efficiency, portion 236 of induction coil 230 is very close to internal surface 214 of skin 210. Generally, portion 236 may be within a small integer multiple of the thickness of skin 210 and/or within a small integer multiple of the skin depth of the material of skin 210 at the frequency of alternating electrical current 234.

The following subject matter of this paragraph characterizes example 48 of the present disclosure, wherein example 48 also includes the subject matter according to any one of examples 43 to 47, above. Referring generally to FIG. 2 and particularly to, e.g., FIGS. 10-13, at least portion 236 of induction coil 230 is parallel to skin 210.

Portion 236 of induction coil 230 may be located parallel to skin 210 to provide a substantially constant distance between skin 210 (i.e., internal surface 214 of skin 210) and portion 236 of induction coil 230. The constant distance may provide a substantially uniform coupling efficiency for inductive heat and/or a substantially uniform eddy current 280 across skin 210 that is parallel to portion 236. Portion 236 and/or substantially all of induction coil 230 (e.g., where induction coil 230 has a sheet form) may be substantially conformal to internal surface 214 of skin 210.

The following subject matter of this paragraph characterizes example 49 of the present disclosure, wherein example 49 also includes the subject matter according to any one of examples 43 to 48, above. Referring generally to FIG. 2, airfoil 200 is selected from the group consisting of a wing, an erosion shield, an empennage, a horizontal stabilizer, a vertical stabilizer, a winglet, a turbine-engine inlet, an engine nacelle, and a turbine blade.

Airfoil 200 may be a portion of an aircraft or other structure with aerodynamic surfaces. Such aircraft or structures may include one or more airfoils 200 and may include other aerodynamic surfaces that are not airfoils 200. Use of airfoils 200 on an aircraft or other structure may protect that aircraft or structure from the effects of ice formation. An erosion shield may form all or a substantial portion of a leading edge such as leading edge 206.

The following subject matter of this paragraph characterizes example 50 of the present disclosure, wherein example 50 also includes the subject matter according to any one of examples 43 to 49, above. Referring generally to FIG. 2 and particularly to, e.g., FIGS. 10-13, at least portion 236 of induction coil 230 is closer to leading edge 206 than any other portion of induction coil 230 and is positioned to heat leading edge 206.

Generally, induction coil 230 is positioned to heat and to apply acoustic pressure to leading edge 206 and regions of external surface 212 proximate to leading edge 206. Generally, ice formation and/or accumulation effects are strong at and near the leading edge of an aerodynamic structure.

The following subject matter of this paragraph characterizes example 51 of the present disclosure, wherein example 51 also includes the subject matter according to any one of examples 43 to 50, above. Referring generally to FIG. 2 and particularly to, e.g., FIGS. 12-13, at least portion 236 of induction coil 230 is transverse to leading edge 206 in controlled region 216.

Portion 236 of induction coil 230 is transverse to leading edge 206 when the parallel wires in portion 236 are transverse to leading edge 206. The direction of the parallel wires defines the direction of eddy current 280 within skin 210. Hence, where portion 236 of induction coil 230 is transverse to leading edge 206, eddy current 280 due to portion 236 of induction coil 230 with alternating current 234 flowing therethrough is transverse to leading edge 206. As force 284 is perpendicular to eddy current 280, force 284, in this arrangement, may be perpendicular to leading edge 206 (i.e., in the x-direction) or parallel to leading edge 206 (i.e., in the y-direction).

The following subject matter of this paragraph characterizes example 52 of the present disclosure, wherein example 52 also includes the subject matter according to any one of examples 43 to 50, above. Referring generally to FIG. 2 and particularly to, e.g., FIGS. 10-11, at least portion 236 of induction coil 230 is parallel to leading edge 206 in controlled region 216.

Portion 236 of induction coil 230 is parallel to leading edge 206 when the parallel wires in portion 236 are parallel to leading edge 206. The direction of the parallel wires defines the direction of eddy current 280 within skin 210. Hence, where portion 236 of induction coil 230 is parallel to leading edge 206, eddy current 280 due to portion 236 of induction coil 230 with alternating current 234 flowing therethrough is parallel to leading edge 206. As force 284 is perpendicular to eddy current 280, force 284, in this arrangement, may be perpendicular to leading edge 206 (e.g., in the x-direction or the z-direction).

The following subject matter of this paragraph characterizes example 53 of the present disclosure, wherein example 53 also includes the subject matter according to any one of examples 43 to 52, above. Referring generally to FIG. 2 and particularly to, e.g., FIGS. 10-13, control system 250 is configured to supply direct electrical current 246 to induction coil 230 to generate steady-state magnetic field 282 within skin 210.

Direct electrical current 246 in induction coil 230 generates a magnetic field including steady-state magnetic field 282 (also referred to as a DC magnetic field) within skin 210. Steady-state magnetic field 282 generally interacts with electrical currents (such as eddy current 280) within skin 210 to produce force 284 (Lorentz force) within skin 210. The Lorenz force is proportional to the cross product of the velocity of a charged particle (such as an electron) and the magnetic field (B field), in the absence of an applied electric field. Force 284 due to alternating electrical currents (such as eddy current 280) within skin 210 interacting with steady-state magnetic field 282 within skin 210 produces acoustic vibrations within skin 210 (at twice the frequency of the alternating electrical current). Force 284 is absent (or zero) when eddy current 280 within skin 210 and steady-state magnetic field 282 are parallel. All other things being equal, force 284 is a maximum when eddy current 280 within skin 210 and steady-state magnetic field 282 are perpendicular. The interaction of eddy current 280 with steady-state magnetic field 282 generates force 284 and acoustic vibrations directly in skin 210, without requiring acoustic contact to a sound source (e.g., no acoustic transducer such as piezoelectric element is required).

Because induction coil 230 and the magnetic field generated by direct electrical current 246 in induction coil 230 are within interior space 208 of airfoil 200 and skin 210 is magnetically conductive (and/or ferromagnetic), most or all of the resultant magnetic field (such as steady-state magnetic field 282) is contained within airfoil 200. Magnetic field lines that would otherwise extend beyond skin 210, if skin 210 were not present (or not magnetically conductive and/or ferromagnetic), are substantially redirected within skin 210. Thus, little to no magnetic field from direct electrical current 246 in induction coil 230 is present outside of airfoil 200. Hence, special precautions for operating near high magnetic fields are not needed for personnel, tools, or equipment operating outside of airfoil 200.

Steady-state magnetic field 282 is controllable by control system 250 by supplying (or not) direct electrical current 246 to induction coil 230. Steady-state magnetic field 282 may be turned on or off as desired to actuate the acoustic vibrations in skin 210. In addition to controlling acoustic vibrations, a controllable steady-state magnetic field may be turned off to eliminate high magnetic fields within airfoil 200. Thus, special precautions for operating near high magnetic fields within airfoil 200 may be avoided.

The following subject matter of this paragraph characterizes example 54 of the present disclosure, wherein example 54 also includes the subject matter according to example 53, above. Referring generally to FIG. 2 and particularly to, e.g., FIG. 13, steady-state magnetic field 282, induced by direct electrical current 246, supplied to induction coil 230, is transverse to skin 210 at internal surface 214 of skin 210.

Eddy current 280 is within skin 210 and hence is substantially parallel to skin 210. Steady-state magnetic field 282 is transverse to eddy current 280 when also transverse to internal surface 214 of skin 210. Steady-state magnetic field 282 being transverse to eddy current 280 generates force 284.

The following subject matter of this paragraph characterizes example 55 of the present disclosure, wherein example 55 also includes the subject matter according to any one of examples 53 to 54, above. Referring generally to FIG. 2 and particularly to, e.g., FIG. 13, at a location in skin 210 between leading edge 206 and a portion of internal surface 214 of skin 210 that is closest to leading edge 206, steady-state magnetic field 282 is transverse to leading edge 206.

Portion of internal surface 214 of skin 210 that is closest to leading edge 206 also may be referred to as the portion of internal surface 214 that is directly opposite, directly behind, and/or directly downstream of leading edge 206. Leading edge 206 is on external surface 212 of skin 210. A position on internal surface 214 of skin 210 that is closest to leading edge 206 is a position on internal surface 214 that is separated by leading edge 206 by the thickness of skin 210. Having steady-state magnetic field 282 transverse to leading edge 206 (and hence eddy current 280) near leading edge 206 permits applying inductive heat and acoustic pressure to skin 210 near leading edge 206. As force 284 is perpendicular to eddy current 280, force 284, in this arrangement, may be parallel to leading edge 206 (i.e., in the y-direction) or perpendicular to leading (i.e., in the z-direction).

The following subject matter of this paragraph characterizes example 56 of the present disclosure, wherein example 56 also includes the subject matter according to any one of examples 53 to 54, above. Referring generally to FIG. 2, at a location in skin 210 between leading edge 206 and a portion of internal surface 214 of skin 210 that is closest to leading edge 206, steady-state magnetic field 282 is parallel to leading edge 206.

Having steady-state magnetic field 282 parallel to leading edge 206 (and hence eddy current 280) near leading edge 206 permits applying inductive heat and acoustic pressure to skin 210 near leading edge 206. As force 284 is perpendicular to eddy current 280, force 284, in this arrangement, may be perpendicular to leading edge 206 (i.e., in the x-direction).

The following subject matter of this paragraph characterizes example 57 of the present disclosure, wherein example 57 also includes the subject matter according to any one of examples 53 to 56, above. Referring generally to FIG. 2 and particularly to, e.g., FIGS. 10-13, a magnitude of steady-state magnetic field 282 is greater than 0.1 T (tesla) and less than 100 T.

Steady-state magnetic field 282 is sufficiently strong so as to cause significant acoustic pressure in skin 210 when steady-state magnetic field 282 interacts with eddy current 280 caused by alternating electrical current 234 in induction coil 230. Steady-state magnetic field 282 may be a strong magnetic field, with a magnitude greater than 0.1 T, and a magnetic field that is practical to generate with direct electrical current 246 flowing in induction coil 230.

The following subject matter of this paragraph characterizes example 58 of the present disclosure, wherein example 58 also includes the subject matter according to any one of examples 53 to 57, above. Referring generally to FIG. 2 and particularly to, e.g., FIGS. 10-13, alternating electrical current 234 generates alternating magnetic field 286 with an amplitude that is less than a magnitude of steady-state magnetic field 282.

Alternating magnetic field 286 generates eddy current 280 within skin 210, with the amplitude of eddy current 280 related to the amplitude of alternating magnetic field 286. The amplitude of eddy current 280 affects the efficiency of inductive heat. The magnitude of steady-state magnetic field 282 affects the amplitude of force 284 that acts on skin 210 to produce acoustic pressure. Hence, the relative size of the amplitude of alternating magnetic field 286 and the magnitude of steady-state magnetic field 282 affects the relative contributions of inductive heat and acoustic pressure to impeding, preventing, reducing, and/or removing ice from airfoil 200. For the same field intensity (amplitude or magnitude), inductive heat would be more efficient that force generation.

The following subject matter of this paragraph characterizes example 59 of the present disclosure, wherein example 59 also includes the subject matter according to example 58, above. Referring generally to FIG. 2 and particularly to, e.g., FIGS. 10-13, a ratio of the amplitude of alternating magnetic field 286 to the magnitude of steady-state magnetic field 282 is less than 0.1 and greater than 0.0001.

The amplitude of alternating magnetic field 286 may be much smaller than the magnitude of steady-state magnetic field 282 to produce a system in which acoustic pressure has a significant, or more significant, contribution to impeding, preventing, reducing, and/or removing ice from airfoil 200.

The following subject matter of this paragraph characterizes example 60 of the present disclosure, wherein example 60 also includes the subject matter according to any one of examples 53 to 59, above. Referring generally to FIG. 2 and particularly to, e.g., FIGS. 10-13, an amplitude of alternating electrical current 234 is less than a magnitude of direct electrical current 246.

Alternating electrical current 234 flowing in induction coil 230 generates alternating magnetic field 286, with the amplitude of alternating magnetic field 286 related to the amplitude of alternating electrical current 234. Alternating magnetic field 286 generates eddy current 280 within skin 210, with the amplitude of eddy current 280 related to the amplitude of alternating magnetic field 286 and the amplitude of alternating electrical current 234. The amplitude of eddy current 280 affects the efficiency of inductive heat. Direct electrical current 246 flowing in induction coil 230 generates steady-state magnetic field 282, with the magnitude of steady-state magnetic field 282 related to the magnitude of direct electrical current 246. The magnitude of steady-state magnetic field 282 affects the amplitude of force 284 that acts on skin 210 to produce acoustic pressure. Hence, the relative size of the amplitude of alternating electrical current 234 and the magnitude of direct electrical current 246 affects the relative contributions of inductive heat and acoustic pressure to impeding, preventing, reducing, and/or removing ice from airfoil 200. For the same field intensity (amplitude or magnitude), inductive heat would be more efficient that force generation.

The following subject matter of this paragraph characterizes example 61 of the present disclosure, wherein example 61 also includes the subject matter according to example 60, above. Referring generally to FIG. 2 and particularly to, e.g., FIGS. 10-13, a ratio of the amplitude of alternating electrical current 234 and the magnitude of direct electrical current 246 is less than 0.1 and greater than 0.0001.

The amplitude of alternating electrical current 234 may be much smaller than the magnitude of direct electrical current 246 to produce a system in which acoustic pressure has a significant, or more significant, contribution to impeding, preventing, reducing, and/or removing ice from airfoil 200.

The following subject matter of this paragraph characterizes example 62 of the present disclosure, wherein example 62 also includes the subject matter according to any one of examples 43 to 61, above. Referring generally to FIG. 2 and particularly to, e.g., FIGS. 10-13, alternating electrical current 234 has a frequency that is at least 100 kHz (kilohertz) and at most 10 MHz (megahertz).

The frequency of alternating electrical current 234 affects the skin depth of inductive heat as discussed above. Higher frequencies have thinner skin depths. Efficiency of inductive heat improves when the skin depth is similar to the thickness of skin 210. For example, the frequency of alternating electrical current 280 may be selected to produce skin depth that is a small integer divisor of the thickness of skin 210 (e.g., a skin depth of ½ to ¼ of the thickness of skin 210). Also, the frequency of alternating electrical current 234 is the frequency of eddy current 280 and half the frequency of the acoustic pressure generated by eddy current 280 interacting with steady-state magnetic field 282. Higher frequencies may lead to more efficient acoustic ice impediment, prevention, reduction, and/or removal. The frequency of alternating electrical current 234 may be selected to tune (e.g., to balance) the effects of inductive heat and acoustic pressure on ice impediment, prevention, reduction, and/or removal from airfoil 200.

The following subject matter of this paragraph characterizes example 63 of the present disclosure, wherein example 63 also includes the subject matter according to example 62, above. Referring generally to FIG. 2 and particularly to, e.g., FIGS. 10-13, the frequency of alternating electrical current 234 is at least 1 MHz.

Higher frequencies, such as a frequency at least 1 MHz, may emphasize the effects of acoustic pressure over the effects of inductive heat.

The following subject matter of this paragraph characterizes example 64 of the present disclosure, wherein example 64 also includes the subject matter according to any one of examples 43 to 63, above. Referring generally to FIG. 2, airfoil 200 further comprises temperature sensor 260, configured to measure the ambient temperature of layer of fluid 218 flowing over external surface 212 of skin 210.

Temperature sensor 260 is configured to measure the ambient temperature and configured such that control system 250 may determine the ambient temperature through use of temperature sensor. For example, temperature sensor 260 may transfer a signal representative of the ambient temperature to control system 250. Temperature sensor 260 may be configured to measure ambient temperature directly or indirectly. For example, temperature sensor 260 may be in direct thermal contact with the layer of fluid 218 flowing over external surface 212 of skin 210. As another example, temperature sensor 260 may be configured to measure the temperature of a portion of external surface 212 of skin 210, which is in thermal contact with the layer of fluid 218 flowing over external surface 212. Examples of temperature sensors 260 include a thermocouple, a resistance temperature detector, an infrared sensor, and a thermistor. Additionally or alternatively, one or more temperature sensors 260 may be remote from airfoil 200 and configured to measure a temperature characteristic of and/or related to the ambient temperature of the layer of fluid 218 flowing over external surface 212 of skin 210.

The following subject matter of this paragraph characterizes example 65 of the present disclosure, wherein example 65 also includes the subject matter according to any one of examples 43 to 64, above. Referring generally to FIG. 2 and particularly to, e.g., FIG. 10, control system 250 comprises power supply 254 and controller 252. Power supply 254 is configured to supply alternating electrical current 234 to induction coil 230. Controller 252 is programmed to receive signals, representative of first ambient conditions known to cause formation of the ice on external surface 212 of skin 210 and second ambient conditions known to impede formation of the ice on external surface 212. The first ambient conditions and the second ambient conditions both comprise the ambient temperature of layer of fluid 218 flowing over external surface 212 of skin 210. Controller 252 is also programmed to cause power supply 254 to supply alternating electrical current 234 to induction coil 230 to generate inductive heat and acoustic pressure in controlled region 216 of skin 210 based upon the first ambient conditions. Controller 252 is additionally programmed to cause power supply 254 to discontinue supplying alternating electrical current 234 to induction coil 230 based upon the second ambient conditions.

Power supply 254 is configured to selectively supply alternating electrical current 234 to induction coil 230, thereby selectively producing eddy current 280, inductive heat, and/or acoustic pressure in skin 210.

Controller 252 may be configured to turn on and off power supply 254 and thus to control the application of inductive heat and acoustic pressure based upon ambient conditions (e.g., first ambient conditions and second ambient conditions) which may otherwise cause ice to form or impede ice from forming on external surface 212 of skin 210. Controller 252 may be a computer (e.g., comprising a processor and memory) and/or dedicated hardware. Controller 252 may implement its functions (e.g., receiving signals, causing power supply 254 to supply current, and causing power supply 254 to discontinue supplying current) in software, firmware, and/or hardware. Controller 252 may be referred to as an embedded computer and/or an embedded system.

The following subject matter of this paragraph characterizes example 66 of the present disclosure, wherein example 66 also includes the subject matter according to example 65, above. Referring generally to FIG. 2 and particularly to, e.g., FIG. 10, controller 252 is also programmed to cause power supply 254 to supply alternating electrical current 234 to induction coil 230 when the ambient temperature of layer of fluid 218, flowing over external surface 212 of skin 210, is below a first threshold temperature.

Controller 252 may be configured to cause power supply 254 to supply current based on the ambient temperature being below a first threshold temperature such as a temperature known to permit ice to accumulate on external surface 212 of airfoil 200. The first threshold temperature may be a predetermined threshold or may be a function of other parameters (e.g., the temperature of external surface 212 of airfoil 200, humidity, operation time of hybrid acoustic induction-heating system 202, etc.).

The following subject matter of this paragraph characterizes example 67 of the present disclosure, wherein example 67 also includes the subject matter according to example 66, above. Referring generally to FIG. 2 and particularly to, e.g., FIG. 10, the first threshold temperature is above a freezing point of water and below 5° C.

The temperature range from the freezing point of water to 5° C. is a range in which water impacting airfoil 200 may transition from remaining liquid to accumulating as ice. Hence, the first threshold being within this range is a reasonable predictor of the need to turn on the inductive heat and acoustic pressure to impede, to prevent, to reduce, and/or to remove ice from airfoil 200.

The following subject matter of this paragraph characterizes example 68 of the present disclosure, wherein example 68 also includes the subject matter according to any one of examples 66 to 67, above. Referring generally to FIG. 2 and particularly to, e.g., FIG. 10, controller 252 is also programmed to cause power supply 254 to discontinue supplying alternating electrical current 234 to induction coil 230 when the ambient temperature of layer of fluid 218, flowing over external surface 212 of skin 210, is above a second threshold temperature.

Controller 252 may be configured to cause power supply 254 to discontinue supplying current based on the ambient temperature being above a second threshold temperature such as a temperature known to not significantly permit ice to accumulate on external surface 212 of airfoil 200. The second threshold temperature may be a predetermined threshold or may be a function of other parameters (e.g., the temperature of external surface 212 of airfoil 200, humidity, operation time of hybrid acoustic induction-heating system 202, etc.).

The following subject matter of this paragraph characterizes example 69 of the present disclosure, wherein example 69 also includes the subject matter according to example 68, above. Referring generally to FIG. 2 and particularly to, e.g., FIG. 10, the second threshold temperature is different than the first threshold temperature.

The second threshold temperature value may be the same as or different than the first threshold temperature value. Different values for the second threshold temperature and the first threshold temperature permit the controller to turn on or off the inductive heat and acoustic pressure at different temperatures.

The following subject matter of this paragraph characterizes example 70 of the present disclosure, wherein example 70 also includes the subject matter according to any one of examples 68 to 69, above. Referring generally to FIG. 2 and particularly to, e.g., FIG. 10, the second threshold temperature is greater than the first threshold temperature.

The second threshold temperature being higher than the first threshold temperature tends to prevent oscillation in the turning on and turning off of the inductive heat and acoustic pressure. If the second threshold temperature is the same as the first threshold temperature, small variations in the ambient temperature about the single temperature threshold may cause to controller 252 to command power supply 254 in contrary manners in rapid succession. If by supplying alternating electrical current 234, the ambient temperature is increased, the act of causing power supply 254 to supply current could cause the ambient temperature to rise and thereby cause controller 252 to cause power supply 254 to discontinue supplying current, with the likely consequence of reducing the ambient temperature. Such conditions could cause controller 252 and hybrid acoustic induction-heating system 202 to oscillate and ineffectively supply inductive heat and acoustic pressure.

The following subject matter of this paragraph characterizes example 71 of the present disclosure, wherein example 71 also includes the subject matter according to any one of examples 68 to 70, above. Referring generally to FIG. 2 and particularly to, e.g., FIG. 10, the second threshold temperature is above 2° C. and below 10° C.

The temperature range from above 2° C. to below 10° C. is a range in which water impacting airfoil 200 may transition from accumulating as ice to remaining liquid. Hence, the second threshold being within this range is a reasonable predictor of the need to turn off the inductive heat and acoustic pressure to impede, to prevent, to reduce, and/or to remove ice from airfoil 200.

The following subject matter of this paragraph characterizes example 72 of the present disclosure, wherein example 72 also includes the subject matter according to any one of examples 43 to 71, above. Referring generally to FIG. 2 and particularly to, e.g., FIGS. 10-13, skin 210 comprises a nickel-iron alloy.

Nickel-iron alloys are a class of alloys that are suitable for skin 210. Nickel-iron alloys are electrically and magnetically conductive, and are susceptible to inductive heat and acoustic pressure generation.

The following subject matter of this paragraph characterizes example 73 of the present disclosure, wherein example 73 also includes the subject matter according to any one of examples 43 to 72, above. Referring generally to FIG. 2 and particularly to, e.g., FIGS. 10-13, skin 210 has a thickness of less than 1 mm and greater than 0.001 mm.

Skin 210 generally is thin so that skin 210 may be affected rapidly by the inductive heat and acoustic pressure generated by hybrid acoustic induction-heating system 202. The thickness of skin 210 may be selected based on practical and/or desired frequencies of alternating electrical current 234 and/or skin depth at those frequencies. Skin 210 is thick enough to maintain structural integrity when subjected to conditions of airfoil 200.

The following subject matter of this paragraph characterizes example 74 of the present disclosure, wherein example 74 also includes the subject matter according to any one of examples 43 to 73, above. Referring generally to FIG. 2 and particularly to, e.g., FIGS. 10-13, skin 210 is ferromagnetic.

As discussed above, skin 210 may be ferromagnetic to concentrate magnetic fields within skin 210.

The following subject matter of this paragraph characterizes example 75 of the present disclosure, wherein example 75 also includes the subject matter according to any one of examples 43 to 74, above. Referring generally to FIG. 2 and particularly to, e.g., FIGS. 10-13, skin 210 has relative magnetic permeability of greater than 1,000 and less than 10,000,000.

Magnetic materials have a relative magnetic permeability significantly greater than unity. Non-magnetic materials have a relative magnetic permeability near unity. Higher relative magnetic permeabilities indicate a higher affinity for and concentration of magnetic fields within the material. Typical magnetic materials have a relative magnetic permeability greater than about 100. Highly magnetic materials have a relative magnetic permeability of greater than about 1,000. All known materials have a relative magnetic permeability of less than 10,000,000.

The following subject matter of this paragraph characterizes example 76 of the present disclosure, wherein example 76 also includes the subject matter according to any one of examples 43 to 75, above. Referring generally to FIG. 2 and particularly to, e.g., FIGS. 10-13, skin 210 has Curie temperature less than 300° C. and greater than 50° C.

The Curie temperature is a transition temperature of ferromagnetic materials. Below the Curie temperature, the material has a high relative magnetic permeability. Above the Curie temperature, the material is paramagnetic with a lower relative magnetic permeability. If skin 210 becomes paramagnetic (as opposed to ferromagnetic or magnetically conductive at a particular temperature), the efficiency of inductive heat and/or generation of acoustic pressure will be significantly reduced. Hence, if the Curie temperature of skin 210 is sufficiently low, hybrid acoustic induction-heating system 202 may be configured to automatically cease significant induction-heating and/or acoustic pressure generation if skin 210 becomes too hot (e.g., in the event of a malfunction of hybrid acoustic induction-heating system 202 or excessive solar heating of airfoil 200).

The following subject matter of this paragraph characterizes example 77 of the present disclosure, wherein example 77 also includes the subject matter according to any one of examples 43 to 76, above. Referring generally to FIG. 2 and particularly to, e.g., FIG. 11, airfoil 200 further comprises electrical insulator 220 in interior space 208, wherein electrical insulator 220 is coupled to skin 210.

Electrically conductive and/or magnetically conductive materials within airfoil 200 may be heated and/or subject to acoustic pressure in a similar manner as skin 210. Hence, forms, supports, and other structures within airfoil 200 may be electrically insulating and/or located sufficiently far away from induction coil 230 and/or magnet 240.

The following subject matter of this paragraph characterizes example 78 of the present disclosure, wherein example 78 also includes the subject matter according to example 77, above. Referring generally to FIG. 2 and particularly to, e.g., FIG. 11, electrical insulator 220 supports skin 210.

Airfoils 200 may be constructed with an internal support, such as electrical insulator 220, to support skin 210 and/or induction coil 230, and/or to maintain the aerodynamic shape of airfoil 200.

The following subject matter of this paragraph characterizes example 79 of the present disclosure, wherein example 79 also includes the subject matter according to any one of examples 77 to 78, above. Referring generally to FIG. 2 and particularly to, e.g., FIG. 11, electrical insulator 220 supports at least one magnet 240.

At least one magnet 240 produces a steady-state magnetic field that may contribute to steady-state magnetic field 282 that affects acoustic pressure in controlled region 216 of skin 210. Each of at least one magnet 240 may be permanent magnet 242 or electromagnet 244.

Referring generally to FIG. 3 and particularly to, e.g., FIGS. 14-16, airfoil 300 is disclosed. Airfoil 300 comprises skin 310, comprising external surface 312 and internal surface 314, opposite external surface 312. Skin 310 is magnetically and electrically conductive and has controlled region 316. Airfoil 300 also comprises interior space 308, formed by skin 310. Internal surface 314 of skin 310 faces interior space 308. Airfoil 300 additionally comprises leading edge 306 along external surface 312 of skin 310. Airfoil 300 further comprises hybrid acoustic induction-heating system 302, configured to impede formation of ice on external surface 312 of skin 310. Hybrid acoustic induction-heating system 302 comprises induction coils 328, located within interior space 308. Each one of induction coils 328, in which phase 348 of alternating electrical current 334 is flowing, has portion 336, arranged sufficiently close to internal surface 314 of skin 310 to produce eddy current 380 within controlled region 316 of skin 310. Portion 336 of one of induction coils 328 is adjacent to portion 336 of at least another one of induction coils 328. Hybrid acoustic induction-heating system 302 also comprises control system 350, configured to generate inductive heat and traveling-wave acoustic pressure in controlled region 316 of skin 310 by supplying phases 348 of alternating electrical current 334 to induction coils 328 based, at least in part, on an ambient temperature of layer of fluid 318 flowing over external surface 312 of skin 310. Supplying phases 348 of alternating electrical current 334 comprises supplying different ones of phases 348 of alternating electrical current 334 to those of induction coils 328 having portions 336 that are adjacent to each other. The preceding subject matter of this paragraph characterizes example 80 of the present disclosure.

Airfoil 300 is configured to impede, prevent, reduce, and/or remove ice that may form on skin 310. Ice on an airfoil may disturb the aerodynamic flow of air over the airfoil. Use of airfoil 300 may impede, prevent, reduce, and/or remove ice on airfoil 300 and, thus, may eliminate or reduce the effects of ice on airfoil 300. Airfoil 300 is configured to use both inductive heat and acoustic vibrations to impede, prevent, reduce, and/or remove ice on airfoil 300. Inductive heat may be used to increase and/or to maintain the temperature of skin 310, in particular external surface 312 and/or leading edge 306. The temperature of skin 310, in particular external surface 312 and/or leading edge 306, to impede, prevent, reduce, and/or to remove ice generally is above the freezing point of water. Acoustic vibrations may be used to keep external surface 312, and in particular leading edge 306, non-static (vibrating).

Airfoil 300 is a body shaped to provide a desired reaction force when in motion relative to a surrounding fluid (e.g., air). Relevant to icing, the fluid may include moisture that may impact airfoil 300 and may tend to form ice on airfoil 300 if hybrid acoustic induction-heating system 302 is not operative. Leading edge 306 is the foremost edge of airfoil 300 or an edge that meets the fluid first as airfoil 300 moves therethrough.

Airfoil 300 includes induction coil 330 within interior space 308. Hence, induction coil 330 is not exposed at exterior surface 312 and does not affect the aerodynamic airflow across airfoil 300.

Skin 310 is magnetically conductive so that a magnetic field is will tend to concentrate within skin 310. Skin 310 is magnetically conductive at temperatures near and below the freezing point of water, and above the lowest operating temperature for airfoil 300. In addition to being magnetically conductive, skin 310 may be a soft magnetic material (easily magnetized and demagnetized) and/or a ferromagnetic material (exhibiting a large, positive, non-linear susceptibility to an external magnetic field).

Skin 310 is electrically conductive so that eddy current 380 will form in skin 310 and so that skin 310 is susceptible to inductive heat. Inductive heat heats an electrically conductive object by applying an alternating magnetic field to the object. The alternating magnetic field causes eddy current 380 to circulate on the object. Eddy current 380 causes resistive heating (also called Joule heating) due to the electrical resistance of the electrically conductive object. Eddy current 380 and consequent heat generation are confined generally to a thin surface region of the object characterized by the frequency-dependent skin depth parameter. The skin depth (also called the electrical skin depth and the electromagnetic skin depth) is proportional to the inverse square root of the frequency of the alternating magnetic field. The efficiency of inductive heat is related to the intensity and frequency of the alternating magnetic field, the geometry of induction coil 330, the relative size and position of induction coil 330 and skin 310, and the material of skin 310.

Materials for skin 310 may be selected for suitability as the external surface of an airfoil (e.g., external surface 312 of airfoil 300). Properties that may be selected comprise high magnetic permeability (magnetic conductivity), suitable electrical conductivity, strength, environmental resistance, abrasion resistance, and coefficient of temperature variation.

Induction coils 328 include two or more induction coil 330 (e.g., three induction coils 330 illustrated in FIG. 14 as induction coil 331, induction coil 332, and induction coil 333). Each one of induction coils 328 is configured to produce an alternating magnetic field when alternating electrical current 334 is flowing therethrough. Phase 348 of alternating electrical current 334 affects the phase of alternating magnetic field generated by respective induction coil 330. In FIGS. 14 and 16, three different phases 348 are schematically indicated as A, B, C and labeled as first phase 348a, second phase 348b, and third phase 348c.

Induction coil 330 is a coil of wire configured to carry alternating electrical current 334 therethrough. The wire is electrically conductive, generally with low resistance (e.g., copper or aluminum wire). The wire of induction coil 330 is wound generally in a spiral or helical pattern such that the wire forms parallel loops with sections of parallel wires. The loops and the individual wire segments of the parallel wires are electrically isolated such that electrical current follows the path of the wire and does not short between loops or the parallel wires. The wire may be a solid conductor, an assembly of individual conductors, and/or an assembly of electrically isolated conductors. For example, higher efficiency alternating electrical current flow (less current crowding) may be achieved by using a Litz wire configuration (a braided assembly of electrically isolated wires used as a single wire). Generally, each one of induction coils 328 is constructed in a similar manner, for example to facilitate supplying corresponding phases 348 of alternating electrical current 334 to each of induction coils 328.

Portions 336 of each one of induction coils 328 are portions of parallel wire of respective induction coil 330, in analog to portion 136 of induction coil 130 and portion 236 of induction coil 230 as described herein. Individual portions 336 of individual induction coils 330 are indicated as portion 336a, portion 336b, and portion 336c in FIG. 14. Generally, portion 336 is a portion of the virtual surface of corresponding induction coil 330. The shape of induction coil 330 and portion 336 of induction coil 330 is defined by the exterior form of induction coil. For example, induction coil 330 may be formed of a helix of wire. The exterior form of a regular helix is a cylinder. Such induction coil 330 may be referred to as a cylindrical induction coil. Portion 336 of a cylindrical induction coil is a segment of the cylinder that defines the exterior form of the cylindrical induction coil.

Portion 336 of each one of induction coils 328 is located sufficiently close to internal surface 314 of skin 310 to produce eddy current 380 within controlled region 316 of skin 310 when phase 348 of alternating electrical current 334 is flowing in induction coil 330. Hence, induction coil 330 may be called inductively coupled to skin 310. If induction coil 330 and portion 336 of induction coil 330 are not sufficiently close to skin 310 and internal surface 314 of skin 310, no significant eddy current 380 will be produced in skin 310 and therefore induction coil 330 would not be positioned to inductively heat skin 310.

Portion 336 of one of induction coils 328 is adjacent to portion 336 of at least another one of induction coils 328. Hence, induction coils 328 may be described as adjacent induction coils 328. All induction coils 328 may be arranged with portion 336 of each of induction coils 328 adjacent to portion 336 of at least one other of induction coils 328. Induction coils 328 arranged adjacently may generate adjacent eddy currents 380 and provide for controlled region 316 that has few or no gaps between eddy currents 380. For example, FIGS. 14 and 15, illustrate adjacent induction coils 328 and adjacent current domains 338 due to phases 348 of alternating electrical current 334 flowing in induction coils 328. In FIG. 14, current domains 348 corresponding to individual induction coils 330 are indicated as current domain 348a, current domain 348b, and current domain 348c corresponding to phase 348a flowing in portion 336a of first induction coil 331, phase 348b flowing in portion 336b of second induction coil 332, and phase 348c flowing in portion 336c of third induction coil 333. Adjacent current domains 338 generate corresponding adjacent eddy currents 380 as illustrated in the example of FIG. 15.

Control system 350 may be used to control the amount and timing of generation of inductive heat and acoustic pressure to impede, to prevent, to reduce, and/or to remove ice on airfoil 300, in controlled region 316 of skin 310. Control system 350 controls the supply of phases 348 of alternating electrical current 334 to supply phases 348 of alternating electrical current 334 to induction coils 328 to generate inductive heat and acoustic pressure. Different ones of phases 348 of alternating electrical current 334 are supplied to those of induction coils 328 having portions 336 adjacent to each other. By use of alternating electrical current 334 in induction coils 328, corresponding eddy currents 380 are generated within controlled region 316 of skin 310 to inductively heat skin 310 directly, without requiring thermal contact to a heat source (e.g., no heating element is required).

By supplying different phases 348 of alternating electrical current 334 to individual induction coils 330 that are adjacent, adjacent eddy currents 380 in skin 310 have different phases. Different phases of eddy currents 380 may be used to generate traveling-wave acoustic pressure (traveling-wave vibrations). Traveling-wave acoustic pressure vibrates different parts of skin 310 at different phases, with the peak amplitude of vibration shifting in location across external surface 312 of skin 310 according to the instantaneous phase of the vibration, corresponding eddy current 380, and corresponding phase 348 of alternating current 334.

Control system 350 controls generation of inductive heat and acoustic pressure based on the ambient temperature of layer of fluid 318 flowing over external surface 312 of skin 310. Layer of fluid 318 generally is air that may include moisture. When the ambient temperature of the fluid is low enough, moisture from the fluid may accumulate on external surface 312 of skin 310 as ice, e.g., moisture may freeze on contact with external surface 312 of skin 310. Hence, controlling the supply of alternating electrical current 334 based on the ambient temperature permits selectively applying inductive heat and acoustic pressure when ambient conditions may cause icing.

The following subject matter of this paragraph characterizes example 81 of the present disclosure, wherein example 81 also includes the subject matter according to example 80, above. Referring generally to FIG. 3 and particularly to, e.g., FIGS. 14-16, airfoil 300 further comprises at least one magnet 340, located within interior space 308 and configured to produce steady-state magnetic field 382 within skin 310.

Airfoil 300 includes at least one magnet 340 within interior space 308. Hence, magnet 340 is not exposed at exterior surface 312 and does not affect the aerodynamic airflow across airfoil 300.

Magnet 340 is configured to produce steady-state magnetic field 382 (also referred to as a DC magnetic field) within skin 310. Magnet 340 also may be referred to as magnetic source. Steady-state magnetic field 382 generally interacts with electrical currents (such as eddy current 380) within skin 310 to produce force 384 (Lorentz force) within skin 310. The Lorenz force is proportional to the cross product of the velocity of a charged particle (such as an electron) and the magnetic field (B field), in the absence of an applied electric field. Force 384 due to alternating electrical currents (such as eddy current 380) within skin 310 interacting with steady-state magnetic field 382 within skin 310 produces acoustic vibrations within skin 310 (at twice the frequency of the alternating electrical current). Force 384 is absent (or zero) when eddy current 380 within skin 310 and steady-state magnetic field 382 are parallel. All other things being equal, force 384 is a maximum when eddy current 380 within skin 310 and steady-state magnetic field 382 are perpendicular.

Thus, by use of phases 348 of alternating electrical current 334 in induction coils 328, eddy currents 380 are generated in skin 310 to inductively heat skin 310 directly, without requiring thermal contact to a heat source (e.g., no heating element is required). The interaction of eddy currents 380 with steady-state magnetic field 382 generates force 384 and acoustic vibrations directly in skin 310, without requiring acoustic contact to a sound source (e.g., no acoustic transducer such as piezoelectric element is required).

Because magnet 340 is within interior space 308 of airfoil 300 and skin 310 is magnetically conductive (and/or ferromagnetic), most or all of the resultant magnetic field (such as steady-state magnetic field 382) is contained within airfoil 300. Magnetic field lines that would otherwise extend beyond skin 310, if skin 310 were not present (or not magnetically conductive and/or ferromagnetic), are substantially redirected within skin 310. Thus, little to no magnetic field from magnet 340 is present outside of airfoil 300. Hence, special precautions for operating near high magnetic fields are not needed for personnel, tools, or equipment operating outside of airfoil 300.

Steady-state magnetic field 382 may be a permanent magnetic field (e.g., from permanent magnet 342), or may be controllable (e.g., from electromagnet 344). Where controllable, steady-state magnetic field 382 may be turned on or off (e.g., by control system 350) as desired to actuate the acoustic vibrations in skin 310. In addition to controlling acoustic vibrations, a controllable steady-state magnetic field may be turned off to eliminate high magnetic fields within airfoil 300. Thus, special precautions for operating near high magnetic fields within airfoil 300 may be avoided.

The following subject matter of this paragraph characterizes example 82 of the present disclosure, wherein example 82 also includes the subject matter according to example 81, above. Referring generally to FIG. 3 and particularly to, e.g., FIGS. 14-16, at a location in skin 310, steady-state magnetic field 382, produced by at least one magnet 340, is transverse to eddy current 380, induced by one of phases 348 of alternating electrical current 334, flowing in a corresponding one of induction coils 328.

Eddy currents 380 are result of phases 348 of alternating electrical current 334 flowing in induction coils 328. Each eddy current 380 may be represented as one or more mirror currents (virtual currents) within skin 310 that flow in the opposite direction of (and at the same frequency as) alternating electrical current 334 and at a position in skin 310 that is a mirror image of the position of the parallel wires carrying alternating electrical current 334 (with respect to internal surface 314). If eddy current 380 is transverse to steady-state magnetic field 382, moving charges that make up eddy current 380 experience force 384. Force 384 on eddy current 380 results in acoustic vibrations in skin 310 (at twice the frequency of eddy current 380 and twice the frequency of alternating electrical current 334). As used herein, transverse means not parallel. Transverse arrangements encompass perpendicular arrangements.

The following subject matter of this paragraph characterizes example 83 of the present disclosure, wherein example 83 also includes the subject matter according to any one of examples 81 to 82, above. Referring generally to FIG. 3 and particularly to, e.g., FIG. 14, at least one magnet 340 is permanent magnet 342.

Permanent magnet 342 produces a magnetic field without electronics or electrical current flow. Hence, use of permanent magnet 342 may simplify construction and/or control of airfoil 300 and/or hybrid acoustic induction-heating system 302.

The following subject matter of this paragraph characterizes example 84 of the present disclosure, wherein example 84 also includes the subject matter according to any one of examples 81 to 83, above. Referring generally to FIG. 3 and particularly to, e.g., FIGS. 14 and 16, at least one magnet 340 is electromagnet 344.

Electromagnet 344 produces steady-state magnetic field 382 when a steady-state (direct current, DC) electrical current flows through a coil. The magnetic field may be turned on or off by controlling the electrical current flow (e.g., with control system 350). Additionally or alternatively, the magnetic field strength and direction may be adjusted according to the electrical current flow. Electromagnet 344 generally is controllable and may be referred to as a controllable magnet. Induction coil 330 may serve as the coil of electromagnet 344. Induction coil 330 may be adapted to flow steady-state electrical current so that induction coil 330 may produce steady-state magnetic field 382. The steady-state electrical current to produce steady-state magnetic field 382 is typically much greater (has a much greater magnitude) than the amplitudes of phases 348 of alternating electrical current 334 (generally amplitudes of phases 348 of alternating electrical current 334 are equal). Hence, induction coil 330 adapted to flow steady-state electrical current may have wires with a higher cross section (lower resistance) than corresponding wires of induction coil 330 that is adapted to flow only alternating electrical current 334.

The following subject matter of this paragraph characterizes example 85 of the present disclosure, wherein example 85 also includes the subject matter according to any one of examples 81 to 84, above. Referring generally to FIG. 3 and particularly to, e.g., FIGS. 14-16, at least one magnet 340 is a plurality of magnets within interior space 308.

The plurality of magnets may be arranged to position and/or direct steady-state magnetic field 382 to generate force 382 in suitable positions and/or directions. At least one magnet 340 may comprise one or more permanent magnets 342 and/or one or more electromagnets 344.

The following subject matter of this paragraph characterizes example 86 of the present disclosure, wherein example 86 also includes the subject matter according to any one of examples 81 to 85, above. Referring generally to FIG. 3 and particularly to, e.g., FIGS. 14-16, steady-state magnetic field 382 is transverse to portions 336 of induction coils 328.

Steady-state magnetic field 382 is transverse to portions 336 of induction coils 328 when steady-state magnetic field 382 is transverse to the parallel wires of portions 336. The direction of parallel wires of induction coils 328 determines the direction of eddy currents 380 within skin 310. Generating steady-state magnetic field 382 transverse to portions 336 generally produces steady-state magnetic field 382 transverse to eddy currents 380. Steady-state magnetic field 382 being transverse to eddy currents 380 generates force 384.

The following subject matter of this paragraph characterizes example 87 of the present disclosure, wherein example 87 also includes the subject matter according to any one of examples 81 to 86, above. Referring generally to FIG. 3 and particularly to, e.g., FIGS. 14-16, steady-state magnetic field 382 at a location at internal surface 314 of skin 310 is transverse to internal surface 314 at the location.

Eddy currents 380 are within skin 310 and hence are substantially parallel to skin 310. Steady-state magnetic field 382 is transverse to eddy currents 380 when also transverse to internal surface 314 of skin 310. Steady-state magnetic field 382 being transverse to eddy currents 380 generates force 384.

The following subject matter of this paragraph characterizes example 88 of the present disclosure, wherein example 88 also includes the subject matter according to any one of examples 81 to 87, above. Referring generally to FIG. 3 and particularly to, e.g., FIGS. 14-16, steady-state magnetic field 382 is transverse to a portion of internal surface 314 of skin 310 that is closest to leading edge 306.

Portion of internal surface 314 of skin 310 that is closest to leading edge 306 also may be referred to as the portion of internal surface 314 that is directly opposite, directly behind, and/or directly downstream of leading edge 306. Leading edge 306 is on external surface 312 of skin 310. A position on internal surface 314 of skin 310 that is closest to leading edge 306 is a position on internal surface 314 that is separated by leading edge 306 by the thickness of skin 310. Having steady-state magnetic field 382 transverse to skin 310 (and hence eddy currents 380) near leading edge 306 permits applying inductive heat and acoustic pressure to skin 310 near leading edge 306. As force 384 is perpendicular to eddy current 380, force 384, in this arrangement, may be parallel to leading edge 306 (i.e., in the y-direction) or perpendicular to leading (i.e., in the z-direction).

The following subject matter of this paragraph characterizes example 89 of the present disclosure, wherein example 89 also includes the subject matter according to any one of examples 81 to 87, above. Referring generally to FIG. 3 and particularly to, e.g., FIGS. 14-16, steady-state magnetic field 382 is parallel to a portion of internal surface 314 of skin 310 that is closest to leading edge 306.

Having steady-state magnetic field 382 parallel to leading edge 306 (and hence eddy currents 380) near leading edge 306 permits applying inductive heat and acoustic pressure to skin 310 near leading edge 306. As force 384 is perpendicular to eddy current 380, force 384, in this arrangement, may be perpendicular to leading edge 306 (i.e., in the x-direction).

The following subject matter of this paragraph characterizes example 90 of the present disclosure, wherein example 90 also includes the subject matter according to any one of examples 81 to 89, above. Referring generally to FIG. 3 and particularly to, e.g., FIGS. 14-16, a magnitude of steady-state magnetic field 382 is greater than 0.1 T (tesla) and less than 100 T.

Steady-state magnetic field 382 is sufficiently strong so as to cause significant acoustic pressure in skin 310 when steady-state magnetic field 382 interacts with eddy currents 380 caused by phases 348 of alternating electrical current 334 in induction coils 328. Steady-state magnetic field 382 may be a strong magnetic field, with a magnitude greater than 0.1 T, and a magnetic field that is practical to generate with direct electrical current 346 flowing in at least one of induction coils 328 or with magnet 340.

The following subject matter of this paragraph characterizes example 91 of the present disclosure, wherein example 91 also includes the subject matter according to any one of examples 81 to 90, above. Referring generally to FIG. 3 and particularly to, e.g., FIGS. 14-16, phases 348 of alternating electrical current 334 each generate alternating magnetic field 386 with an amplitude that is less than a magnitude of steady-state magnetic field 382.

Alternating magnetic fields 386 generate respective eddy currents 380 within skin 310, with the amplitudes of eddy currents 380 related to the amplitudes of respective alternating magnetic fields 386. The amplitude of eddy currents 380 affects the efficiency of inductive heat. The magnitude of steady-state magnetic field 382 affects the amplitude of force 384 that acts on skin 310 to produce acoustic pressure. Hence, the relative size of the amplitudes of alternating magnetic fields 386 and the magnitude of steady-state magnetic field 382 affects the relative contributions of inductive heat and acoustic pressure to impeding, preventing, reducing, and/or removing ice from airfoil 300. For the same field intensity (amplitude or magnitude), inductive heat would be more efficient that force generation. As all of the amplitudes of phases 348 of alternating electrical current 334 generally are equal, the amplitudes of alternating magnetics fields 386 generally are equal.

The following subject matter of this paragraph characterizes example 92 of the present disclosure, wherein example 92 also includes the subject matter according to example 91, above. Referring generally to FIG. 3 and particularly to, e.g., FIGS. 14-16, ratios of each of the amplitudes of alternating magnetic fields 386 to the magnitude of steady-state magnetic field 382 are less than 0.1 and greater than 0.0001.

The amplitudes of alternating magnetic fields 386 may be much smaller than the magnitude of steady-state magnetic field 382 to produce a system in which acoustic pressure has a significant, or more significant, contribution to impeding, preventing, reducing, and/or removing ice from airfoil 300. As all of the amplitudes of alternating magnetics fields 386 generally are equal, the ratios of each to the magnitude of steady-state magnetic field 382 generally are equal.

The following subject matter of this paragraph characterizes example 93 of the present disclosure, wherein example 93 also includes the subject matter according to any one of examples 80 to 92, above. Referring generally to FIG. 3 and particularly to, e.g., FIG. 14, control system 350 is configured to supply direct electrical current 346 to at least one of induction coils 328 to generate steady-state magnetic field 382 within skin 310.

Direct electrical current 346 in at least one of induction coils 328 generates a magnetic field including steady-state magnetic field 382 (also referred to as a DC magnetic field) within skin 310. Steady-state magnetic field 382 generally interacts with electrical currents (such as eddy currents 380) within skin 310 to produce force 384 (Lorentz force) within skin 310. The Lorenz force is proportional to the cross product of the velocity of a charged particle (such as an electron) and the magnetic field (B field), in the absence of an applied electric field. Force 384 due to alternating electrical currents (such as eddy currents 380) within skin 310 interacting with steady-state magnetic field 382 within skin 310 produces acoustic vibrations within skin 310 (at twice the frequency of the alternating electrical currents). Force 384 is absent (or zero) when eddy current 380 within skin 310 and steady-state magnetic field 382 are parallel. All other things being equal, force 384 is a maximum when eddy current 380 within skin 310 and steady-state magnetic field 382 are perpendicular. The interaction of eddy currents 380 with steady-state magnetic field 382 generates force 384 and acoustic vibrations directly in skin 310, without requiring acoustic contact to a sound source (e.g., no acoustic transducer such as piezoelectric element is required).

Because induction coils 328 and the magnetic field generated by direct electrical current 346 in at least one of induction coils 328 are within interior space 308 of airfoil 300 and skin 310 is magnetically conductive (and/or ferromagnetic), most or all of the resultant magnetic field (such as steady-state magnetic field 382) is contained within airfoil 300. Magnetic field lines that would otherwise extend beyond skin 310, if skin 310 were not present (or not magnetically conductive and/or ferromagnetic), are substantially redirected within skin 310. Thus, little to no magnetic field from direct electrical current 346 in at least one of induction coils 328 is present outside of airfoil 300. Hence, special precautions for operating near high magnetic fields are not needed for personnel, tools, or equipment operating outside of airfoil 300.

Steady-state magnetic field 382 is controllable by control system 350 by supplying (or not) direct electrical current 346 to at least one of induction coils 328. Steady-state magnetic field 382 may be turned on or off as desired to actuate the acoustic vibrations in skin 310. In addition to controlling acoustic vibrations, a controllable steady-state magnetic field may be turned off to eliminate high magnetic fields within airfoil 300. Thus, special precautions for operating near high magnetic fields within airfoil 300 may be avoided.

The following subject matter of this paragraph characterizes example 94 of the present disclosure, wherein example 94 also includes the subject matter according to example 93, above. Referring generally to FIG. 3 and particularly to, e.g., FIG. 14, control system 350 is configured to supply direct electrical current 346 to all of induction coils 328 to generate steady-state magnetic field 382 within skin 310.

By supplying direct electrical current 346 to all of induction coils 328, steady-state magnetic field 382 may be directed to a larger spatial extent, e.g., along the entirety of leading edge 306 on opposite surface of skin 310 of induction coils 328.

The following subject matter of this paragraph characterizes example 95 of the present disclosure, wherein example 95 also includes the subject matter according to any one of examples 93 to 94, above. Referring generally to FIG. 3 and particularly to, e.g., FIG. 14, steady-state magnetic field 382 is transverse to skin 310 at internal surface 314 of skin 310.

Eddy currents 380 are within skin 310 and hence are substantially parallel to skin 310. Steady-state magnetic field 382 is transverse to eddy currents 380 when also transverse to internal surface 314 of skin 310. Steady-state magnetic field 382 being transverse to eddy currents 380 generates force 384.

The following subject matter of this paragraph characterizes example 96 of the present disclosure, wherein example 96 also includes the subject matter according to any one of examples 93 to 95, above. Referring generally to FIG. 3 and particularly to, e.g., FIG. 14, at a location in skin 310 between leading edge 306 and a portion of internal surface 314 that is closest to leading edge 306, steady-state magnetic field 382 is transverse to leading edge 306.

Portion of internal surface 314 of skin 310 that is closest to leading edge 306 also may be referred to as the portion of internal surface 314 that is directly opposite, directly behind, and/or directly downstream of leading edge 306. Leading edge 306 is on external surface 312 of skin 310. A position on internal surface 314 of skin 310 that is closest to leading edge 306 is a position on internal surface 314 that is separated by leading edge 306 by the thickness of skin 310. Having steady-state magnetic field 382 transverse to leading edge 306 (and hence eddy current 380) near leading edge 306 permits applying inductive heat and acoustic pressure to skin 310 near leading edge 306. As force 384 is perpendicular to eddy current 380, force 384, in this arrangement, may be parallel to leading edge 306 (i.e., in the y-direction) or perpendicular to leading (i.e., in the z-direction).

The following subject matter of this paragraph characterizes example 97 of the present disclosure, wherein example 97 also includes the subject matter according to any one of examples 93 to 95, above. Referring generally to FIG. 3 and particularly to, e.g., FIG. 14, at a location in skin 310 between leading edge 306 and a portion of internal surface 314 that is closest to leading edge 306, steady-state magnetic field 382 is parallel to leading edge 306.

Having steady-state magnetic field 382 parallel to leading edge 306 (and hence eddy current 380) near leading edge 306 permits applying inductive heat and acoustic pressure to skin 310 near leading edge 306. As force 384 is perpendicular to eddy current 380, force 384, in this arrangement, may be perpendicular to leading edge 306 (i.e., in the x-direction).

The following subject matter of this paragraph characterizes example 98 of the present disclosure, wherein example 98 also includes the subject matter according to any one of examples 93 to 97, above. Referring generally to FIG. 3 and particularly to, e.g., FIG. 14, a magnitude of steady-state magnetic field 382 is greater than 0.1 T (tesla) and less than 100 T.

Steady-state magnetic field 382 is sufficiently strong so as to cause significant acoustic pressure in skin 310 when steady-state magnetic field 382 interacts with eddy currents 380 caused by phases 348 of alternating electrical current 334 in induction coils 328. Steady-state magnetic field 382 may be a strong magnetic field, with a magnitude greater than 0.1 T, and a magnetic field that is practical to generate with direct electrical current 346 flowing in at least one of induction coils 328.

The following subject matter of this paragraph characterizes example 99 of the present disclosure, wherein example 99 also includes the subject matter according to any one of examples 93 to 98, above. Referring generally to FIG. 3 and particularly to, e.g., FIG. 14, control system 350 comprises power supply 354, configured to supply one of phases 348 of alternating electrical current 334 and to supply direct electrical current 346 to at least one of induction coils 328.

Power supply 354 is configured to selectively supply alternating electrical current 334 to induction coil 330, thereby selectively producing eddy current 380, inductive heat, and/or acoustic pressure in skin 310.

The following subject matter of this paragraph characterizes example 100 of the present disclosure, wherein example 100 also includes the subject matter according to any one of examples 93 to 99, above. Referring generally to FIG. 3 and particularly to, e.g., FIG. 14, phases 348 of alternating electrical current 334 each generate alternating magnetic field 386 with an amplitude that is less than a magnitude of steady-state magnetic field 382.

Alternating magnetic fields 386 generate respective eddy currents 380 within skin 310, with the amplitudes of eddy currents 380 related to the amplitudes of respective alternating magnetic fields 386. The amplitude of eddy currents 380 affects the efficiency of inductive heat. The magnitude of steady-state magnetic field 382 affects the amplitude of force 384 that acts on skin 310 to produce acoustic pressure. Hence, the relative size of the amplitudes of alternating magnetic fields 386 and the magnitude of steady-state magnetic field 382 affects the relative contributions of inductive heat and acoustic pressure to impeding, preventing, reducing, and/or removing ice from airfoil 300. For the same field intensity (amplitude or magnitude), inductive heat would be more efficient that force generation. As all of the amplitudes of phases 348 of alternating electrical current 334 generally are equal, the amplitudes of alternating magnetics fields 386 generally are equal.

The following subject matter of this paragraph characterizes example 101 of the present disclosure, wherein example 101 also includes the subject matter according to example 100, above. Referring generally to FIG. 3 and particularly to, e.g., FIG. 14, ratios of the amplitudes of alternating magnetic fields 386 to the magnitude of steady-state magnetic field 382 are each less than 0.1 and greater than 0.0001.

The amplitudes of alternating magnetic fields 386 may be much smaller than the magnitude of steady-state magnetic field 382 to produce a system in which acoustic pressure has a significant, or more significant, contribution to impeding, preventing, reducing, and/or removing ice from airfoil 300. As all of the amplitudes of alternating magnetics fields 386 generally are equal, the ratios of each to the magnitude of steady-state magnetic field 382 generally are equal.

The following subject matter of this paragraph characterizes example 102 of the present disclosure, wherein example 102 also includes the subject matter according to any one of examples 93 to 101, above. Referring generally to FIG. 3 and particularly to, e.g., FIG. 14, amplitudes of each of phases 348 of alternating electrical current 334 are each less than a magnitude of direct electrical current 346.

Phases 348 of alternating electrical current 334 flowing in induction coils 328 generate alternating magnetic fields 386, with the amplitudes of alternating magnetic fields 386 related to the amplitudes of phases 348 of alternating electrical current 334. Alternating magnetic fields 386 generate eddy currents 380 within skin 310, with the amplitudes of eddy currents 380 related to the amplitudes of alternating magnetic fields 386 and the amplitudes of phases 348 of alternating electrical current 334. The amplitude of eddy current 380 affects the efficiency of inductive heat. Direct electrical current 346 flowing in at least one of induction coils 328 generates steady-state magnetic field 382, with the magnitude of steady-state magnetic field 382 related to the magnitude of direct electrical current 346. The magnitude of steady-state magnetic field 382 affects the amplitude of force 384 that acts on skin 310 to produce acoustic pressure. Hence, the relative size of the amplitudes of phases 348 of alternating electrical current 334 and the magnitude of direct electrical current 346 affects the relative contributions of inductive heat and acoustic pressure to impeding, preventing, reducing, and/or removing ice from airfoil 300. For the same field intensity (amplitude or magnitude), inductive heat would be more efficient that force generation.

The following subject matter of this paragraph characterizes example 103 of the present disclosure, wherein example 103 also includes the subject matter according to example 102, above. Referring generally to FIG. 3 and particularly to, e.g., FIG. 14, ratios of each of the amplitudes of phases 348 of alternating electrical current 334 and the magnitude of direct electrical current 346 are each less than 0.1 and greater than 0.0001.

The amplitudes of alternating magnetic fields 386 may be much smaller than the magnitude of steady-state magnetic field 382 to produce a system in which acoustic pressure has a significant, or more significant, contribution to impeding, preventing, reducing, and/or removing ice from airfoil 300. As all of the amplitudes of alternating magnetics fields 386 generally are equal, the ratios of each to the magnitude of steady-state magnetic field 382 generally are equal.

The following subject matter of this paragraph characterizes example 104 of the present disclosure, wherein example 104 also includes the subject matter according to any one of examples 80 to 103, above. Referring generally to FIG. 3 and particularly to, e.g., FIGS. 14-16, phases 348 of alternating electrical current 334 have a common frequency that is at least 100 kHz (kilohertz) and at most 10 MHz (megahertz).

Phases 348 of alternating electrical current 334 have a common frequency. The common frequency of phases 348 of alternating electrical current 334 affects the skin depth of inductive heat as discussed above. Higher frequencies have thinner skin depths. Efficiency of inductive heat improves when the skin depth is similar to the thickness of skin 310. For example, common frequency of phases 348 of alternating electrical current 380 may be selected to produce skin depth that is a small integer divisor of the thickness of skin 310 (e.g., a skin depth of ½ to ¼ of the thickness of skin 310). Also, the common frequency of phases 348 of alternating electrical current 334 is the frequency of eddy currents 380 and half the frequency of the acoustic pressure generated by eddy currents 380 interacting with steady-state magnetic field 382. Higher frequencies may lead to more efficient acoustic ice impediment, prevention, reduction, and/or removal. The common frequency of phases 348 of alternating electrical current 334 may be selected to tune (e.g., to balance) the effects of inductive heat and acoustic pressure on ice impediment, prevention, reduction, and/or removal from airfoil 300.

The following subject matter of this paragraph characterizes example 105 of the present disclosure, wherein example 105 also includes the subject matter according to example 104, above. Referring generally to FIG. 3 and particularly to, e.g., FIGS. 14-16, the common frequency of phases 348 of alternating electrical current 334 is at least 1 MHz.

Higher frequencies, such as a common frequency at least 1 MHz, may emphasize the effects of acoustic pressure over the effects of inductive heat.

The following subject matter of this paragraph characterizes example 106 of the present disclosure, wherein example 106 also includes the subject matter according to any one of examples 80 to 105, above. Referring generally to FIG. 3 and particularly to, e.g., FIGS. 14-16, induction coils 328 comprise at least three induction coils and wherein each of phases 348 of alternating electrical current 334 is unique.

Larger numbers of induction coils 328 and phases 348 may provide for more control over the waveform of the acoustic traveling wave of traveling-wave acoustic pressure. Three induction coils 330 and three phases 348 may facilitate using three-phase electrical power. The three phases may be equally distributed (as with three-phase power, where each phase is 120° from the other two phases) or unequally distributed.

The following subject matter of this paragraph characterizes example 107 of the present disclosure, wherein example 107 also includes the subject matter according to any one of examples 80 to 106, above. Referring generally to FIG. 3 and particularly to, e.g., FIGS. 14-16, each of induction coils 328 has a sheet form.

A sheet-form induction coil also may be referred to as a flat induction coil, a pancake induction coil, and/or a planar induction coil. In a sheet-form induction coil, the wire of the induction coil is spiraled into the shape of a substantially two-dimensional (2D) surface. The virtual 2D surface does not need to be a plane or flat. The virtual 2D surface may be a surface of a virtual three-dimensional (3D) structure such as the shape of the interior of airfoil 300, interior space 308, and/or internal surface 314 of skin 310. A sheet-form induction coil produces a magnetic field perpendicular to the sheet, at the core of the sheet-form induction coil (center of the spiral of wire). Sheet-form induction coils have high inductive coupling to skin 310 on opposite sides of the sheet that defines the shape of the sheet-form induction coil.

The following subject matter of this paragraph characterizes example 108 of the present disclosure, wherein example 108 also includes the subject matter according to any one of examples 80 to 107, above. Referring generally to FIG. 3, each of induction coils 328 has a volumetric form.

A volumetric-form induction coil is a coil that encloses a core volume with the center of the spiral of wire within the core volume. A sheet-form induction coil may or may not enclose a core volume (e.g., a sheet-form induction coil may conform to the shape of a cylindrical shell) but the center of the spiral of wire is within the sheet. Generally, a volumetric-form coil would be substantially tube-like with the wire spiraled around the outside of the virtual tube (e.g., the classical shape of a wire-wound inductor). A volumetric-form induction coil produces a magnetic field parallel to the center of the spiral of wire and generally parallel to the longitudinal axis of the enclosed volume.

The following subject matter of this paragraph characterizes example 109 of the present disclosure, wherein example 109 also includes the subject matter according to any one of examples 80 to 108, above. Referring generally to FIG. 3 and particularly to, e.g., FIGS. 14-16, portion 336 of each of induction coils 328 is no more than 10 mm away from internal surface 314 of skin 310.

Portions 336 of induction coils 328 are proximate to skin 310 and internal surface 314 of skin 310. When portion 336 is closer to skin 310 and internal surface 314 of skin 310, portion 336 of induction coil 330 may be better inductively coupled to skin 310 and/or may produce stronger eddy current 380. Hence, the distance between portion 336 of induction coil 330 and internal surface 314 of skin 310 affects the efficiency of applying inductive and acoustic pressure (also referred to as acoustic energy) within skin 310.

The following subject matter of this paragraph characterizes example 110 of the present disclosure, wherein example 110 also includes the subject matter according to example 109, above. Referring generally to FIG. 3 and particularly to, e.g., FIGS. 14-16, portion 336 of each of induction coils 328 is no more than 1 mm away from internal surface 314 of skin 310.

To improve efficiency, portions 336 of induction coils 328 is very close to internal surface 314 of skin 310. Generally, each portion 336 may be within a small integer multiple of the thickness of skin 310 and/or within a small integer multiple of the skin depth of the material of skin 310 at the frequency of alternating electrical current 334.

The following subject matter of this paragraph characterizes example 111 of the present disclosure, wherein example 111 also includes the subject matter according to any one of examples 80 to 110, above. Referring generally to FIG. 3 and particularly to, e.g., FIGS. 14-16, portion 336 of each induction coil 330 is parallel to skin 310.

Portions 336 of induction coils 328 may be located parallel to skin 310 to provide a substantially constant distance between skin 310 (i.e., internal surface 314 of skin 310) and portions 336 of induction coils 328. The constant distance may provide a substantially uniform coupling efficiency for inductive heat and/or substantially uniform eddy currents 380 across skin 310 that is parallel to portions 336. Portions 336 and/or substantially all of induction coils 328 (e.g., where at least one of induction coils 328 has a sheet form) may be substantially conformal to internal surface 314 of skin 310.

The following subject matter of this paragraph characterizes example 112 of the present disclosure, wherein example 112 also includes the subject matter according to any one of examples 80 to 111, above. Referring generally to FIG. 3 and particularly to, e.g., FIGS. 14-16, airfoil 300 is selected from the group consisting of a wing, an erosion shield, an empennage, a horizontal stabilizer, a vertical stabilizer, a winglet, a turbine-engine inlet, an engine nacelle, and a turbine blade.

Airfoil 300 may be a portion of an aircraft or other structure with aerodynamic surfaces. Such aircraft or structures may include one or more airfoils 300 and may include other aerodynamic surfaces that are not airfoils 300. Use of airfoils 300 on an aircraft or other structure may protect that aircraft or structure from the effects of ice formation. An erosion shield may form all or a substantial portion of a leading edge such as leading edge 306.

The following subject matter of this paragraph characterizes example 113 of the present disclosure, wherein example 113 also includes the subject matter according to any one of examples 80 to 112, above. Referring generally to FIG. 3, portion 336 of at least one of induction coils 328 is closer to leading edge 306 than portions 336 of all other ones of induction coils 328 and is positioned to heat leading edge 306.

Generally, induction coils 328 are positioned to heat and to apply acoustic pressure to leading edge 306 and regions of external surface 312 proximate to leading edge 306. Generally, ice formation and/or accumulation effects are strong at and near the leading edge of an aerodynamic structure. Having one or more portions 336 of induction coils 328 closer to leading edge 306 that other portions 336 permits concentrating inductive heat and/or acoustic pressure in regions of skin 310 near those closest portions 336.

The following subject matter of this paragraph characterizes example 114 of the present disclosure, wherein example 114 also includes the subject matter according to any one of examples 80 to 113, above. Referring generally to FIG. 3 and particularly to, e.g., FIGS. 14-16, portion 336 of each of induction coils 328 is closer to leading edge 306 than any other portion of that one of induction coils 328 and is positioned to heat leading edge 306.

Generally, induction coils 328 are positioned to heat and to apply acoustic pressure to leading edge 306 and regions of external surface 312 proximate to leading edge 306. Generally, ice formation and/or accumulation effects are strong at and near the leading edge of an aerodynamic structure.

The following subject matter of this paragraph characterizes example 115 of the present disclosure, wherein example 115 also includes the subject matter according to example 114, above. Referring generally to FIG. 3 and particularly to, e.g., FIGS. 14-16, portion 336 of at least one of induction coils 328 is transverse to leading edge 306.

Portion 336 of at least one of induction coils 328 is transverse to leading edge 306 when the parallel wires in portion 336 are transverse to leading edge 306. The direction of the parallel wires defines the direction of eddy current 380 within skin 310. Hence, where portion 336 of at least one of induction coils 328 is transverse to leading edge 306, eddy current 380 due to portion 336 of at least one of induction coils 328 with corresponding phase 348 of alternating current 334 flowing therethrough is transverse to leading edge 306. As force 384 is perpendicular to eddy current 380, force 384, in this arrangement, may be perpendicular to leading edge 306 (i.e., in the x-direction) or parallel to leading edge 306 (i.e., in the y-direction).

The following subject matter of this paragraph characterizes example 116 of the present disclosure, wherein example 116 also includes the subject matter according to example 114, above. Referring generally to FIG. 3, portion 336 of at least one of induction coils 328 is parallel to leading edge 306.

Portion 336 of at least one of induction coils 328 is parallel to leading edge 306 when the parallel wires in portion 336 are parallel to leading edge 306. The direction of the parallel wires defines the direction of eddy current 380 within skin 310. Hence, where portion 336 of at least one of induction coils 328 is parallel to leading edge 306, eddy current 380 due to portion 336 of at least one of induction coils 328 with corresponding phase 348 of alternating current 334 flowing therethrough is parallel to leading edge 306. As force 384 is perpendicular to eddy current 380, force 384, in this arrangement, may be perpendicular to leading edge 306 (e.g., in the x-direction or the z-direction).

The following subject matter of this paragraph characterizes example 117 of the present disclosure, wherein example 117 also includes the subject matter according to any one of examples 80 to 116, above. Referring generally to FIG. 3, airfoil 300 further comprises temperature sensor 360, configured to measure the ambient temperature of layer of fluid 318 flowing over external surface 312 of skin 310.

Temperature sensor 360 is configured to measure the ambient temperature and configured such that control system 350 may determine the ambient temperature through use of temperature sensor. For example, temperature sensor 360 may transfer a signal representative of the ambient temperature to control system 350. Temperature sensor 360 may be configured to measure ambient temperature directly or indirectly. For example, temperature sensor 360 may be in direct thermal contact with layer of fluid 318 flowing over external surface 312 of skin 310. As another example, temperature sensor 360 may be configured to measure the temperature of a portion of external surface 312 of skin 310, which is in thermal contact with layer of fluid 318 flowing over external surface 312. Examples of temperature sensors 360 include a thermocouple, a resistance temperature detector, an infrared sensor, and a thermistor. Additionally or alternatively, one or more temperature sensors 360 may be remote from airfoil 300 and configured to measure a temperature characteristic of and/or related to the ambient temperature of layer of fluid 318 flowing over external surface 312 of skin 310.

The following subject matter of this paragraph characterizes example 118 of the present disclosure, wherein example 118 also includes the subject matter according to any one of examples 80 to 117, above. Referring generally to FIG. 3 and particularly to, e.g., FIG. 14, control system 350 comprises power supply 354, configured to supply phases 348 of alternating electrical current 334 to induction coils 328.

Power supply 354 is configured to selectively supply phases 348 of alternating electrical current 334 to induction coils 328, thereby selectively producing eddy currents 380, inductive heat, and/or acoustic pressure in skin 310.

The following subject matter of this paragraph characterizes example 119 of the present disclosure, wherein example 119 also includes the subject matter according to example 118, above. Referring generally to FIG. 3 and particularly to, e.g., FIG. 14, power supply 354 is configured to supply three-phase alternating electrical current.

Three-phase alternating electrical current may be useful to facilitate electrical transmission and/or reliability of electrical transmission of power.

The following subject matter of this paragraph characterizes example 120 of the present disclosure, wherein example 120 also includes the subject matter according to any one of examples 118 to 119, above. Referring generally to FIG. 3 and particularly to, e.g., FIG. 14, control system 350 comprises controller 352, programmed to receive signals, representative of first ambient conditions known to cause formation of the ice on external surface 312 of skin 310 and second ambient conditions known to impede formation of the ice on external surface 312. The first ambient conditions and the second ambient conditions both comprise the ambient temperature of layer of fluid 318, flowing over external surface 312 of skin 310. Controller 352 is programmed to cause power supply 354 to supply phases 348 of alternating electrical current 334 to induction coils 328 to generate inductive heat and acoustic pressure in controlled region 316 of skin 310, based upon the first ambient conditions. Controller 352 is also programmed to cause power supply 354 to discontinue supplying phases 348 of alternating electrical current 334 to induction coils 328, based upon the second ambient conditions.

Controller 352 may be configured to turn on and off power supply 354 and thus to control the application of inductive heat and acoustic pressure based upon ambient conditions (e.g., first ambient conditions and second ambient conditions) which may otherwise cause ice to form or impede ice from forming on external surface 312 of skin 310. Controller 352 may be a computer (e.g., comprising a processor and memory) and/or dedicated hardware. Controller 352 may implement its functions (e.g., receiving signals, causing power supply 354 to supply current, and causing power supply 354 to discontinue supplying current) in software, firmware, and/or hardware. Controller 352 may be referred to as an embedded computer and/or an embedded system.

The following subject matter of this paragraph characterizes example 121 of the present disclosure, wherein example 121 also includes the subject matter according to example 120, above. Referring generally to FIG. 3 and particularly to, e.g., FIG. 14, controller 352 is additionally programmed to cause power supply 354 to supply phases 348 of alternating electrical current 334 to induction coils 328 when the ambient temperature is below a first threshold temperature.

Controller 352 may be configured to cause power supply 354 to supply current based on the ambient temperature being below a first threshold temperature such as a temperature known to permit ice to accumulate on external surface 312 of airfoil 300. The first threshold temperature may be a predetermined threshold or may be a function of other parameters (e.g., the temperature of external surface 312 of airfoil 300, humidity, operation time of hybrid acoustic induction-heating system 302, etc.).

The following subject matter of this paragraph characterizes example 122 of the present disclosure, wherein example 122 also includes the subject matter according to example 121, above. Referring generally to FIG. 3 and particularly to, e.g., FIG. 14, the first threshold temperature is above a freezing point of water and below 5° C.

The temperature range from the freezing point of water to 5° C. is a range in which water impacting airfoil 300 may transition from remaining liquid to accumulating as ice. Hence, the first threshold being within this range is a reasonable predictor of the need to turn on the inductive heat and acoustic pressure to impede, to prevent, to reduce, and/or to remove ice from airfoil 300.

The following subject matter of this paragraph characterizes example 123 of the present disclosure, wherein example 123 also includes the subject matter according to any one of examples 121 to 122, above. Referring generally to FIG. 3 and particularly to, e.g., FIG. 14, controller 352 is also programmed to cause power supply 354 to discontinue supplying phases 348 of alternating electrical current 334 to induction coils 328 when the ambient temperature is above a second threshold temperature.

Controller 352 may be configured to cause power supply 354 to discontinue supplying current based on the ambient temperature being above a second threshold temperature such as a temperature known to not significantly permit ice to accumulate on external surface 312 of airfoil 300. The second threshold temperature may be a predetermined threshold or may be a function of other parameters (e.g., the temperature of external surface 312 of airfoil 300, humidity, operation time of hybrid acoustic induction-heating system 302, etc.).

The following subject matter of this paragraph characterizes example 124 of the present disclosure, wherein example 124 also includes the subject matter according to example 123, above. Referring generally to FIG. 3 and particularly to, e.g., FIGS. 14-16, the second threshold temperature is different than the first threshold temperature.

The second threshold temperature value may be the same as or different than the first threshold temperature value. Different values for the second threshold temperature and the first threshold temperature permit the controller to turn on or off the inductive heat and acoustic pressure at different temperatures.

The following subject matter of this paragraph characterizes example 125 of the present disclosure, wherein example 125 also includes the subject matter according to any one of examples 123 to 124, above. Referring generally to FIG. 3 and particularly to, e.g., FIGS. 14-16, the second threshold temperature is greater than the first threshold temperature.

The second threshold temperature being higher than the first threshold temperature tends to prevent oscillation in the turning on and turning off of the inductive heat and acoustic pressure. If the second threshold temperature is the same as the first threshold temperature, small variations in the ambient temperature about the single temperature threshold may cause to controller 352 to command power supply 354 in contrary manners in rapid succession. If by supplying alternating electrical current 334, the ambient temperature is increased, the act of causing power supply 354 to supply current could cause the ambient temperature to rise and thereby cause controller 352 to cause power supply 354 to discontinue supplying current, with the likely consequence of reducing the ambient temperature. Such conditions could cause controller 352 and hybrid acoustic induction-heating system 302 to oscillate and ineffectively supply inductive heat and acoustic pressure.

The following subject matter of this paragraph characterizes example 126 of the present disclosure, wherein example 126 also includes the subject matter according to any one of examples 123 to 125, above. Referring generally to FIG. 3 and particularly to, e.g., FIGS. 14-16, the second threshold temperature is above 2° C. and below 10° C.

The temperature range from above 2° C. to below 10° C. is a range in which water impacting airfoil 300 may transition from accumulating as ice to remaining liquid. Hence, the second threshold being within this range is a reasonable predictor of the need to turn off the inductive heat and acoustic pressure to impede, to prevent, to reduce, and/or to remove ice from airfoil 300.

The following subject matter of this paragraph characterizes example 127 of the present disclosure, wherein example 127 also includes the subject matter according to any one of examples 80 to 126, above. Referring generally to FIG. 3 and particularly to, e.g., FIGS. 14-16, skin 310 comprises a nickel-iron alloy.

Nickel-iron alloys are a class of alloys that are suitable for skin 310. Nickel-iron alloys are electrically and magnetically conductive, and are susceptible to inductive heat and acoustic pressure generation.

The following subject matter of this paragraph characterizes example 128 of the present disclosure, wherein example 128 also includes the subject matter according to any one of examples 80 to 127, above. Referring generally to FIG. 3 and particularly to, e.g., FIGS. 14-16, skin 310 has a thickness of less than 1 mm and greater than 0.001 mm.

Skin 310 generally is thin so that skin 310 may be affected rapidly by the inductive heat and acoustic pressure generated by hybrid acoustic induction-heating system 302. The thickness of skin 310 may be selected based on practical and/or desired frequencies of phases 348 of alternating electrical current 334 and/or skin depth at those frequencies. Skin 310 is thick enough to maintain structural integrity when subjected to conditions of airfoil 300.

The following subject matter of this paragraph characterizes example 129 of the present disclosure, wherein example 129 also includes the subject matter according to any one of examples 80 to 128, above. Referring generally to FIG. 3 and particularly to, e.g., FIGS. 14-16, skin 310 is ferromagnetic.

As discussed above, skin 310 may be ferromagnetic to concentrate magnetic fields within skin 310.

The following subject matter of this paragraph characterizes example 130 of the present disclosure, wherein example 130 also includes the subject matter according to any one of examples 80 to 129, above. Referring generally to FIG. 3 and particularly to, e.g., FIGS. 14-16, skin 310 has relative magnetic permeability of greater than 1,000 and less than 10,000,000.

Magnetic materials have a relative magnetic permeability significantly greater than unity. Non-magnetic materials have a relative magnetic permeability near unity. Higher relative magnetic permeabilities indicate a higher affinity for and concentration of magnetic fields within the material. Typical magnetic materials have a relative magnetic permeability greater than about 100. Highly magnetic materials have a relative magnetic permeability of greater than about 1,000. All known materials have a relative magnetic permeability of less than 10,000,000.

The following subject matter of this paragraph characterizes example 131 of the present disclosure, wherein example 131 also includes the subject matter according to any one of examples 80 to 130, above. Referring generally to FIG. 3 and particularly to, e.g., FIGS. 14-16, skin 310 has Curie temperature less than 300° C. and greater than 50° C.

The Curie temperature is a transition temperature of ferromagnetic materials. Below the Curie temperature, the material has a high relative magnetic permeability. Above the Curie temperature, the material is paramagnetic with a lower relative magnetic permeability. If skin 310 becomes paramagnetic (as opposed to ferromagnetic or magnetically conductive at a particular temperature), the efficiency of inductive heat and/or generation of acoustic pressure will be significantly reduced. Hence, if the Curie temperature of skin 310 is sufficiently low, hybrid acoustic induction-heating system 302 may be configured to automatically cease significant induction-heating and/or acoustic pressure generation if skin 310 becomes too hot (e.g., in the event of a malfunction of hybrid acoustic induction-heating system 302 or excessive solar heating of airfoil 300).

The following subject matter of this paragraph characterizes example 132 of the present disclosure, wherein example 132 also includes the subject matter according to any one of examples 80 to 131, above. Referring generally to FIG. 3, airfoil 300 further comprises electrical insulator 320 in interior space 308, wherein electrical insulator 320 is coupled to skin 310.

Electrically conductive and/or magnetically conductive materials within airfoil 300 may be heated and/or subject to acoustic pressure in a similar manner as skin 310. Hence, forms, supports, and other structures within airfoil 300 may be electrically insulating and/or located sufficiently far away from induction coil 330 and/or magnet 340.

The following subject matter of this paragraph characterizes example 133 of the present disclosure, wherein example 133 also includes the subject matter according to example 132, above. Referring generally to FIG. 3, electrical insulator 320 supports skin 310.

Airfoils 300 may be constructed with an internal support, such as electrical insulator 320, to support skin 310 and/or induction coil 330, and/or to maintain the aerodynamic shape of airfoil 300.

The following subject matter of this paragraph characterizes example 134 of the present disclosure, wherein example 134 also includes the subject matter according to any one of examples 132 to 133, above. Referring generally to FIG. 3, electrical insulator 320 supports at least one magnet 340.

At least one magnet 340 produces a steady-state magnetic field that may contribute to steady-state magnetic field 382 that affects acoustic pressure in controlled region 316 of skin 310. Each of at least one magnet 340 may be permanent magnet 342 or electromagnet 344.

Referring generally to FIG. 17 and to FIGS. 1-16, method 400 of impeding formation of ice on exterior surface 104, 204, 304 of airfoil 100, 200, 300 is disclosed. Method 400 comprises (block 402) detecting first ambient conditions known to cause the ice to form on exterior surface 104, 204, 304. Method 400 also comprises (block 404) supplying inductive heat and acoustic pressure to exterior surface 104, 204, 304 when the first ambient conditions are detected. Method 400 additionally comprises (block 406) detecting second ambient conditions, known to impede the ice from forming on exterior surface 104, 204, 304. Method 400 further comprises (block 408) discontinuing to supply the inductive heat and the acoustic pressure to exterior surface 104, 204, 304 when the second ambient conditions are detected. The preceding subject matter of this paragraph characterizes example 135 of the present disclosure.

Method 400 permits impeding, preventing, reducing, and/or removing ice that may form on exterior surface of airfoil. Method 400 comprises detecting 402 first ambient conditions known to cause the ice to form. Detecting 402 the first ambient conditions permits responding to the ambient conditions that cause ice to form (e.g., by supplying 404). Method 400 comprises supplying 404 inductive heat and acoustic pressure to exterior surface when the first ambient conditions are detected. Supplying 404 inductive heat and acoustic pressure impedes, prevents, reduces, and/or removes ice that may form on exterior surface of airfoil as discussed with respect to hybrid acoustic induction-heating systems 102, 202, 302. Method 400 comprises detecting 406 second ambient conditions known to impede the ice from forming. Detecting 406 the second ambient conditions permits responding to the ambient conditions that impede ice formation (e.g., by discontinuing 408). Method 400 comprises discontinuing 408 to supply the inductive heat and the acoustic pressure to exterior surface when the second ambient conditions are detected. In the second ambient conditions ice formation is impeded by the current conditions without any need for inductive heat or acoustic pressure. Thus energy may be saved by discontinuing 408 to supply inductive heat and acoustic pressure when conditions no longer warrant continuing.

Supplying 404 inductive heat may be used to increase and/or to maintain the temperature of skin of airfoil, in particular exterior surface and/or leading edge. Supplying 404 acoustic pressure may generate acoustic vibrations in exterior surface that impedes ice formation. Acoustic vibrations may keep exterior surface non-static (vibrating). A static (non-vibrating) structure may be more amenable to ice nucleation, moisture adhesion, and/or heat transfer to moisture particles than a non-static (vibrating) structure. The combination of inductive heat and acoustic pressure (in the form of acoustic vibration) may more efficiently impede, prevent, reduce, and/or remove ice from an airfoil than use of either technique alone.

The following subject matter of this paragraph characterizes example 136 of the present disclosure, wherein example 136 also includes the subject matter according to example 135, above. Referring generally to FIG. 17 and to FIGS. 1-16, according to method 400, exterior surface 104, 204, 304 is external surface 112, 212, 312 of skin 110, 210, 310. The skin 110, 210, 310 comprises internal surface 114, 214, 314 that is opposite external surface 112, 212, 312. Skin 110, 210, 310 is magnetically and electrically conductive. According to method 400, (block 404) supplying inductive heat and acoustic pressure to exterior surface 104, 204, 304 comprises (block 420) generating eddy current 180, 280, 380 in skin 110, 210, 310 and establishing steady-state magnetic field 182, 282, 382 in skin 110, 210, 310 that is transverse to eddy current 180, 280, 380. Eddy current 180, 280, 380 is an electrical current that is alternating and that produces Joule heating in skin 110, 210, 310.

Eddy currents are inductively generated in skin and produce heat in skin by Joule heating. Steady-state magnetic field that is transverse to eddy current produces force (Lorentz force) within skin. The Lorentz force is proportional to the cross product of the velocity of a charge particle (such as an electron) the magnetic field (B field), in the absence of an applied electric field. Lorentz force due to alternating electrical currents (such as eddy current) within skin interacting with steady-state magnetic field within skin produces acoustic vibrations within skin (at twice the frequency of the alternating electrical current). The interaction of eddy current with steady-state magnetic field generates Lorentz force and acoustic vibrations directly in skin, without requiring acoustic contact to a sound source (e.g., no acoustic transducer such as piezoelectric element is required). In the skin, the Lorentz force would be zero, because the cross produce would be zero, if the eddy current and the steady-state magnetic field were parallel in the skin. Hence, steady-state magnetic field is transverse to produce Lorentz force and acoustic vibration.

The following subject matter of this paragraph characterizes example 137 of the present disclosure, wherein example 137 also includes the subject matter according to example 136, above. Referring generally to FIG. 17 and to FIGS. 1-16, according to method 400, steady-state magnetic field 182, 282, 382 is perpendicular to eddy current 180, 280, 380.

Lorentz force is substantially maximized by producing steady-state magnetic field perpendicular to eddy current because the cross product of the Lorentz force is at a maximum.

The following subject matter of this paragraph characterizes example 138 of the present disclosure, wherein example 138 also includes the subject matter according to any one of examples 136 to 137, above. Referring generally to FIG. 17 and to FIGS. 1-16, according to method 400, establishing steady-state magnetic field 182, 282, 382 comprises arranging permanent magnet 142, 242, 342 within interior space 108, 208, 308 formed by skin 110, 210, 310.

Steady-state magnetic field may be a permanent magnetic field from permanent magnet. Permanent magnet produces a magnetic field without electronics or electrical current flow. Hence, use of permanent magnet may simplify construction and/or control of airfoil and/or hybrid acoustic induction-heating system. Arranging permanent magnet within interior space formed by skin prevents permanent magnet from affecting aerodynamic airflow across airfoil.

Because permanent magnet is within interior space of airfoil and provided that skin is magnetically conductive (and/or ferromagnetic), most or all of the resultant magnetic field (such as steady-state magnetic field) is contained within airfoil. Magnetic field lines that would otherwise extend beyond skin, if skin were not present (or not magnetically conductive and/or ferromagnetic), are substantially redirected within skin. Thus, little to no magnetic field from permanent magnet is present outside of airfoil. Hence, special precautions for operating near high magnetic fields are not needed for personnel, tools, or equipment operating outside of airfoil.

The following subject matter of this paragraph characterizes example 139 of the present disclosure, wherein example 139 also includes the subject matter according to any one of examples 136 to 138, above. Referring generally to FIG. 17 and to FIGS. 1-16, according to method 400, establishing steady-state magnetic field 182, 282, 382 comprises supplying direct electrical current 146, 246, 346 to induction coil 130, 230, 330 within interior space 108, 208, 308 formed by skin 110, 210, 310.

Direct electrical current (also referred to as DC current and steady-state current) in induction coil generates a steady-state magnetic field within skin. Steady-state magnetic field generally interacts with electrical currents (such as eddy current) within skin to produce force (Lorentz force) within skin.

Because induction coil and the magnetic field generated by direct electrical current in induction coil are within interior space of airfoil and skin is magnetically conductive (and/or ferromagnetic), most or all of the resultant magnetic field (such as steady-state magnetic field) is contained within airfoil. Magnetic field lines that would otherwise extend beyond skin, if skin were not present (or not magnetically conductive and/or ferromagnetic), are substantially redirected within skin. Thus, little to no magnetic field from direct electrical current in induction coil is present outside of airfoil. Hence, special precautions for operating near high magnetic fields are not needed for personnel, tools, or equipment operating outside of airfoil.

Steady-state magnetic field is controllable by supplying (or not) direct electrical current to induction coil. Steady-state magnetic field may be turned on or off as desired to actuate the acoustic vibrations in skin. In addition to controlling acoustic vibrations, a controllable steady-state magnetic field may be turned off to eliminate high magnetic fields within airfoil. Thus, special precautions for operating near high magnetic fields within airfoil may be avoided.

The following subject matter of this paragraph characterizes example 140 of the present disclosure, wherein example 140 also includes the subject matter according to any one of examples 136 to 139, above. Referring generally to FIG. 17 and to FIGS. 1-16, according to method 400, steady-state magnetic field 182, 282, 382 has a magnitude greater than an amplitude of alternating magnetic field 186, 286, 386 corresponding to eddy current 180, 280, 380.

Alternating magnetic field generates eddy current within skin, with the amplitude of eddy current related to the amplitude of alternating magnetic field. The amplitude of eddy current affects the efficiency of inductive heat. The magnitude of steady-state magnetic field affects the amplitude of force that acts on skin to produce acoustic pressure. Hence, the relative size of the amplitude of alternating magnetic field and the magnitude of steady-state magnetic field affects the relative contributions of inductive heat and acoustic pressure to impeding, preventing, reducing, and/or removing ice from airfoil. For the same field intensity (amplitude or magnitude), inductive heat would be more efficient that force generation.

The following subject matter of this paragraph characterizes example 141 of the present disclosure, wherein example 141 also includes the subject matter according to example 140, above. Referring generally to FIG. 17 and to FIGS. 1-16, according to method 400, a ratio of the amplitude of alternating magnetic field 186, 286, 386 to the magnitude of steady-state magnetic field 182, 282, 382 is less than 0.1 and greater than 0.0001.

The amplitude of alternating magnetic field may be much smaller than the magnitude of steady-state magnetic field to produce a system in which acoustic pressure has a significant, or more significant, contribution to impeding, preventing, reducing, and/or removing ice from airfoil.

The following subject matter of this paragraph characterizes example 142 of the present disclosure, wherein example 142 also includes the subject matter according to any one of examples 140 to 141, above. Referring generally to FIG. 17 and to FIGS. 1-16, according to method 400, the magnitude of steady-state magnetic field 182, 282, 382 is greater than 0.1 T (tesla) and less than 100 T.

Steady-state magnetic field is sufficiently strong so as to cause significant acoustic pressure in skin when steady-state magnetic field interacts with eddy current caused by alternating electrical current in induction coil. Steady-state magnetic field may be a strong magnetic field, with a magnitude greater than 0.1 T, and a magnetic field that is practical to generate with direct electrical current flowing in induction coil.

The following subject matter of this paragraph characterizes example 143 of the present disclosure, wherein example 143 also includes the subject matter according to any one of examples 135 to 142, above. Referring generally to FIG. 17 and to FIGS. 1-16, according to method 400, the acoustic pressure is continuous wave acoustic pressure.

Continuous wave acoustic pressure is acoustic pressure with a substantially constant waveform (e.g., a sine wave). Continuous wave acoustic pressure is not impulsive. That is, supplying 404 does not require short impulses or bursts of acoustic pressure to impede, prevent, reduce, and/or remove ice that may form. Continuous wave acoustic pressure may be simpler and/or more energy efficient to produce.

The following subject matter of this paragraph characterizes example 144 of the present disclosure, wherein example 144 also includes the subject matter according to any one of examples 135 to 143, above. Referring generally to FIG. 17 and to FIGS. 1-16, according to method 400, (block 404) supplying inductive heat and acoustic pressure to exterior surface 104, 204, 304 comprises inductively generating acoustic waves on exterior surface 104, 204, 304.

Acoustic waves are oscillatory vibrations in exterior surface. The vibrating exterior surface may reduce available surface area and/or contact time for moisture to nucleate into ice, to adhere to surface, and/or to transfer heat to surface. Hence, the vibrating exterior surface enhances the impediment, prevention, reduction, and/or removal of ice from exterior surface.

The following subject matter of this paragraph characterizes example 145 of the present disclosure, wherein example 145 also includes the subject matter according to example 144, above. Referring generally to FIG. 17 and to FIGS. 1-16, according to method 400, inductively generating acoustic waves on exterior surface 104, 204, 304 comprises generating the acoustic waves with an amplitude and a frequency sufficient to impede moisture particles from freezing on exterior surface 104, 204, 304 by reducing a contact time between the moisture particles and exterior surface 104, 204, 304.

A reduced contact time for moisture particles may reduce ice nucleation, moisture adhesion, and/or heat transfer. Hence, the reduced contact time enhances the impedance, prevention, reduction, and/or removal of ice from exterior surface.

The following subject matter of this paragraph characterizes example 146 of the present disclosure, wherein example 146 also includes the subject matter according to any one of examples 144 to 145, above. Referring generally to FIG. 17 and to FIGS. 1-16, according to method 400, inductively generating acoustic waves on exterior surface 104, 204, 304 comprises generating the acoustic waves with an amplitude and a frequency sufficient to impede moisture particles from freezing on exterior surface 104, 204, 304 by reducing an effective contact surface area between the moisture particles and exterior surface 104, 204, 304.

A reduced effective contact surface area for moisture particles may reduce ice nucleation, moisture adhesion, and/or heat transfer. Hence, the reduced effective contact surface area enhances the impedance, prevention, reduction, and/or removal of ice from exterior surface.

The following subject matter of this paragraph characterizes example 147 of the present disclosure, wherein example 147 also includes the subject matter according to any one of examples 144 to 146, above. Referring generally to FIG. 17 and to FIGS. 1-16, according to method 400, inductively generating acoustic waves on exterior surface 104, 204, 304 comprises generating the acoustic waves with an amplitude, at exterior surface 104, 204, 304, of less than 1 μm (micron) and greater than 0.001 μm.

Small amplitude acoustic waves may sufficiently impede, prevent, reduce, and/or remove ice from exterior surface of airfoil. Larger amplitude acoustic waves may lead to stress and fatigue of exterior surface and/or skin. Larger amplitude acoustic wave may require higher energy to generate than lower amplitude acoustic waves. Hence, use of small amplitude acoustic waves may be less detrimental to exterior surface and/or skin, and may be more energy efficient.

The following subject matter of this paragraph characterizes example 148 of the present disclosure, wherein example 148 also includes the subject matter according to example 147, above. Referring generally to FIG. 17 and to FIGS. 1-16, according to method 400, the amplitude is less than 100 nm (nanometers) and greater than 1 nm.

Very small amplitude acoustic waves may sufficiently impede, prevent, reduce, and/or remove ice from exterior surface of airfoil. Amplitudes less than 100 nm may have negligible effect on the structural integrity of exterior surface and/or skin.

The following subject matter of this paragraph characterizes example 149 of the present disclosure, wherein example 149 also includes the subject matter according to any one of examples 144 to 148, above. Referring generally to FIG. 17 and to FIGS. 1-16, according to method 400, inductively generating acoustic waves on exterior surface 104, 204, 304 comprises generating the acoustic waves with a frequency of at least 200 kHz (kilohertz) and at most 20 MHz (megahertz).

The frequency of alternating electrical current affects the skin depth of inductive heat as discussed above. Higher frequencies have thinner skin depths. Efficiency of inductive heat improves when the skin depth is similar to the thickness of skin. For example, the frequency of alternating electrical current may be selected to produce skin depth that is a small integer divisor of the thickness of skin (e.g., a skin depth of ½ to ¼ of the thickness of skin). Also, the frequency of alternating electrical current is the frequency of eddy current and half the frequency of the acoustic pressure generated by eddy current interacting with steady-state magnetic field. Higher frequencies may lead to more efficient acoustic ice impediment, prevention, reduction, and/or removal. The frequency of alternating electrical current may be selected to tune (e.g., to balance) the effects of inductive heat and acoustic pressure on ice impediment, prevention, reduction, and/or removal from airfoil. The frequency of the acoustic waves of the acoustic pressure is twice the frequency of alternating electrical current.

The following subject matter of this paragraph characterizes example 150 of the present disclosure, wherein example 150 also includes the subject matter according to example 149, above. Referring generally to FIG. 17 and to FIGS. 1-16, according to method 400, the frequency of the acoustic waves is at least 2 MHz.

Higher frequencies of alternating electrical current, such as a frequency at least 1 MHz, may emphasize the effects of acoustic pressure over the effects of inductive heat. The frequency of the acoustic waves of the acoustic pressure is twice the frequency of alternating electrical current.

The following subject matter of this paragraph characterizes example 151 of the present disclosure, wherein example 151 also includes the subject matter according to any one of examples 144 to 150, above. Referring generally to FIG. 17 and to FIGS. 1-16, according to method 400, the acoustic waves have a displacement parallel to exterior surface 104, 204, 304.

Acoustic waves with a displacement parallel to exterior surface may be referred to as shear waves. Shear waves may efficiently impede, prevent, reduce, and/or remove ice from exterior surface.

The following subject matter of this paragraph characterizes example 152 of the present disclosure, wherein example 152 also includes the subject matter according to example 151, above. Referring generally to FIG. 17 and to FIGS. 1-16, according to method 400, airfoil 100, 200, 300 comprises leading edge 106, 206, 306, and the acoustic waves have a displacement parallel to leading edge 106, 206, 306.

Leading edge is along exterior surface. Hence, a displacement parallel to leading edge is also parallel to exterior surface at leading edge. Thus, acoustic waves with a displacement parallel to leading edge are shear waves along exterior surface at leading edge. Shear waves may efficiently impede, prevent, reduce, and/or remove ice from leading edge at exterior surface.

The following subject matter of this paragraph characterizes example 153 of the present disclosure, wherein example 153 also includes the subject matter according to example 151, above. Referring generally to FIG. 17 and to FIGS. 1-16, according to method 400, airfoil 100, 200, 300 comprises leading edge 106, 206, 306, and the acoustic waves have a displacement transverse to leading edge 106, 206, 306.

Leading edge is along exterior surface. Transverse to leading edge includes parallel to exterior surface and perpendicular to exterior surface. Acoustic waves with a displacement perpendicular to exterior surface may be referred to as compression waves. Thus, acoustic waves with a displacement transverse to leading edge include shear waves and/or compression waves. Shear waves may efficiently impede, prevent, reduce, and/or remove ice from leading edge at exterior surface. Compression waves may efficiently impede, prevent, reduce, and/or remove ice from leading edge at exterior surface.

The following subject matter of this paragraph characterizes example 154 of the present disclosure, wherein example 154 also includes the subject matter according to any one of examples 144 to 150, above. Referring generally to FIG. 17 and to FIGS. 1-16, according to method 400, the acoustic waves have a displacement transverse to exterior surface 104, 204, 304.

Acoustic waves with a displacement perpendicular to exterior surface may be referred to as compression waves. Compression waves may efficiently impede, prevent, reduce, and/or remove ice from exterior surface.

The following subject matter of this paragraph characterizes example 155 of the present disclosure, wherein example 155 also includes the subject matter according to any one of examples 144 to 154, above. Referring generally to FIG. 17 and to FIGS. 1-16, according to method 400, the acoustic waves are traveling waves.

Traveling-wave acoustic pressure vibrates different parts of skin at different phases, with the peak amplitude of vibration shifting in location across external surface of skin according to the instantaneous phase of the vibration. Traveling waves may be generated by producing eddy currents with different phases.

The following subject matter of this paragraph characterizes example 156 of the present disclosure, wherein example 156 also includes the subject matter according to any one of examples 135 to 155, above. Referring generally to FIG. 17 and to FIGS. 1-16, according to method 400, (block 404) supplying the inductive heat and the acoustic pressure to exterior surface 104, 204, 304 comprises (block 430) delivering alternating electrical current 134, 234, 334 to induction coil 130, 230, 330 inside airfoil 100, 200, 300.

Delivering 430 alternating electrical current to induction coil produces alternating magnetic field. Alternating magnetic field interacts with electrically conductive skin to produce eddy current if induction coil is situated sufficiently close (i.e., if induction coil is inductively coupled to skin). The interaction of eddy current with steady-state magnetic field in skin generates Lorentz force and acoustic vibrations directly in skin, without requiring acoustic contact to a sound source (e.g., no acoustic transducer such as piezoelectric element is used).

The following subject matter of this paragraph characterizes example 157 of the present disclosure, wherein example 157 also includes the subject matter according to example 156, above. Referring generally to FIG. 17 and to FIGS. 1-16, according to method 400, (block 404) supplying the inductive heat and the acoustic pressure to exterior surface 104, 204, 304 comprises embedding induction coil 130, 230, 330 within steady-state magnetic field 182, 282, 382 that has a magnitude greater than an amplitude of alternating magnetic field 186, 286, 386, generated by alternating electrical current 134, 234, 334, flowing in induction coil 130, 230, 330.

Alternating magnetic field generates eddy current within skin, with the amplitude of eddy current related to the amplitude of alternating magnetic field. The amplitude of eddy current affects the efficiency of inductive heat. The magnitude of steady-state magnetic field affects the amplitude of Lorentz force that acts on skin to produce acoustic pressure. Hence, the relative size of the amplitude of alternating magnetic field and the magnitude of steady-state magnetic field affects the relative contributions of inductive heat and acoustic pressure to impeding, preventing, reducing, and/or removing ice from airfoil. For the same field intensity (amplitude or magnitude), inductive heat would be more efficient that force generation.

The following subject matter of this paragraph characterizes example 158 of the present disclosure, wherein example 158 also includes the subject matter according to example 157, above. Referring to FIG. 17 and to FIGS. 1-16, according to method 400, (block 404) supplying the inductive heat and the acoustic pressure to exterior surface 104, 204, 304 comprises generating steady-state magnetic field 182, 282, 382 by delivering direct electrical current 146, 246, 346 to induction coil 130, 230, 330.

Direct electrical current (also referred to as DC current and steady-state current) in induction coil generates a steady-state magnetic field within skin. Steady-state magnetic field generally interacts with electrical currents (such as eddy current) within skin to produce force (Lorentz force) within skin.

Because induction coil and the magnetic field generated by direct electrical current in induction coil are within interior space of airfoil and skin is magnetically conductive (and/or ferromagnetic), most or all of the resultant magnetic field (such as steady-state magnetic field) is contained within airfoil. Magnetic field lines that would otherwise extend beyond skin, if skin were not present (or not magnetically conductive and/or ferromagnetic), are substantially redirected within skin. Thus, little to no magnetic field from direct electrical current in induction coil is present outside of airfoil. Hence, special precautions for operating near high magnetic fields are not needed for personnel, tools, or equipment operating outside of airfoil.

Steady-state magnetic field is controllable by supplying (or not) direct electrical current to induction coil. Steady-state magnetic field may be turned on or off as desired to actuate the acoustic vibrations in skin. In addition to controlling acoustic vibrations, a controllable steady-state magnetic field may be turned off to eliminate high magnetic fields within airfoil. Thus, special precautions for operating near high magnetic fields within airfoil may be avoided.

The following subject matter of this paragraph characterizes example 159 of the present disclosure, wherein example 159 also includes the subject matter according to example 158, above. Referring generally to FIG. 17 and to FIGS. 1-16, according to method 400, an amplitude of alternating electrical current 134, 234, 334 is less than a magnitude of direct electrical current 146, 246, 346.

Alternating electrical current flowing in induction coil generates alternating magnetic field, with the amplitude of alternating magnetic field related to the amplitude of alternating electrical current. Alternating magnetic field generates eddy current within skin, with the amplitude of eddy current related to the amplitude of alternating magnetic field and the amplitude of alternating electrical current. The amplitude of eddy current affects the efficiency of inductive heat. Direct electrical current flowing in induction coil generates steady-state magnetic field, with the magnitude of steady-state magnetic field related to the magnitude of direct electrical current. The magnitude of steady-state magnetic field affects the amplitude of force that acts on skin to produce acoustic pressure. Hence, the relative size of the amplitude of alternating electrical current and the magnitude of direct electrical current affects the relative contributions of inductive heat and acoustic pressure to impeding, preventing, reducing, and/or removing ice from airfoil. For the same field intensity (amplitude or magnitude), inductive heat would be more efficient that force generation.

The following subject matter of this paragraph characterizes example 160 of the present disclosure, wherein example 160 also includes the subject matter according to any one of examples 158 to 159, above. Referring generally to FIG. 17 and to FIGS. 1-16, according to method 400, a ratio of an amplitude of alternating electrical current 134, 234, 334 to a magnitude of direct electrical current 146, 246, 346 is less than 0.1 and greater than 0.0001.

The amplitude of alternating electrical current may be much smaller than the magnitude of direct electrical current to produce a system in which acoustic pressure has a significant, or more significant, contribution to impeding, preventing, reducing, and/or removing ice from airfoil.

The following subject matter of this paragraph characterizes example 161 of the present disclosure, wherein example 161 also includes the subject matter according to any one of examples 157 to 160, above. Referring generally to FIG. 17 and to FIGS. 1-16, according to method 400, steady-state magnetic field 182, 282, 382 is generated by permanent magnet 142, 242, 342 within airfoil 100, 200, 300.

Permanent magnet produces a magnetic field without electronics or electrical current flow. Hence, use of permanent magnet may simplify construction and/or control of airfoil and/or hybrid acoustic induction-heating system.

The following subject matter of this paragraph characterizes example 162 of the present disclosure, wherein example 162 also includes the subject matter according to any one of examples 157 to 161, above. Referring generally to FIG. 17 and to FIGS. 1-16, according to method 400, (block 404) supplying the inductive heat and the acoustic pressure to exterior surface 104, 204, 304 comprises generating steady-state magnetic field 182, 282, 382 by energizing electromagnet 144, 244, 344.

Electromagnet produces steady-state magnetic field when a steady-state (direct current, DC) electrical current flows through a coil. The magnetic field may be turned on or off by controlling the electrical current flow. Additionally or alternatively, the magnetic field strength and direction may be adjusted according to the electrical current flow. Electromagnet generally is controllable and may be referred to as a controllable magnet. Induction coil may serve as the coil of electromagnet. Induction coil may be adapted to flow steady-state electrical current so that induction coil may produce steady-state magnetic field. The steady-state electrical current to produce steady-state magnetic field is typically much greater (has a much greater magnitude) than the amplitude of alternating electrical current. Hence, induction coil adapted to flow steady-state electrical current may have wires with a higher cross section (lower resistance) than corresponding wires of induction coil that is adapted to flow only alternating electrical current.

The following subject matter of this paragraph characterizes example 163 of the present disclosure, wherein example 163 also includes the subject matter according to any one of examples 157 to 162, above. Referring generally to FIG. 17 and to FIGS. 1-16, according to method 400, a ratio of the amplitude of alternating magnetic field 186, 286, 386 to the magnitude of steady-state magnetic field 182, 282, 382 is less than 0.1 and greater than 0.0001.

The amplitude of alternating magnetic field may be much smaller than the magnitude of steady-state magnetic field to produce a system in which acoustic pressure has a significant, or more significant, contribution to impeding, preventing, reducing, and/or removing ice from airfoil.

The following subject matter of this paragraph characterizes example 164 of the present disclosure, wherein example 164 also includes the subject matter according to any one of examples 157 to 163, above. Referring generally to FIG. 17 and to FIGS. 1-16, according to method 400, the magnitude of steady-state magnetic field 182, 282, 382 is greater than 0.1 T (tesla) and less than 100 T.

Steady-state magnetic field is sufficiently strong so as to cause significant acoustic pressure in skin when steady-state magnetic field interacts with eddy current caused by alternating electrical current in induction coil. Steady-state magnetic field may be a strong magnetic field, with a magnitude greater than 0.1 T, and a magnetic field that is practical to generate with direct electrical current flowing in induction coil.

The following subject matter of this paragraph characterizes example 165 of the present disclosure, wherein example 165 also includes the subject matter according to any one of examples 156 to 164, above. Referring generally to FIG. 17 and to FIGS. 1-16, according to method 400, (block 404) supplying the inductive heat and the acoustic pressure to exterior surface 104, 204, 304 comprises directing steady-state magnetic field 182, 282, 382 through skin 110, 210, 310 that defines exterior surface 104, 204, 304 of airfoil 100, 200, 300. Steady-state magnetic field 182, 282, 382 has a magnitude greater than an amplitude of alternating magnetic field 186, 286, 386, generated by alternating electrical current 134, 234, 334, flowing in induction coil 130, 230, 330.

Alternating magnetic field generates eddy current within skin, with the amplitude of eddy current related to the amplitude of alternating magnetic field. The amplitude of eddy current affects the efficiency of inductive heat. The magnitude of steady-state magnetic field affects the amplitude of force that acts on skin to produce acoustic pressure. Hence, the relative size of the amplitude of alternating magnetic field and the magnitude of steady-state magnetic field affects the relative contributions of inductive heat and acoustic pressure to impeding, preventing, reducing, and/or removing ice from airfoil. For the same field intensity (amplitude or magnitude), inductive heat would be more efficient that force generation.

The following subject matter of this paragraph characterizes example 166 of the present disclosure, wherein example 166 also includes the subject matter according to example 165, above. Referring generally to FIG. 17 and to FIGS. 1-16, according to method 400, (block 404) supplying the inductive heat and the acoustic pressure to exterior surface 104, 204, 304 comprises generating steady-state magnetic field 182, 282, 382 by delivering direct electrical current 146, 246, 346 to induction coil 130, 230, 330.

Direct electrical current (also referred to as DC current and steady-state current) in induction coil generates a steady-state magnetic field within skin. Steady-state magnetic field generally interacts with electrical currents (such as eddy current) within skin to produce force (Lorentz force) within skin.

Because induction coil and the magnetic field generated by direct electrical current in induction coil are within interior space of airfoil and skin is magnetically conductive (and/or ferromagnetic), most or all of the resultant magnetic field (such as steady-state magnetic field) is contained within airfoil. Magnetic field lines that would otherwise extend beyond skin, if skin were not present (or not magnetically conductive and/or ferromagnetic), are substantially redirected within skin. Thus, little to no magnetic field from direct electrical current in induction coil is present outside of airfoil. Hence, special precautions for operating near high magnetic fields are not needed for personnel, tools, or equipment operating outside of airfoil.

Steady-state magnetic field is controllable by supplying (or not) direct electrical current to induction coil. Steady-state magnetic field may be turned on or off as desired to actuate the acoustic vibrations in skin. In addition to controlling acoustic vibrations, a controllable steady-state magnetic field may be turned off to eliminate high magnetic fields within airfoil. Thus, special precautions for operating near high magnetic fields within airfoil may be avoided.

The following subject matter of this paragraph characterizes example 167 of the present disclosure, wherein example 167 also includes the subject matter according to example 166, above. Referring generally to FIG. 17 and to FIGS. 1-16, according to method 400, an amplitude of alternating electrical current 134, 234, 334 is less than a magnitude of direct electrical current 146, 246, 346.

Alternating electrical current flowing in induction coil generates alternating magnetic field, with the amplitude of alternating magnetic field related to the amplitude of alternating electrical current. Alternating magnetic field generates eddy current within skin, with the amplitude of eddy current related to the amplitude of alternating magnetic field and the amplitude of alternating electrical current. The amplitude of eddy current affects the efficiency of inductive heat. Direct electrical current flowing in induction coil generates steady-state magnetic field, with the magnitude of steady-state magnetic field related to the magnitude of direct electrical current. The magnitude of steady-state magnetic field affects the amplitude of force that acts on skin to produce acoustic pressure. Hence, the relative size of the amplitude of alternating electrical current and the magnitude of direct electrical current affects the relative contributions of inductive heat and acoustic pressure to impeding, preventing, reducing, and/or removing ice from airfoil. For the same field intensity (amplitude or magnitude), inductive heat would be more efficient that force generation.

The following subject matter of this paragraph characterizes example 168 of the present disclosure, wherein example 168 also includes the subject matter according to any one of examples 166 to 167, above. Referring generally to FIG. 17 and to FIGS. 1-16, according to method 400, a ratio of an amplitude of alternating electrical current 134, 234, 334 to a magnitude of direct electrical current 146, 246, 346 is less than 0.1 and greater than 0.0001.

The amplitude of alternating electrical current may be much smaller than the magnitude of direct electrical current to produce a system in which acoustic pressure has a significant, or more significant, contribution to impeding, preventing, reducing, and/or removing ice from airfoil.

The following subject matter of this paragraph characterizes example 169 of the present disclosure, wherein example 169 also includes the subject matter according to any one of examples 165 to 168, above. Referring generally to FIG. 17 and to FIGS. 1-16, according to method 400, steady-state magnetic field 182, 282, 382 is generated by permanent magnet 142, 242, 342 within airfoil 100, 200, 300.

Steady-state magnetic field may be a permanent magnetic field from permanent magnet. Permanent magnet produces a magnetic field without electronics or electrical current flow. Hence, use of permanent magnet may simplify construction and/or control of airfoil and/or hybrid acoustic induction-heating system. Arranging permanent magnet within interior space formed by skin prevents permanent magnet from affecting aerodynamic airflow across airfoil.

Because permanent magnet is within interior space of airfoil and provided that skin is magnetically conductive (and/or ferromagnetic), most or all of the resultant magnetic field (such as steady-state magnetic field) is contained within airfoil. Magnetic field lines that would otherwise extend beyond skin, if skin were not present (or not magnetically conductive and/or ferromagnetic), are substantially redirected within skin. Thus, little to no magnetic field from permanent magnet is present outside of airfoil. Hence, special precautions for operating near high magnetic fields are not needed for personnel, tools, or equipment operating outside of airfoil.

The following subject matter of this paragraph characterizes example 170 of the present disclosure, wherein example 170 also includes the subject matter according to any one of examples 165 to 169, above. Referring generally to FIG. 17 and to FIGS. 1-16, according to method 400, (block 404) supplying the inductive heat and the acoustic pressure to exterior surface 104, 204, 304 comprises generating steady-state magnetic field 182, 282, 382 by energizing electromagnet 144, 244, 344 that is inside airfoil 100, 200, 300.

Electromagnet produces steady-state magnetic field when a steady-state (direct current, DC) electrical current flows through a coil. The magnetic field may be turned on or off by controlling the electrical current flow. Additionally or alternatively, the magnetic field strength and direction may be adjusted according to the electrical current flow. Electromagnet generally is controllable and may be referred to as a controllable magnet. Induction coil may serve as the coil of electromagnet. Induction coil may be adapted to flow steady-state electrical current so that induction coil may produce steady-state magnetic field. The steady-state electrical current to produce steady-state magnetic field is typically much greater (has a much greater magnitude) than the amplitude of alternating electrical current. Hence, induction coil adapted to flow steady-state electrical current may have wires with a higher cross section (lower resistance) than corresponding wires of induction coil that is adapted to flow only alternating electrical current.

The following subject matter of this paragraph characterizes example 171 of the present disclosure, wherein example 171 also includes the subject matter according to any one of examples 165 to 170, above. Referring generally to FIG. 17 and to FIGS. 1-16, according to method 400, a ratio of the amplitude of alternating magnetic field 186, 286, 386 to the magnitude of steady-state magnetic field 182, 282, 382 is less than 0.1 and greater than 0.0001.

The amplitude of alternating magnetic field may be much smaller than the magnitude of steady-state magnetic field to produce a system in which acoustic pressure has a significant, or more significant, contribution to impeding, preventing, reducing, and/or removing ice from airfoil.

The following subject matter of this paragraph characterizes example 172 of the present disclosure, wherein example 172 also includes the subject matter according to any one of examples 165 to 171, above. Referring generally to FIG. 17 and to FIGS. 1-16, according to method 400, the magnitude of steady-state magnetic field 182, 282, 382 is greater than 0.1 T (tesla) and less than 100 T.

Steady-state magnetic field is sufficiently strong so as to cause significant acoustic pressure in skin when steady-state magnetic field interacts with eddy current caused by alternating electrical current in induction coil. Steady-state magnetic field may be a strong magnetic field, with a magnitude greater than 0.1 T, and a magnetic field that is practical to generate with direct electrical current flowing in induction coil.

The following subject matter of this paragraph characterizes example 173 of the present disclosure, wherein example 173 also includes the subject matter according to any one of examples 156 to 172, above. Referring generally to FIG. 17 and to FIGS. 1-16, according to method 400, airfoil 100, 200, 300 has leading edge 106, 206, 306 and induction coil 130, 230, 330 comprises portion 136, 236, 336 closest to leading edge 106, 206, 306 and parallel to leading edge 106, 206, 306.

Portion of induction coil that is closest to leading edge also may be referred to as portion of induction coil that is behind, and/or downstream of leading edge. Leading edge is on external surface of skin. Induction coil is in interior space formed by skin, with internal surface of skin facing interior space. Portion of induction coil that is closest to leading edge generally is directly behind or downstream of a position on internal surface of skin that is closest to leading edge (i.e., a position on internal surface that is separated by leading edge by the thickness of skin).

Portion of induction coil is a portion of parallel wire of induction coil. Generally, portion is a portion of the virtual surface of induction coil. The shape of induction coil and portion of induction coil is defined by the exterior form of induction coil. For example, induction coil may be formed of a helix of wire. The exterior form of a regular helix is a cylinder. Such induction coil may be referred to as a cylindrical induction coil. Portion of a cylindrical induction coil is a segment of the cylinder that defines the exterior form of the cylindrical induction coil.

Portion of induction coil is parallel to leading edge when the parallel wires in portion are parallel to leading edge. The direction of the parallel wires defines the direction of eddy current within skin. Hence, where portion of induction coil is parallel to leading edge, eddy current due to portion of induction coil with alternating current flowing therethrough is parallel to leading edge. As Lorentz force is perpendicular to eddy current, force, in this arrangement, may be perpendicular to leading edge (e.g., in the x-direction or the z-direction).

The following subject matter of this paragraph characterizes example 174 of the present disclosure, wherein example 174 also includes the subject matter according to any one of examples 135 to 173, above. Referring generally to FIG. 17 and to FIGS. 1-16, according to method 400, exterior surface 104, 204, 304 is external surface 112, 212, 312 of skin 110, 210, 310 that is magnetically and electrically conductive.

Skin is magnetically conductive so that a magnetic field is will tend to concentrate within skin. Skin is magnetically conductive at temperatures near and below the freezing point of water, and above the lowest operating temperature for airfoil. In addition to being magnetically conductive, skin may be a soft magnetic material (easily magnetized and demagnetized) and/or a ferromagnetic material (exhibiting a large, positive, non-linear susceptibility to an external magnetic field).

Skin is electrically conductive so that eddy current will form in skin and so that skin is susceptible to inductive heat. Inductive heat heats an electrically conductive object by applying an alternating magnetic field to the object. The alternating magnetic field causes eddy current to circulate on the object. Eddy current causes resistive heating (also called Joule heating) due to the electrical resistance of the electrically conductive object. Eddy current and consequent heat generation are confined generally to a thin surface region of the object characterized by the frequency-dependent skin depth parameter. The skin depth (also called the electrical skin depth and the electromagnetic skin depth) is proportional to the inverse square root of the frequency of the alternating magnetic field. The efficiency of inductive heat is related to the intensity and frequency of the alternating magnetic field, the geometry of induction coil, the relative size and position of induction coil and skin, and the material of skin.

Materials for skin may be selected for suitability as the external surface of an airfoil (e.g., external surface of airfoil). Properties that may be selected comprise high magnetic permeability (magnetic conductivity), suitable electrical conductivity, strength, environmental resistance, abrasion resistance, and coefficient of temperature variation.

The following subject matter of this paragraph characterizes example 175 of the present disclosure, wherein example 175 also includes the subject matter according to example 174, above. Referring generally to FIG. 17 and to FIGS. 1-16, according to method 400, (block 404) supplying the inductive heat and the acoustic pressure to exterior surface 104, 204, 304 comprises inductively heating skin 110, 210, 310 and inductively generating acoustic waves in skin 110, 210, 310.

Inductive heat is generated inductively (i.e., by inductively heating). Alternating electrical current flowing in induction coil generates eddy current in skin. Eddy current causes resistive heating (also called Joule heating) due to the electrical resistance of the electrically conductive skin. Eddy current and consequent heat generation are confined generally to a thin surface region of skin characterized by the frequency-dependent skin depth parameter.

Acoustic pressure is generated inductively (i.e., by inductively generating acoustic wave). The interaction of eddy current with steady-state magnetic field generates Lorentz force and acoustic vibrations directly in skin, without requiring acoustic contact to a sound source (e.g., no acoustic transducer such as piezoelectric element is required).

The following subject matter of this paragraph characterizes example 176 of the present disclosure, wherein example 176 also includes the subject matter according to any one of examples 174 to 175, above. Referring generally to FIG. 17 and to FIGS. 1-16, according to method 400, skin 110, 210, 310 comprises a nickel-iron alloy.

Nickel-iron alloys are a class of alloys that are suitable for skin. Nickel-iron alloys are electrically and magnetically conductive, and are susceptible to inductive heat and acoustic pressure generation.

The following subject matter of this paragraph characterizes example 177 of the present disclosure, wherein example 177 also includes the subject matter according to any one of examples 174 to 176, above. Referring generally to FIG. 17 and to FIGS. 1-16, according to method 400, skin 110, 210, 310 has a thickness of less than 1 mm and greater than 0.001 mm.

Skin generally is thin so that skin may be affected rapidly by the inductive heat and acoustic pressure generated by hybrid acoustic induction-heating system. The thickness of skin may be selected based on practical and/or desired frequencies of alternating electrical current and/or skin depth at those frequencies. Skin is thick enough to maintain structural integrity when subjected to conditions of airfoil.

The following subject matter of this paragraph characterizes example 178 of the present disclosure, wherein example 178 also includes the subject matter according to any one of examples 174 to 177, above. Referring generally to FIG. 17 and to FIGS. 1-16, according to method 400, skin 110, 210, 310 is ferromagnetic.

As discussed above with respect to skins 110, 210, 310, skin may be ferromagnetic to concentrate magnetic fields within skin.

The following subject matter of this paragraph characterizes example 179 of the present disclosure, wherein example 179 also includes the subject matter according to any one of examples 174 to 178, above. Referring generally to FIG. 17 and to FIGS. 1-16, according to method 400, skin 110, 210, 310 has relative magnetic permeability of greater than 1,000 and less than 10,000,000.

Magnetic materials have a relative magnetic permeability significantly greater than unity. Non-magnetic materials have a relative magnetic permeability near unity. Higher relative magnetic permeabilities indicate a higher affinity for and concentration of magnetic fields within the material. Typical magnetic materials have a relative magnetic permeability greater than about 100. Highly magnetic materials have a relative magnetic permeability of greater than about 1,000. All known materials have a relative magnetic permeability of less than 10,000,000.

The following subject matter of this paragraph characterizes example 180 of the present disclosure, wherein example 180 also includes the subject matter according to any one of examples 174 to 179, above. Referring generally to FIG. 17 and to FIGS. 1-16, according to method 400, skin 110, 210, 310 has Curie temperature less than 300° C. and greater than 50° C.

The Curie temperature is a transition temperature of ferromagnetic materials. Below the Curie temperature, the material has a high relative magnetic permeability. Above the Curie temperature, the material is paramagnetic with a lower relative magnetic permeability. If skin becomes paramagnetic (as opposed to ferromagnetic or magnetically conductive at a particular temperature), the efficiency of inductive heat and/or generation of acoustic pressure will be significantly reduced. Hence, if the Curie temperature of skin is sufficiently low, hybrid acoustic induction-heating system may be configured to automatically cease significant induction-heating and/or acoustic pressure generation if the skin becomes too hot (e.g., in the event of a malfunction of hybrid acoustic induction-heating system or excessive solar heating of airfoil).

The following subject matter of this paragraph characterizes example 181 of the present disclosure, wherein example 181 also includes the subject matter according to any one of examples 135 to 180, above. Referring generally to FIG. 17 and to FIGS. 1-16, according to method 400, (block 402) detecting the first ambient conditions, known to cause the formation of the ice, and (block 406) detecting the second ambient conditions, known to impede the formation of the ice, each comprise (block 410) detecting an ambient temperature of layer of fluid 118, 218, 318, flowing over exterior surface 104, 204, 304. According to method 400, (block 404) supplying the inductive heat and the acoustic pressure to exterior surface 104, 204, 304 comprises (block 440) supplying the inductive heat and the acoustic pressure when the ambient temperature of layer of fluid 118, 218, 318, flowing over exterior surface 104, 204, 304, is below a first threshold temperature.

Detecting 402 the first ambient conditions comprises detecting 410 ambient temperature of layer of fluid. Supplying 404 comprises supplying 440 when ambient temperature of layer of fluid is sufficiently low (i.e., below first threshold temperature). Temperature is a strong indicator of conditions known to cause ice to form. Hence, supplying the inductive heat and the acoustic pressure based on ambient temperature simplifies facilitates impeding, preventing, reducing, and/or removing ice that may form on exterior surface of airfoil.

The following subject matter of this paragraph characterizes example 182 of the present disclosure, wherein example 182 also includes the subject matter according to example 181, above. Referring generally to FIG. 17 and to FIGS. 1-16, according to method 400, the first threshold temperature is above a freezing point of water and below 5° C.

The temperature range from the freezing point of water to 5° C. is a range in which water impacting airfoil may transition from remaining liquid to accumulating as ice. Hence, the first threshold being within this range is a reasonable predictor of the need to begin supplying 404 the inductive heat and the acoustic pressure.

The following subject matter of this paragraph characterizes example 183 of the present disclosure, wherein example 183 also includes the subject matter according to any one of examples 181 to 182, above. Referring generally to FIG. 17 and to FIGS. 1-16, according to method 400, (block 408) discontinuing to supply the inductive heat and the acoustic pressure to exterior surface 104, 204, 304 comprises (block 450) discontinuing to supply the inductive heat and the acoustic pressure when the ambient temperature of layer of fluid 118, 218, 318, flowing over exterior surface 104, 204, 304, is above a second threshold temperature.

Detecting 406 the second ambient conditions comprises detecting 410 ambient temperature of layer of fluid. Discontinuing 408 to supply comprises discontinuing 450 when ambient temperature of layer of fluid is sufficiently high (i.e., above second threshold temperature). Temperature is a strong indicator of conditions known to impede ice formation. Hence, supplying the inductive heat and the acoustic pressure based on ambient temperature simplifies facilitates impeding, preventing, reducing, and/or removing ice that may form on exterior surface of airfoil.

The following subject matter of this paragraph characterizes example 184 of the present disclosure, wherein example 184 also includes the subject matter according to example 183, above. Referring generally to FIG. 17 and to FIGS. 1-16, according to method 400, the second threshold temperature is different than the first threshold temperature.

The second threshold temperature value may be the same as or different than the first threshold temperature value. Different values for the second threshold temperature and the first threshold temperature permit supplying 404 or discontinuing 408 to supply the inductive heat and the acoustic pressure at different temperatures.

The following subject matter of this paragraph characterizes example 185 of the present disclosure, wherein example 185 also includes the subject matter according to any one of examples 183 to 184, above. Referring generally to FIG. 17 and to FIGS. 1-16, according to method 400, the second threshold temperature is greater than the first threshold temperature.

The second threshold temperature being higher than the first threshold temperature tends to prevent oscillation in supplying 404 and discontinuing 408 to supply the inductive heat and the acoustic pressure. If the second threshold temperature is the same as the first threshold temperature, small variations in the ambient temperature about the single temperature threshold may lead to short, rapid switches between supplying 404 and discontinuing 408 to supply. If by supplying 404, the ambient temperature is increased, the act of supplying 404 could cause the ambient temperature to rise and thereby rapidly exceed the single threshold temperature, which in turn would indicate that discontinuing 408 is immediately needed. Such conditions could cause method 400 (e.g., as implemented in controller such as controllers 152, 252, 353) to oscillate and ineffectively supply inductive heat and acoustic pressure.

The following subject matter of this paragraph characterizes example 186 of the present disclosure, wherein example 186 also includes the subject matter according to any one of examples 183 to 185, above. Referring generally to FIG. 17 and to FIGS. 1-16, according to method 400, the second threshold temperature is above 2° C. and below 10° C.

The temperature range from above 2° C. to below 10° C. is a range in which water impacting airfoil may transition from accumulating as ice to remaining liquid. Hence, the second threshold being within this range is a reasonable predictor of the need to turn off the inductive heat and acoustic pressure to impede, to prevent, to reduce, and/or to remove ice from airfoil.

Examples of the present disclosure may be described in the context of aircraft manufacturing and service method 1100 as shown in FIG. 18 and aircraft 1102 as shown in FIG. 19. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 19, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An airfoil, comprising:
   a skin, comprising an external surface and an internal surface, opposite the external surface, wherein the skin is magnetically and electrically conductive;
   an interior space, formed by the skin, wherein the internal surface of the skin faces the interior space;
   a leading edge along the external surface of the skin; and
   a hybrid acoustic induction-heating system, configured to impede formation of ice on the external surface of the skin and comprising:
      an induction coil within the interior space, wherein at least a portion of the induction coil is sufficiently close to the internal surface of the skin to produce an eddy current in the skin when an alternating electrical current is flowing in the induction coil to inductively heat the skin; and
      at least one magnet within the interior space, wherein at least the one magnet is configured to produce a steady-state magnetic field within the skin to interact with the eddy current to generate acoustic vibrations within the skin.

2. The airfoil according to claim 1, wherein, at a location in the skin, the steady-state magnetic field, produced by at least the one magnet, is transverse to the eddy current.

3. The airfoil according to claim 1, wherein at least the portion of the induction coil is parallel to the skin.

4. The airfoil according to claim 1, wherein at least the portion of the induction coil is closer to the leading edge than any other portion of the induction coil and is positioned to heat the leading edge.

5. The airfoil according to claim 1, wherein at least the portion of the induction coil is transverse to the leading edge.

6. The airfoil according to claim 1, wherein at least the portion of the induction coil is parallel to the leading edge.

7. The airfoil according to claim 1, wherein the steady-state magnetic field, produced by at least the one magnet, is transverse to at least the portion of the induction coil.

8. The airfoil according to claim 1, wherein the steady-state magnetic field, produced by at least the one magnet, is transverse to the skin at the internal surface of the skin.

9. The airfoil according to claim 1, wherein the steady-state magnetic field, produced by at least the one magnet, is transverse to a portion of the internal surface of the skin that is closest to the leading edge.

10. The airfoil according to claim 1, wherein the steady-state magnetic field, produced by at least the one magnet, is parallel to the leading edge at a portion of the internal surface of the skin that is closest to the leading edge.

11. The airfoil according to claim 1, wherein the induction cod has a sheet form.

12. The airfoil according to claim 1, wherein the induction coil has a volumetric form.

13. The airfoil according to claim 1, wherein the airfoil is selected from the group consisting of a wing, an erosion shied, an empennage, a horizontal stabilizer, a vertical stabilizer, a winglet, a turbine-engine inlet, an engine nacelle, and a turbine blade.

14. The airfoil according to claim 1, wherein at least the one magnet is a permanent magnet.

15. The airfoil according to claim 1, wherein at least the one magnet is an electromagnet.

16. The airfoil according to claim 1, wherein at least the one magnet is a plurality of magnets.

17. The airfoil according to claim 1, wherein the steady-state magnetic field, produced by at least the one magnet, has a magnitude greater than 0.1 T (tesla) and less than 100 T.

18. The airfoil according to claim 1, wherein the skin comprises a nickel-iron alloy.

19. The airfoil according to claim 1, wherein the skin has a thickness of less than 1 mm and greater than 0.001 mm.

20. The airfoil according to claim 1, wherein the skin is ferromagnetic.

21. The airfoil according to claim 1, wherein the skin has relative magnetic permeability of greater than 1,000 and less than 10,000,000.

22. The airfoil according to claim 1, wherein Curie temperature of the skin is less than 300° C. and greater than 50° C.

23. The airfoil according to claim 1, further comprising a control system, wherein:
the skin has a controlled region, in which the eddy current is produced when the alternating electrical current is flowing in the induction coil, and
the control system is configured to supply the alternating electrical current to the induction coil to generate inductive heat and acoustic pressure in the controlled region of the skin.

24. The airfoil according to claim 23, wherein the control system is configured to supply the alternating electrical current to the induction coil based, at least part, on an ambient temperature at an altitude of the airfoil.

25. The airfoil according to claim 23, wherein the control system is configured to supply the alternating electrical current based, at least in part, on an ambient temperature of a layer of fluid flowing over the external surface of the skin.

26. The airfoil according to claim 25, further comprising a temperature sensor, configured to measure the ambient temperature of the layer of fluid flowing over the external surface of the skin.

27. The airfoil according to claim 23, wherein the alternating electrical current generates an alternating magnetic field with an amplitude that is less than a magnitude of the steady-state magnetic field.

28. The airfoil according to claim 27, wherein a ratio of the amplitude of the alternating magnetic field to the magnitude of the steady-state magnetic field is less than 0.1 and greater than 0.0001.

29. The airfoil according to claim 23, wherein the control system comprises:
a power supply, configured to supply the alternating electrical current to the induction coil; and
a controller, programmed to:
receive signals, representative of first ambient conditions known to cause formation of the ice on the external surface of the skin and second ambient conditions known to impede formation of the ice on the external surface, wherein the first ambient conditions and the second ambient conditions both comprise an ambient temperature of a layer of fluid flowing over the external surface of the skin,
cause the power supply to supply the alternating electrical current to the induction coil to generate inductive heat and acoustic pressure in the controlled region of the skin based upon the first ambient conditions, and
cause the power supply to discontinue supplying the alternating electrical current to the induction coil based upon the second ambient conditions.

30. The airfoil according to claim 29, wherein the controller is further programmed to cause the power supply to supply the alternating electrical current to the induction coil when the ambient temperature of the layer of fluid flowing over the external surface of the skin is below a first threshold temperature.

31. The airfoil according to claim 30, wherein the first threshold temperature is above freezing point of water and below 5° C.

32. The airfoil according to claim 30, wherein the controller is further programmed to cause the power supply to discontinue supplying the alternating electrical current to the induction coil when the ambient temperature of the layer of fluid flowing over the external surface of the skin is above a second threshold temperature.

33. The airfoil according to claim 32, wherein the second threshold temperature is different than the first threshold temperature.

34. The airfoil according to claim 32, wherein the second threshold temperature is greater than the first threshold temperature.

35. The airfoil according to claim 32, wherein the second threshold temperature is above 2° C. and below 10° C.

36. The airfoil according to claim 23, wherein the alternating electrical current has a frequency that is at least 100 kHz (kilohertz) and at most 10 MHz (megahertz).

37. The airfoil according to claim 36, wherein the frequency of the alternating electrical current is at least 1 MHz.

38. The airfoil according to claim 1, wherein at least the portion of the induction coil is no more than 10 mm away from the internal surface of the skin.

39. The airfoil according to claim 38, wherein at least the portion of the induction coil is no more 1mm away from the internal surface of the skin.

40. The airfoil according to claim 1, further comprising an electrical insulator in the interior space, wherein the electrical insulator is coupled to the skin.

41. The airfoil according to claim 40, wherein the electrical insulator supports the skin.

42. The airfoil according to claim 40, wherein the electrical insulator supports at least the one magnet.

* * * * *

UNITED STATES PATENT AND TRADEMARK OFFICE
CERTIFICATE OF CORRECTION

PATENT NO. : 10,118,705 B2
APPLICATION NO. : 15/183563
DATED : November 6, 2018
INVENTOR(S) : John Ralph Hull and Minas H. Tanielian It is certified that error appears in the above-identified patent and that said Letters Patent is hereby corrected as shown below:

In the Claims

Claim 22, Column 67, Line 32, delete "." after the "C".
Claim 24, Column 67, Line 45, add --in-- after "least".
Claim 35, Column 68, Line 42, delete "." after the "C".

Signed and Sealed this
Twenty-ninth Day of January, 2019

Andrei Iancu
*Director of the United States Patent and Trademark Office*